United States Patent
Kuribayashi et al.

[11] Patent Number: 6,091,679
[45] Date of Patent: Jul. 18, 2000

[54] TRACKING ERROR SIGNAL GENERATING METHOD AND APPARATUS

[75] Inventors: Hiroki Kuribayashi; Takanori Maeda, both of Tsurugashima, Japan

[73] Assignee: Pioneer Electronic Corporation, Tokyo-to, Japan

[21] Appl. No.: 09/071,495

[22] Filed: May 4, 1998

[30] Foreign Application Priority Data

May 8, 1997 [JP] Japan ..................................... 9-117947
Mar. 19, 1998 [JP] Japan ................................. 10-070135

[51] Int. Cl.$^7$ ......................................................... G11B 7/09
[52] U.S. Cl. .................................... 369/44.27; 369/44.26; 369/44.29; 369/44.37
[58] Field of Search .............................. 369/44.26, 44.27, 369/44.29, 44.34, 44.37, 44.41, 54, 58, 44.35

[56] References Cited

U.S. PATENT DOCUMENTS

| | | | |
|---|---|---|---|
| 5,280,466 | 1/1994 | Tomita | 369/44.26 |
| 5,400,312 | 3/1995 | Haraguchi | 369/44.37 |
| 5,416,766 | 5/1995 | Horimai | 369/44.26 |
| 5,475,662 | 12/1995 | Miyagawa | 369/44.26 |
| 5,508,995 | 4/1996 | Moriya et al. | 369/275.4 |
| 5,537,374 | 7/1996 | Wachi | 369/44.34 |
| 5,616,390 | 4/1997 | Miyagawa et al. | 369/275.4 |
| 5,623,478 | 4/1997 | Horimai | 369/58 |
| 5,754,506 | 5/1998 | Nagasawa et al. | 369/44.26 |
| 5,757,746 | 5/1998 | Matsui | 369/44.37 |
| 5,896,365 | 4/1999 | Hiroki | 369/58 |
| 5,936,932 | 8/1999 | Nakane et al. | 369/275.3 |
| 5,978,327 | 11/1999 | Kuroda et al. | 369/44.26 |

*Primary Examiner*—Thang V. Tran
*Attorney, Agent, or Firm*—Young & Thompson

[57] ABSTRACT

A tracking error signal generating method includes: a light irradiating process of irradiating a plurality of tracks, which are on an information record medium and adjacent to each other with an interval smaller than a size of a light beam in a radial direction of the information record medium, with the light beam, while relatively moving the light beam in the radial direction and a tangential direction of the tracks with respect to the tracks; a light receiving process of receiving a reflection light from the tracks irradiated with the light beam, and generating a detection signal based on the received reflection light; a judging process of performing a judgment of a recording portion and a non-recording portion on at least one of the tracks irradiated with the light beam, on the basis of the detection signal; a signal acquiring process of acquiring a specific signal, which indicates a change of the detection signal in correspondence with a displacement in the radial direction of the light beam relative to the tracks and whose changing direction is varied depending on a direction of the displacement, on the basis of a judgment result by the judging process; and a polarity switching process of switching over a polarity of the specific signal on the basis of the judgment result.

28 Claims, 37 Drawing Sheets

×: NOT-EXTRACTED

| PATTERN No. | Center | IN | OUT | JUDGMENT RESULT |
|---|---|---|---|---|
| ① | MIRROR | MIRROR | MIRROR | × |
| ② | MIRROR | MIRROR | PIT | INVERTED |
| ③ | MIRROR | PIT | MIRROR | NON-INVERTED |
| ④ | MIRROR | PIT | PIT | × |
| ⑤ | PIT | MIRROR | MIRROR | × |
| ⑥ | PIT | MIRROR | PIT | × |
| ⑦ | PIT | PIT | MIRROR | × |
| ⑧ | PIT | PIT | PIT | × |

FIG.13

X: NOT-EXTRACTED

| PATTERN No. | Center | IN | OUT | JUDGMENT RESULT |
|---|---|---|---|---|
| ① | MIRROR | MIRROR | MIRROR | × |
| ② | MIRROR | MIRROR | PIT | INVERTED |
| ③ | MIRROR | PIT | MIRROR | NON-INVERTED |
| ④ | MIRROR | PIT | PIT | × |
| ⑤ | PIT | MIRROR | MIRROR | × |
| ⑥ | PIT | MIRROR | PIT | INVERTED |
| ⑦ | PIT | PIT | MIRROR | NON-INVERTED |
| ⑧ | PIT | PIT | PIT | × |

FIG.17 x: NOT-EXTRACTED

| PATTERN No. | Center | IN | OUT | IN-OUT | JUDGMENT RESULT |
|---|---|---|---|---|---|
| ① | MIRROR | MIRROR | MIRROR | ≒0 | × |
| ② | MIRROR | MIRROR | PIT | − | INVERTED |
| ③ | MIRROR | PIT | MIRROR | + | NON-INVERTED |
| ④ | MIRROR | PIT | PIT | ≒0 | × |
| ⑤ | PIT | MIRROR | MIRROR | ≒0 | × |
| ⑥ | PIT | MIRROR | PIT | − | × |
| ⑦ | PIT | PIT | MIRROR | + | × |
| ⑧ | PIT | PIT | PIT | ≒0 | × |

FIG.19

×: NOT-EXTRACTED

| PATTERN No. | Center | IN | OUT | IN-OUT | JUDGMENT RESULT |
|---|---|---|---|---|---|
| ① | MIRROR | MIRROR | MIRROR | ≈0 | × |
| ② | MIRROR | MIRROR | PIT | − | INVERTED |
| ③ | MIRROR | PIT | MIRROR | + | NON-INVERTED |
| ④ | MIRROR | PIT | PIT | ≈0 | × |
| ⑤ | PIT | MIRROR | MIRROR | ≈0 | × |
| ⑥ | PIT | MIRROR | PIT | − | INVERTED |
| ⑦ | PIT | PIT | MIRROR | + | NON-INVERTED |
| ⑧ | PIT | PIT | PIT | ≈0 | × | ial
TRACKING ERROR SIGNAL GENERATING METHOD AND APPARATUS

BACKGROUND OF THE INVENTION

1. Field of the Invention

The present invention relates to a method of and an apparatus for generating a tracking error signal used in a servo tracking control for controlling the irradiation position of the light beam for recording and reproducing information, to track or follow up the information track on an information recording medium.

2. Description of the Related Art

When optically reproducing the information, which has been recorded on the information recording medium such as an optical disk, it is necessary to focus a light beam for reproducing the information at the optimum focal length, with respect to the information track, which is formed on the optical disk or the like and on which the information is recorded, and to control the irradiation position of the light beam (i.e. the light spot) to track or follow up the information track.

At this time, in an optical disk reproducing apparatus, in order to focus the light beam onto the information track, the focus servo control is employed by using a focus error signal produced by the reflected light from the optical disk of the light beam. Besides, in order to cause the light spot to follow up the movement of the information track, the tracking servo control is employed by using a tracking error signal produced by the reflected light from the optical disk of the light beam.

As a tracking servo controlling method, there are a so-called three-beam method and a so-called push-pull method. When a light spot crosses an information track, the tracking error signal $S_{TE}$ obtained by each of these methods has a waveform as shown in FIG. 41, for example. In the tracking servo control, by using the tracking error signal $S_{TE}$ shown in FIG. 41, a displacement (deviation) of the light spot from the information track is detected, and on the basis of the detected displacement, the objective lens on the optical path of the light beam is moved in a direction perpendicular to the information track by an actuator or the like, to thereby control the position of the light spot.

In the above mentioned methods, however, when the track pitch is narrowed, a sufficient tracking error signal cannot be obtained.

That is, supposing the wavelength of the light beam to be $\lambda$, and the numerical aperture of the objective lens to be NA, the optical cut-off wavelength is expressed by an expression of $\lambda/(2 \times NA)$, and when the track pitch is not larger than this optical cut-off wavelength, a sufficient tracking error signal is not obtained.

Further, even if the track pitch is larger than the optical cut-off wavelength, if the light beam is not focused at the optimum focal length and the size of the light spot is large enough to receive the effect of crosstalk from the adjacent track thereto, a sufficient tracking error signal may not be obtained.

That is, when reproducing an optical disk, if the light spot formed on the optical disk is lager than the condensing or focusing limit of $(0.85 \times \lambda)/NA$ due to the effect of aberration and becomes close to the first dark ring of $(1.22 \times \lambda)/NA$, the light spot is likely to receive the effect from the track adjacent to the presently reproduced track.

In this manner, in case that the track pitch is not larger than the optical cut-off wavelength or the light spot is not focused at the optimum focal distance, even if the central position of the light beam is at a mirror surface position (hereinafter it is referred to as a "mirror") between two tracks adjacent to each other (on each of which a "pit" is arranged), the reproduction signal is affected by both of these tracks, and the change of the reproduction signal associated with the movement of the light beam in a radial direction is slow. If the arrangement of the pit and the mirror in the radial direction is inverted, the direction of this change is also inverted.

The pits and the mirrors are recorded on the optical disk such that the incidence probabilities of the pits and the mirrors may be equal to each other. By combination of the pits and the mirrors, waveforms different in the changing direction of the reproduction signal respectively appear symmetrically. Further, since the reproduction signal is detected through a low-pass filter, these symmetrical waveforms are integrated and averaged, and hence the tracking error signal cannot be detected.

Therefore, according to the above mentioned tracking error controlling method, there are such drawbacks that the tracking pitch cannot be narrowed and the information recording medium cannot be enhanced in density.

SUMMARY OF THE INVENTION

It is therefore an object of the present invention to provided a method of and an apparatus for generating a tracking error signal, which can allow a detection of the tracking error signal, even if the light spot is not focused at the optimum focal length or the track pitch is not larger than the optical cut-off wavelength.

The above object of the present invention can be achieved by a first tracking error signal generating method including: a light irradiating process of irradiating a plurality of tracks, which are on an information record medium and adjacent to each other with an interval smaller than a size of a light beam in a radial direction of the information record medium, with the light beam, while relatively moving the light beam in the radial direction and a tangential direction of the tracks with respect to the tracks; a light receiving process of receiving a reflection light from the tracks irradiated with the light beam, and generating a detection signal based on the received reflection light; a judging process of performing a judgment of a recording portion and a non-recording portion on at least one of the tracks irradiated with the light beam, on the basis of the detection signal; a signal acquiring process of acquiring a specific signal, which indicates a change of the detection signal in correspondence with a displacement in the radial direction of the light beam relative to the tracks and whose changing direction is varied depending on a direction of the displacement, on the basis of a judgment result by the judging process; and a polarity switching process of switching over a polarity of the specific signal on the basis of the judgment result.

According to the first method of the present invention, in the light irradiating process, while the light beam is relatively moved in the radial direction and the tangential direction with respect to the tracks, the tracks, which are adjacent to each other with an interval smaller than the size of the light beam in the radial direction, are irradiated with the light beam. Then, in the light receiving process, the reflection light from the tracks irradiated with the light beam, is received, and the detection signal based on the received reflection light is generated. Here, the light amount of the reflection light varies depending on the pattern of the track i.e., whether the track is the recording portion or the non-recording portion, and further varies depending on the displacement or deviation of the light beam in the radial direction relative to the track.

For example, if the irradiation position on the tracks of the light beam is displaced or deviated in the radial direction, since the interval of the tracks is smaller than the size of the light beam on the tracks, the light beam certainly receives an influence from the adjacent track, which is adjacent to the track to be presently irradiated with the light beam. Therefore, depending on the manner of the arrangement or pattern of the recording portion (e.g., a pit or pits) and the non-recording portion (e.g., a mirror or mirrors) of the track to be presently irradiated with the light beam and the adjacent track thereto, the manner of the change of the light amount of the reflection light due to the deviation of the irradiation position in the radial direction is determined.

On the other hand, in case that the light detection surface for the reflection light is positioned at an image-forming position of the reflection light, the real image of the track is deviated in the radial direction with respect to the light receiving surface due to the deviation of the irradiation position in the radial direction. In this case, depending on the manner of the arrangement of the recording portion (e.g., a pit or pits) which is observed as a black or dark portion on the light detection surface and the non-recording portion (e.g., a mirror or mirrors) which is observed as a white or bright portion on the light detection surface, the manner of the change of the light amount of the reflection light due to the deviation of the real image in the radial direction is determined.

Therefore, in the judging process, the judgment of the recording portion and the non-recording portion on at least one of the tracks irradiated with the light beam, is performed on the basis of the detection signal. Then, in the signal acquiring process, the specific signal is acquired on the basis of the judgment result. Here, the specific signal is a signal, which indicates the change of the detection signal in correspondence with the displacement or deviation in the radial direction of the light beam relative to the tracks, and that, whose changing direction is varied depending on the direction of the displacement or deviation. Namely, on the basis of the judgment result, the manner of the arrangement of the recording portion and the non-recording portion to obtain such a specific signal is selected, so that the specific signal based on this selected manner of the arrangement is acquired. This manner of the arrangement to obtain such a specific signal can be selected in not only a case where the recording portion and the non recording portion on all tracks, which includes the track to be presently irradiated with the light beam (or the real image corresponding to this track) and the adjacent track or tracks thereto (or the real image corresponding to the adjacent track or tracks), are distinguishable, but also a case where the recording portion and the non-recording portion on just one of the tracks are distinguishable. The reason of this is as following.

Namely, since the incidence probabilities of the recording portion and the non-recording portion on each of the tracks are substantially equal to each other, the average value of the detection signals obtained from each track is equal to an intermediate value between the value of the detection signal obtained from the recording portion and the value of the detection signal obtained from the non-recording portion. By contrast, from the track on which the recording portion and the non-recording portion are distinguishable, the value of the signal of either the recording portion or the non-recording portion is obtained. Accordingly, as the recording portion and the non-recording portion on each of the track are distinguished, it is possible to determine the changing direction of the detection signal with respect to the deviation between the track to be presently irradiated with the light beam and the adjacent track or tracks thereto.

On the other hand, if the manner of the arrangement of the recording portion and the non-recording portion is inverted, the changing direction of the specific signal (which is acquired in the signal acquiring process) with respect to the deviation is also inverted correspondingly. And that, since the incidence probabilities of the recording portion and the non-recording portion on each track are equal to each other, the specific signal corresponding to the recording portion and the specific signal corresponding to the non-recording portion have the changing direction reverse to each other.

Therefore, in the polarity switching process, the polarity of the specific signal is switched over on the basis of the judgment result, so that the polarity of the specific signal be kept constant (i.e., either plus (+) or minus (−)).

In this manner, according to the first method of the present invention, it is possible to prevent the specific signal from being averaged out when passing through a low pass filter. Thus, even if the track interval on the information record medium is smaller than the size of the light beam, it is possible to generate the specific signal, suitably usable as a tracking error signal, which indicates the change of the reflection light amount with following up the deviation direction of the light beam, after the specific signal passes through the low pass filter, so that the deviation direction and the deviation amount of the tracking servo control can be recognized on the basis of this specific signal as the tracking error signal. Consequently, it is possible to precisely perform the tracking servo control. Further, since it is possible to narrow the track interval, it is possible to improve the recording density of the information record medium such as an optical disk or the like.

In one aspect of the first method of the present invention, the light irradiating process includes a process of irradiating the tracks with three light beams arranged in the radial direction, the light receiving process includes a process of receiving each of reflection lights from the tracks irradiated with the three light beams and generating three detection signals based on the received reflection lights respectively, the judging process includes a process of performing the judgment of the recording portion and the non-recording portion on the tracks irradiated with the three light beams, on the basis of at least the detection signals based on an inner one and an outer one of the three light beams, and the signal acquiring process includes a process of acquiring the detection signal based on a central one of the three light beams as the specific signal.

According to this aspect, in the light irradiating process, the tracks are irradiated with three light beams arranged in the radial direction. Then, in the light receiving process, each of reflection lights from the tracks irradiated with the three light beams is received, and the three detection signals based on the received reflection lights are generated respectively. Then, in the judging process, the judgment of the recording portion and the non-recording portion on the tracks irradiated with the three light beams is performed, on the basis of at least the detection signals based on the inner and outer light beams. At this time, since the large/small relationship between the detection signal based on the inner light beam and the detection signal based on the outer light beam varies depending on whether the track is the recording portion or the non-recording portion, the judgment of the recording portion and the non-recording portion is performed on the basis of these detection signals based on the inner and outer light beams. If the manner of the arrangement of the recording portion and the non-recording portion of the adjacent tracks on the inner and outer sides of the track to be presently irradiated with the light beam is recognized, the changing direction of the detection signal with respect to the deviation of the light beam is also recognized, so that the manner of the arrangement to obtain the specific signal (which changes with following up the deviation of the light beam) is selected from among these manners of the arrangements. Then, in the signal acquiring process, the detection signal based on the central light beam, which corresponds to the reflection light in case of the selected manner of the arrangement, is acquired as the specific signal.

Therefore, by keeping the polarity of the specific signal constant in accordance with the manner of the arrangement in the polarity switching process, it is possible to generate the specific signal suitably usable as the tracking error signal, which is not averaged out when passing through the low pass filter.

In this manner, according to this aspect, it is possible to surely perform the judgment and thereby obtain the specific signal as the tracking error signal, even if the track interval on the information record medium is smaller than the size of the light beam.

In another aspect of the first method of the present invention, the light irradiating process includes a process of irradiating the tracks with just one light beam, the light receiving process includes a process of receiving the reflection light from the tracks irradiated with the one light beam and generating a push-pull signal and one detection signal based on a light amount of the received reflection light as the detection signal, the judging process includes a process of performing the judgment of the recording portion and the non-recording portion on the tracks irradiated with the one light beam, on the basis of at least the generated push-pull signal, and the signal acquiring process includes a process of acquiring the generated one detection signal as the specific signal.

According to this aspect, in the light irradiating process, the tracks are irradiated with just one light beam. Then, in the light receiving process, the reflection light from the tracks is received, and the push-pull signal and the one detection signal are generated respectively. Then, in the judging process, the judgment of the recording portion and the non-recording portion on the tracks irradiated with the one light beam is performed, on the basis of at least the push-pull signal. At this time, the push-pull signal exceeds a predetermined threshold value with respect to a fine positional deviation in the radial direction of the light beam, in a case of such an arrangement that one of the adjacent track is the recording portion and another of the adjacent track is the non-recording portion, and the polarity of the push-pull signal is inverted depending on the arrangement thereof. Thus, by judging a case where the push-pull signal exceeds a plus threshold value or a minus threshold value, the manner of the arrangement in the above mentioned combination is selected.

On the other hand, in a case of the manner of the arrangement in the above mentioned combination, the one detection signal based on the reflection light amount from the track with respect to the one light beam is also a signal, which changing direction varies in correspondence with the deviation direction of the light beam, and the changing direction is also inverted in the same manner as the polarity of the push-pull signal. Then, by selecting the manner of the arrangement of the recording portion and the non-recording portion with respect to which the push-pull signal exceeds the predetermined threshold value, the specific signal which changes with following up the deviation of the light beam is acquired in the signal acquiring process.

Therefore, by keeping the polarity of the specific signal constant on the basis of the polarity of the push-pull signal in the polarity switching process, it is possible to generate the specific signal suitably usable as the tracking error signal, which is not averaged out when passing through the low pass filter.

In this manner, according to this aspect, it is possible to perform the judgment by use of an optical system having a rather simple construction. Even if the track interval on the information record medium is smaller than the size of the light beam, it is possible to generate the tracking error signal with a low cost.

In another aspect of the first method of the present invention, the light irradiating process includes a process of irradiating the tracks with three light beams arranged in the radial direction, the light receiving process includes a process of receiving each of reflection lights from the tracks irradiated with the three light beams and generating three detection signals based on the received reflection lights respectively, the judging process includes a process of performing the judgment of the recording portion and the non-recording portion on the tracks irradiated with the three light beams, on the basis of at least the detection signal based on a central one of the three light beams, and the signal acquiring process includes a process of acquiring the detection signals based on an inner one and an outer one of the three light beams as the specific signal.

According to this aspect, in the light irradiating process, the tracks are irradiated with three light beams arranged in the radial direction. Then, in the light receiving process, each of reflection lights from the tracks irradiated with the three light beams is received, and the three detection signals based on the received reflection lights are generated respectively. Then, in the judging process, the judgment of the recording portion and the non-recording portion on the central track is performed, on the basis of at least the detection signal based on the central light beam. At this time, the recording portion and the non-recording portion of the inner and outer tracks cannot be distinguished. However, since the incidence probabilities of these portions are equal on each track, if the detection signals based on the three light beams of all the recording and non-recording portions on an arbitrary track pass through the low pass filter, the detection signals are averaged out to have an intermediate value between the value in the case of the recording portion and the value in the case of the non-recording portion.

Then, assuming that the direction of the deviation of the light beam is from the central track side toward the outer track side, the inner light beam is moved from the inner track side toward the central track side. Therefore, as the recording and non-recording portions on this central track are distinguishable, the detection signal based on the inner light beam changes from the intermediate value to a specific value corresponding to either the recording portion or the non-recording portion. On the other hand, if the deviation direction of the light beam is in reverse, the detection signal based on the outer light beam changes from the intermediate value to this specific value in the same manner. Since the changing direction of the detection signal based on the outer light beam with respect to the direction of the deviation of the light beam and that based on the inner light beam are reverse to each other, by calculating the detection signal obtained from the inner light beam and the detection signal obtained from the outer light beam, the specific signal which changing direction varies with respect to the direction of the deviation of the light beams is acquired in the signal acquiring process.

Further, the changing direction of the specific signal acquired in this manner is different between in a case where the central track is the recording portion and in a case where the central track is the non-recording portion. Thus, by aligning the changing direction of the specific signal in accordance with the judgment result of the recording or non-recording portion of the central track, in the polarity switching process, it is possible to generate the specific signal suitably usable as the tracking error signal, which is not averaged out when passing through the low pass filter.

In this manner, according to this aspect, it is possible to surely perform the judgment and surely obtain the specific signal even if the track interval on the information record medium is smaller than the size of the light beam.

In another aspect of the first method of the present invention, the light irradiating process includes a process of irradiating the tracks with just one light beam, the light receiving process includes a process of receiving the reflection light from the tracks irradiated with the one light beam and generating a push-pull signal and one detection signal based on a light amount of the received reflection light as the detection signal, the judging process includes a process of performing the judgment of the recording portion and the non-recording portion on the tracks irradiated with the one light beam, on the basis of at least the generated one detection signal, and the signal acquiring process includes a process of acquiring the generated push-pull signal as the specific signal.

According to this aspect, in the light irradiating process, the tracks are irradiated with just one light beam. Then, in the light receiving process, the reflection light from the tracks is received, and the push-pull signal and the one detection signal are generated respectively. Then, in the judging process, the judgment of the recording portion and the non-recording portion on the tracks irradiated with the one light beam is performed, on the basis of at least the one detection signal.

Here, the push-pull signal exceeds a predetermined threshold value with respect to a fine positional deviation in the radial direction of the light beam, in a case of such an arrangement that one of the adjacent track is the recording portion and another of the adjacent track is the non-recording portion, and the polarity of the push-pull signal is inverted depending on the arrangement thereof. For example, in the case of such a manner of the arrangement that the central track is the non-recording portion and the outer track is the recording portion, the push-pull signal has a positive (plus) value, while, in the case of such a manner of the arrangement that the central track is the recording portion and the outer track is the non-recording portion, the push-pull signal has a negative (minus) value. In the case of such a manner of the arrangement that the recording portion and the non-recording portion appear alternatively with respect to the radial direction from the inner track to the central track, and further from the central track to the outer track, the push-pull signal in a S-letter shape zero-crossing at a position of the central track is obtained. In the case of such a manner of the arrangement that all of the tracks are the non-recording portions, the push-pull signal is not obtained. By appropriately select the manners of the arrangements of the recording portion and the non-recording portion, it is possible to prevent the push-pull signal from being averaged out or canceled when the push-pull signal passes through the low pass filter, even if the incidence probabilities of the recording and non-recording portions are equal to each other. For example, on one hand, in case that the central track is the non-recording portion, if the inner track is the recording portion, the push-pull signal having the negative (minus) value is obtained whether the outer track is the recording portion or the non-recording portion. On the other hand, in case that the central track is the non-recording portion, if the outer track is the recording portion, the push-pull signal having the positive (plus) value is obtained whether the inner track is the recording portion or the non-recording portion. Therefore, even if the push-pull signal is averaged by passing through the low pass filter, the push-pull signal in the S-letter shape can be obtained in the end. Further, even in case that the central track is the recording portion, the push-pull signal can be obtained in the similar manner, and the polarity of the push-pull signal in this case is in reverse to that in case that the central track is the non-recording portion.

In this way, by the signal acquiring device, the push-pull signal is acquired as the specific signal. Finally, on the basis of the judgment result of the recording and non-recording portions of at least the central track, by keeping the polarity of the push-pull signal as the specific signal constant in the polarity switching process, it is possible to generate the specific signal suitably usable as the tracking error signal, which is not averaged out when passing through the low pass filter.

In this manner, according to this aspect, it is possible to obtain the specific signal by use of an optical system having a rather simple construction. Thus, even if the track interval on the information record medium is smaller than the size of the light beam, it is possible to generate the tracking error signal with a low cost.

In another aspect of the first method of the present invention, the light irradiating process includes a process of irradiating the tracks with three light beams arranged in the radial direction, the light receiving process includes a process of receiving each of reflection lights from the tracks irradiated with the three light beams and generating three detection signals based on the received reflection lights respectively, the judging process includes a process of calculating a differential signal of the detection signals based on an inner one and an outer one of the three light beams, to thereby perform the judgment on the basis of a calculation result, the signal acquiring process includes a process of acquiring the detection signal based on a central one of the three light beams as the specific signal, and the polarity switching process includes a process of multiplying the detection signal based on a central one of the three light beams and the calculated differential signal, to thereby switch the polarity of the specific signal on the basis of a multiplication result.

According to this aspect, in the light irradiating process, the tracks are irradiated with three light beams arranged in the radial direction. Then, in the light receiving process, each of reflection lights from the tracks irradiated with the three light beams is received, and the three detection signals based on the received reflection lights are generated respectively. Then, in the judging process, the differential signal of the detection signals based on the inner and outer light beams is calculated, so that the judgment is performed on the basis of the calculation result. At this time, in case that the inner and outer tracks are the combination of the recording and non-recording portions, the detection signal based on the central beam is acquired as the specific signal which changes with following up the deviation of the central light beam, in the signal acquiring process. Thus, in this combination of the recording and non-recording portions, the differential signal of the detection signal based on the outer light beam and the detection signal based on the inner light beam becomes a signal which polarity is always plus or always minus. Therefore, the recording portion and the non-recording portion of the inner and outer tracks are distinguished by this differential signal.

In this way, in the signal acquiring process, the detection signal based on the central light beam is acquired as the specific signal. In the polarity switching process, the detection signal based on the central light beam is multiplied with the calculated differential signal, so that the polarity of the specific signal is switched over on the basis of the multiplication result.

Therefore, by keeping the polarity of the specific signal constant in accordance with the manner of the arrangement in the polarity switching process, it is possible to generate the specific signal suitably usable as the tracking error signal, which is not averaged out when passing through the low pass filter.

In this manner, according to this aspect, it is possible to surely perform the judgment and surely obtain the specific signal even if the track interval on the information record medium is smaller than the size of the light beam.

In another aspect of the first method of the present invention, the light irradiating process includes a process of irradiating the tracks with just one light beam, the light receiving process includes a process of receiving the reflection light from the tracks irradiated with the one light beam and generating a push-pull signal and one detection signal based on a light amount of the received reflection light as the detection signal, the judging process includes a process of performing the judgment of the recording portion and the non-recording portion on the tracks irradiated with the one light beam, on the basis of the generated push-pull signal, the signal acquiring process includes a process of acquiring the generated one detection signal as the specific signal, and the polarity switching process includes a process of multiplying the specific signal and the push-pull signal, to thereby switch the polarity of the specific signal on the basis of a multiplication result.

According to this aspect, in the light irradiating process, the tracks are irradiated with just one light beam. Then, in the light receiving process, the reflection light from the tracks is received, and the push-pull signal and the one detection signal are generated respectively. Then, in the judging process, the judgment of the recording portion and the non-recording portion on the tracks irradiated with the one light beam is performed, on the basis of at least the push-pull signal. At this time, the push-pull signal exceeds a predetermined threshold value with respect to a fine positional deviation in the radial direction of the light beam, in a case of such an arrangement that one of the adjacent track is the recording portion and another of the adjacent track is the non-recording portion, and the polarity of the push-pull signal is inverted depending on the arrangement thereof. Thus, by judging a case where the push-pull signal exceeds a plus threshold value or a minus threshold value, the manner of the arrangement in the above mentioned combination is selected.

On the other hand, in a case of the manner of the arrangement in the above mentioned combination, the one detection signal based on the reflection light amount from the track with respect to the one light beam is also a signal, which changing direction varies in correspondence with the deviation direction of the light beam, and the changing direction is also inverted in the same manner as the polarity of the push-pull signal.

In this way, in the signal acquiring process, the one detection signal is acquired as the specific signal. In the polarity switching process, the specified signal is multiplied with the push-pull signal, so that the polarity of the specific signal is switched over on the basis of the multiplication result. Namely, the polarity of the specific signal can be made same as the polarity of the push-pull signal.

Therefore, by keeping the polarity of the specific signal constant in accordance with the manner of the arrangement in the polarity switching process, it is possible to generate the specific signal suitably usable as the tracking error signal, which is not averaged out when passing through the low pass filter.

In this manner, according to this aspect, it is possible to perform the judgment by use of an optical system having a rather simple construction. Thus, even if the track interval on the information record medium is smaller than the size of the light beam, it is possible to generate the tracking error signal with a low cost.

The above object of the present invention can be also achieved by a first tracking error signal generating apparatus including: a light irradiating device for irradiating a plurality of tracks, which are on an information record medium and adjacent to each other with an interval smaller than a size of a light beam in a radial direction of the information record medium, with the light beam, while relatively moving the light beam in the radial direction and a tangential direction of the tracks with respect to the tracks; a light receiving device for receiving a reflection light from the tracks irradiated with the light beam, and generating a detection signal based on the received reflection light; a judging device for performing a judgment of a recording portion and a non-recording portion on at least one of the tracks irradiated with the light beam, on the basis of the detection signal; a signal acquiring device for acquiring a specific signal, which indicates a change of the detection signal in correspondence with a displacement in the radial direction of the light beam relative to the tracks and whose changing direction is varied depending on a direction of the displacement, on the basis of a judgment result by the judging device; and a polarity switching device for switching over a polarity of the specific signal on the basis of the judgment result.

According to the first apparatus of the present invention, by the light irradiating device, while the light beam is relatively moved in the radial direction and the tangential direction with respect to the tracks, the tracks, which are adjacent to each other with an interval smaller than the size of the light beam in the radial direction, are irradiated with the light beam. Then, by the light receiving device, the reflection light from the tracks irradiated with the light beam, is received, and the detection signal based on the received reflection light is generated. Then, by the judging device, the judgment of the recording portion and the non-recording portion on at least one of the tracks irradiated with the light beam, is performed on the basis of the detection signal. Then, by the signal acquiring device, the specific signal is acquired on the basis of the judgment result. Finally, by the polarity switching device, the polarity of the specific signal is switched over on the basis of the judgment result, so that the polarity of the specific signal be kept constant.

Therefore, in the same manner as the aforementioned first method of the present invention, according to the first apparatus of the present invention, it is possible to prevent the specific signal from being averaged when passing through a low pass filter. Thus, even if the track interval on the information record medium is smaller than the size of the light beam, it is possible to generate the tracking error signal after the specific signal passes through the low pass filter, so that it is possible to precisely perform the tracking servo control. Further, since it is possible to narrow the track interval, it is possible to improve the recording density of the information record medium such as an optical disk or the like.

In one aspect of the first apparatus of the present invention, the light irradiating device includes a device for irradiating the tracks with three light beams arranged in the radial direction, the light receiving device includes a device for receiving each of reflection lights from the tracks irradiated with the three light beams and generating three detection signals based on the received reflection lights respectively, the judging device includes a device for performing the judgment of the recording portion and the non-recording portion on the tracks irradiated with the three light beams, on the basis of at least the detection signals based on an inner one and an outer one of the three light beams, and the signal acquiring device includes a device for acquiring the detection signal based on a central one of the three light beams as the specific signal.

According to this aspect, by the light irradiating device, the tracks are irradiated with three light beams arranged in the radial direction. Then, by the light receiving device, each of reflection lights from the tracks irradiated with the three light beams is received, and the three detection signals based on the received reflection lights are generated respectively. Then, by the judging device, the judgment of the recording portion and the non-recording portion on the tracks irradiated with the three light beams is performed, on the basis of at least the detection signals based on the inner and outer light beams. Then, by the signal acquiring device, the detection signal based on the central light beam, which corresponds to the reflection light in case of the selected manner of the arrangement, is acquired as the specific signal. Finally, by the polarity switching device, the polarity of the specific signal is kept constant in accordance with the manner of the arrangement.

Therefore, according to this aspect, it is possible to surely perform the judgment and thereby obtain the specific signal even if the track interval on the information record medium is smaller than the size of the light beam.

In another aspect of the first apparatus of the present invention, the light irradiating device includes a device for irradiating the tracks with just one light beam, the light receiving device includes a device for receiving the reflection light from the tracks irradiated with the one light beam and generating a push-pull signal and one detection signal based on a light amount of the received reflection light as the detection signal, the judging device includes a device for performing the judgment of the recording portion and the non-recording portion on the tracks irradiated with the one light beam, on the basis of at least the generated push-pull signal, and the signal acquiring device includes a device for acquiring the generated one detection signal as the specific signal.

According to this aspect, by the light irradiating device, the tracks are irradiated with just one light beam. Then, by the light receiving device, the reflection light from the tracks is received, and the push-pull signal and the one detection signal are generated respectively. Then, by the judging device, the judgment of the recording portion and the non-recording portion on the tracks irradiated with the one light beam is performed, on the basis of at least the push-pull signal. Then, by the signal acquiring device, the specific signal which changes with following up the deviation of the light beam is acquired. Finally, by the polarity switching device, the polarity of the specific signal is kept constant on the basis of the polarity of the push-pull signal.

Therefore, according to this aspect, it is possible to perform the judgment by use of an optical system having a rather simple construction. Thus, even if the track interval on the information record medium is smaller than the size of the light beam, it is possible to generate the tracking error signal with a low cost.

In another aspect of the first apparatus of the present invention, the light irradiating device includes a device for irradiating the tracks with three light beams arranged in the radial direction, the light receiving device includes a device for receiving each of reflection lights from the tracks irradiated with the three light beams and generating three detection signals based on the received reflection lights respectively, the judging device includes a device for performing the judgment of the recording portion and the non-recording portion on the tracks irradiated with the three light beams, on the basis of at least the detection signal based on a central one of the three light beams, and the signal acquiring device includes a device for acquiring the detection signals based on an inner one and an outer one of the three light beams as the specific signal.

According to this aspect, by the light irradiating device, the tracks are irradiated with three light beams arranged in the radial direction. Then, by the light receiving device, each of reflection lights from the tracks irradiated with the three light beams is received, and the three detection signals based on the received reflection lights are generated respectively. Then, by the judging device, the judgment of the recording portion and the non-recording portion on the tracks irradiated with the three light beams is performed, on the basis of at least the detection signal based on the central light beam. Then, by the signal acquiring device, the detection signal obtained from the inner light beam and the detection signal obtained from the outer light beam is calculated, and the specific signal which changing direction varies with respect to the direction of the deviation of the light beams is acquired. Finally, by the polarity switching device, the changing direction of the specific signal is aligned in accordance with the judgment result of the recording or non-recording portion of the central track.

Therefore, according to this aspect, it is possible to surely perform the judgment and surely obtain the specific signal even if the track interval on the information record medium is smaller than the size of the light beam.

In another aspect of the first apparatus of the present invention, the light irradiating device includes a device for irradiating the tracks with just one light beam, the light receiving device includes a device for receiving the reflection light from the tracks irradiated with the one light beam and generating a push-pull signal and one detection signal based on a light amount of the received reflection light as the detection signal, the judging device includes a device for performing the judgment of the recording portion and the non-recording portion on the tracks irradiated with the one light beam, on the basis of at least the generated one detection signal, and the signal acquiring device includes a device for acquiring the generated push-pull signal as the specific signal.

According to this aspect, by the light irradiating device, the tracks are irradiated with just one light beam. Then, by the light receiving device, the reflection light from the tracks is received, and the push-pull signal and the one detection signal are generated respectively. Then, by the judging device, the judgment of the recording portion and the non-recording portion on the tracks irradiated with the one light beam is performed, on the basis of at least the one detection signal. Then, by the signal acquiring device, the generated push-pull signal is acquired as the specific signal. Finally, by the polarity switching device, on the basis of the judgment result of the recording and non-recording portions of at least the central track, the polarity of the push-pull signal as the specific signal is kept constant.

Therefore, according to this aspect, it is possible to obtain the specific signal by use of an optical system having a rather simple construction. Thus, even if the track interval on the information record medium is smaller than the size of the light beam, it is possible to generate the tracking error signal with a low cost.

In another aspect of the first apparatus of the present invention, the light irradiating device includes a device for irradiating the tracks with three light beams arranged in the radial direction, the light receiving device includes a device for receiving each of reflection lights from the tracks irradiated with the three light beams and generating three detection signals based on the received reflection lights respectively, the judging device includes a device for calculating a differential signal of the detection signals based on an inner one and an outer one of the three light beams, to thereby perform the judgment on the basis of a calculation result, the signal acquiring device includes a device for acquiring the detection signal based on a central one of the three light beams as the specific signal, and the polarity switching device includes a device for multiplying the detection signal based on a central one of the three light beams and the calculated differential signal, to thereby switch the polarity of the specific signal on the basis of a multiplication result.

According to this aspect, by the light irradiating device, the tracks are irradiated with three light beams arranged in the radial direction. Then, by the light receiving device, each of reflection lights from the tracks irradiated with the three light beams is received, and the three detection signals based on the received reflection lights are generated respectively. Then, by the judging device, the differential signal of the detection signals based on the inner and outer light beams is calculated, so that the judgment is performed on the basis of the calculation result. Then, by the signal acquiring device, the detection signal based on the central light beam is acquired as the specific signal. Finally, by the polarity switching device, the detection signal based on the central light beam is multiplied with the calculated differential signal, so that the polarity of the specific signal is switched over on the basis of the multiplication result, and that the polarity of the specific signal is kept constant in accordance with the manner of the arrangement.

Therefore, according to this aspect, it is possible to surely perform the judgment and surely obtain the specific signal even if the track interval on the information record medium is smaller than the size of the light beam.

In another aspect of the first apparatus of the present invention, the light irradiating device includes a device for irradiating the tracks with just one light beam, the light receiving device includes a device for receiving the reflection light from the tracks irradiated with the one light beam and generating a push-pull signal and one detection signal based on a light amount of the received reflection light as the detection signal, the judging device includes a device for performing the judgment of the recording portion and the non-recording portion on the tracks irradiated with the one light beam, on the basis of the generated push-pull signal, the signal acquiring device includes a device for acquiring the generated one detection signal as the specific signal, and the polarity switching device includes a device for multiplying the specific signal and the push-pull signal, to thereby switch the polarity of the specific signal on the basis of a multiplication result.

According to this aspect, by the light irradiating device, the tracks are irradiated with just one light beam. Then, by the light receiving device, the reflection light from the tracks is received, and the push-pull signal and the one detection signal are generated respectively. Then, by the judging device, the judgment of the recording portion and the non-recording portion on the tracks irradiated with the one light beam is performed, on the basis of at least the push-pull signal. Then, by the signal acquiring device, the one detection signal is acquired as the specific signal. Finally, by the polarity switching device, the specified signal is multiplied with the push-pull signal, so that the polarity of the specific signal is switched over on the basis of the multiplication result. Namely, the polarity of the specific signal can be made same as the polarity of the push-pull signal, so that the polarity of the specific signal is kept constant in accordance with the manner of the arrangement.

Therefore, according to this aspect, it is possible to perform the judgment by use of an optical system having a rather simple construction. Thus, even if the track interval on the information record medium is smaller than the size of the light beam, it is possible to generate the tracking error signal with a low cost.

The above object of the present invention can be also achieved by a second tracking error signal generating method including: a light irradiating process of irradiating a plurality of tracks, which are on an information record medium and adjacent to each other with an interval smaller than a size of a light beam in a radial direction of the information record medium, with the light beam, while relatively moving the light beam in the radial direction and a tangential direction of the tracks with respect to the tracks; an image-forming process of image-forming a real image of a portion of the tracks, which is irradiated with the light beam on the information record medium, on a predetermined plane by a reflection light from the irradiated portion; a light receiving process of receiving the reflection light from the irradiated portion at a detection surface positioned on the predetermined plane to detect the real image, and generating a detection signal based on the detected real image of at least one of the tracks; a judging process of performing a judgment of a recording portion and a non-recording portion on the at least one of the tracks, on the basis of the detection signal; a signal acquiring process of acquiring a specific signal, which is changed with following up a deviation in the radial direction of the real image on the predetermined plane and whose changing direction is varied depending on a direction of the deviation, on the basis of a judgment result by the judging process; and a polarity switching process of switching over a polarity of the specific signal on the basis of the judgment result.

According to the second method of the present invention, in the light irradiating process, while the light beam is relatively moved in the radial direction and the tangential direction with respect to the tracks, the tracks, which are adjacent to each other with an interval smaller than the size of the light beam in the radial direction, are irradiated with the light beam. Then, in the image forming process, the real image of at least one of the tracks is image-formed on the predetermined plane. Then, in the light receiving process, the reflection light from the irradiation portion at the detection surface positioned on the predetermined plane is received, so that the real image is detected. Further, in the light receiving process, the detection signal based on the detected real image is generated. Here, the intensity or amount of the detection signal varies depending on the pattern of the real image of the track i.e., whether the real image of the track is the recording portion or the non-recording portion. Namely, if the real image of the track is deviated from the light detection surface, depending on the manner of the arrangement of the recording portion (e.g., a pit or pits) which is observed as a black or dark portion on the light detection surface and the non-recording portion (e.g., a mirror or mirrors) which is observed as a white or bright portion on the light detection surface, the manner of the change of the light amount of the reflection light due to the deviation of the real image in the radial direction is determined.

Therefore, in the judging process, the judgment of the recording portion and the non-recording portion on at least one of the tracks irradiated with the light beam, is performed on the basis of the detection signal. Then, in the signal acquiring process, the specific signal is acquired on the basis of the judgment result. Here, the specific signal is a signal which is changed with following up a displacement or deviation in the radial direction of the real image on the predetermined plane, and that, whose changing direction is varied depending on a direction of the deviation. Namely, on the basis of the judgment result, the manner of the arrangement of the recording portion and the non-recording portion to obtain such a specific signal is selected, so that the specific signal based on this selected manner of the arrangement is acquired. This manner of the arrangement to obtain such a specific signal can be selected in not only a case where the recording portion and the non recording portion of the real images of all tracks, which includes the real image corresponding to the track to be presently irradiated with the light beam and the real image corresponding to the adjacent track or tracks thereto, are distinguishable, but also a case where the recording portion and the non-recording portion of the real image of just one of the tracks are distinguishable. The reason of this is as following.

Namely, since the incidence probabilities of the recording portion and the non-recording portion on each of the tracks are substantially equal to each other, the average value of the detection signals obtained from the real image of each track is equal to an intermediate value between the value of the detection signal obtained from the recording portion and the value of the detection signal obtained from the non-recording portion. By contrast, from the real image of the track on which the recording portion and the non-recording portion are distinguishable, the value of the signal of either the recording portion or the non-recording portion is obtained. Accordingly, as the recording portion and the non-recording portion of the real image of each of the track are distinguished, it is possible to determine the changing direction of the detection signal due to the deviation with respect to the light detection surface between the real image of the track to be presently irradiated with the light beam and the real image of the adjacent track or tracks thereto.

On the other hand, if the manner of the arrangement of the recording portion and the non-recording portion is inverted, the changing direction of the specific signal (which is acquired in the signal acquiring process) with respect to the deviation is also inverted correspondingly. And that, since the incidence probabilities of the recording portion and the non-recording portion of the real image of each track are equal to each other, the specific signal corresponding to the recording portion and the specific signal corresponding to the non-recording portion have the changing direction reverse to each other.

Therefore, in the polarity switching process, the polarity of the specific signal is switched over on the basis of the judgment result as for the real image of at least one track, so that the polarity of the specific signal be kept constant (i.e., either plus or minus).

In this manner, according to the second method of the present invention, it is possible to prevent the specific signal from being averaged when passing through a low pass filter. Thus, even if the track interval on the information record medium is smaller than the size of the light beam, it is possible to generate the tracking error signal after the specific signal passes through the low pass filter, so that it is possible to precisely perform the tracking servo control. Further, since it is possible to narrow the track interval, it is possible to improve the recording density of the information record medium such as an optical disk or the like. Moreover, since the light detection surface of the reflected light is coincident with the image-forming surface, the information of plural tracks can be easily read out simultaneously, so that the information recorded as high density can be reproduced at a high transfer rate.

In one aspect of the second method of the present invention, the light receiving process includes a process of receiving the reflection light at three light detection portions arranged in the radial direction on the predetermined plane, and generating the detection signals based on the real image of the tracks detected by the three light detection portions, the judging process includes a process of performing the judgment of the recording portion and the non-recording portion of the real image of the tracks, on the basis of the detection signals of at least an outer one and an inner one of the three light detection portions, and the signal acquiring process includes a process of acquiring the detection signal detected by a central one of the three light detection portions as the specific signal.

According to this aspect, when the real image of at least one of the tracks is image-formed on the predetermined plane, the reflection light is received at the three light detection portions arranged in the radial direction on the predetermined plane, in the light receiving process. Then, the detection signals based on the real image of the tracks detected by the three light detection portions are generated respectively. Then, in the judging process, the judgment of the recording portion and the non-recording portion of the real image of the tracks irradiated with the three light beams is performed, on the basis of the detection signals of at least the outer and inner light detection portions. At this time, since the large/small relationship between the detection signal based on real image of the inner track and the detection signal based on the real image of the outer track varies depending on whether the real image of the track is the recording portion or the non-recording portion, the judgment of the recording portion and the non-recording portion is performed on the basis of these detection signals based on the real images of the inner and outer tracks. If the manner of the arrangement of the recording portion and the non-recording portion of the real images of the inner and outer tracks is recognized, the changing direction of the detection signal with respect to the deviation of the real image of the track from the light detection surface is also recognized, so that the manner of the arrangement to obtain the specific signal (which changes with following up the deviation of the real image) is selected from among these manners of the arrangements. Then, in the signal acquiring process, the detection signal based on the reflection light, which image-forms the real image of the central track in case of the selected manner of the arrangement, is acquired as the specific signal.

Therefore, by keeping the polarity of the specific signal constant in accordance with the manner of the arrangement in the polarity switching process, it is possible to generate the specific signal suitably usable as the tracking error signal, which is not averaged out when passing through the low pass filter.

In this manner, according to this aspect, it is possible to surely perform the judgment and surely obtain the specific signal even if the track interval on the information record medium is smaller than the size of the light beam. Moreover, since the light detection surface of the reflected light is coincident with the image-forming surface, the judgment can be easily performed.

In another aspect of the second method of the present invention, the light receiving process includes a process of generating one detection signal based on the real image of one track detected by one light detection portion positioned on the predetermined plane, and generating a first differential signal of two detection signals obtained at two light detection portions for receiving an inner portion and an outer portion of the real image of the one track with respect to a center of the one track respectively, the judging process includes a process of performing the judgment of the recording portion and the non-recording portion of the real image, on the basis of at least the first differential signal, and the signal acquiring process includes a process of acquiring the one detection signal as the specific signal.

According to this aspect, when the real image of one track is image-formed on the predetermined plane, this real image is detected by one light detection portion on the predetermined plane, in the light receiving process. Then, one detection signal, which is based on this real image of the one track, and the first differential signal of two detection signals, which are respectively obtained at two light detection portions for receiving the inner and outer portions of the real image of the one track with respect to the center of the one track, are generated. Then, in the judging process, the judgment of the recording portion and the non-recording portion of the real image is performed, on the basis of at least the first differential signal. At this time, the first differential signal exceeds a predetermined threshold value with respect to a fine positional deviation in the radial direction of the real image of the track relative to the light detection surface, in a case of such an arrangement that the real image of the adjacent track is the recording portion and the real image of the adjacent track is the non-recording portion, and the polarity of the first differential signal is inverted depending on the arrangement thereof. Thus, by judging a case where the first differential signal exceeds a plus threshold value or a minus threshold value, the manner of the arrangement in the above mentioned combination is selected.

On the other hand, in a case of the manner of the arrangement in the above mentioned combination, the one detection signal based on the real image detected by the one light detection portion is also a signal, which changing direction varies in correspondence with the deviation direction of the real image, and the changing direction is also inverted in the same manner as the polarity of the first differential signal. Then, by selecting the manner of the arrangement of the recording portion and the non-recording portion with respect to which the first differential signal exceeds the predetermined threshold value, the specific signal which changes with following up the deviation of the real image is acquired in the signal acquiring process.

Therefore, by keeping the polarity of the specific signal constant on the basis of the polarity of the first differential signal in the polarity switching process, it is possible to generate the specific signal suitably usable as the tracking error signal, which is not averaged out when passing through the low pass filter.

In this manner, according to this aspect, it is possible to perform the judgment by use of an optical system having a rather simple construction. Thus, even if the track interval on the information record medium is smaller than the size of the light beam, it is possible to generate the tracking error signal with a low cost.

In another aspect of the second method of the present invention, the light receiving process includes a process of receiving the reflection light at three light detection portions arranged in the radial direction on the predetermined plane, and generating the detection signals based on the real image of the tracks detected by the three light detection portions, the judging process includes a process of performing the judgment of the recording portion and the non-recording portion of the real image of the tracks, on the basis of the detection signal of at least a central one of the three light detection portions, and the signal acquiring process includes a process of acquiring the detection signal detected by an outer one and an inner one of the three light detection portions as the specific signal.

According to this aspect, when the real image of at least one of the tracks is image-formed on the predetermined plane, the reflection light is received at the three light detection portions arranged in the radial direction on the predetermined plane, in the light receiving process. Then, the detection signals based on the real image of the tracks detected by the three light detection portions are generated respectively. Then, in the judging process, the judgment of the recording portion and the non-recording portion of the real image of the central track is performed, on the basis of the detection signal of at least the central light detection portion. At this time, the recording portion and the non-recording portion of the inner and outer tracks cannot be distinguished. However, since the incidence probabilities of these portions are equal on each track, if the detection signals based on the three light beams of all the recording and non-recording portions of the real image of an arbitrary track pass through the low pass filter, the detection signals are averaged out to have an intermediate value between the value in the case of the recording portion and the value in the case of the non-recording portion.

Then, assuming that the direction of the deviation of the real image relative to the light detection surface is from the side of the real image of the central track toward the side of the real image of the outer track, the real image of the inner track is moved from the side of the real image of the inner track toward the side of the real image of the central track. Therefore, as the recording and non-recording portions of the real image of this central track are distinguishable, the detection signal based on the real image of the inner track, which is obtained by the inner light detection surface, changes from the intermediate value to a specific value corresponding to either the recording portion or the non-recording portion. On the other hand, if the deviation direction of the real image is in reverse, the detection signal based on the real image of the outer track, which is obtained by the outer light detection surface, changes from the intermediate value to this specific value in the same manner. Since the changing direction of the detection signals due to the deviation of the real image, which are obtained by the outer light detection surface and by the inner light detection surface, are reverse to each other, by calculating the detection signal obtained by the inner light detection surface and the detection signal obtained by the outer light detection surface, the specific signal which changing direction varies with respect to the direction of the deviation of the real image is acquired in the signal acquiring process.

Further, the changing direction of the specific signal acquired in this manner is different between in a case where the real image of the central track is the recording portion and in a case where the real image of the central track is the non-recording portion. Thus, by aligning the changing direction of the specific signal in accordance with the judgment result of the recording or non-recording portion of the real image of the central track, in the polarity switching process, it is possible to generate the specific signal suitably usable as the tracking error signal, which is not averaged out when passing through the low pass filter.

In this manner, according to this aspect, it is possible to surely perform the judgment and surely obtain the specific signal even if the track interval on the information record medium is smaller than the size of the light beam.

In another aspect of the second method of the present invention, the light receiving process includes a process of generating one detection signal based on the real image of one track detected by one light detection portion positioned on the predetermined plane, and generating a first differential signal of two detection signals obtained at two light detection portions for receiving an inner portion and an outer portion of the real image of the one track with respect to a center of the one track respectively, the judging process includes a process of performing the judgment of the recording portion and the non-recording portion of the real image, on the basis of at least the one detection signal, and the signal acquiring process includes a process of acquiring the first differential signal as the specific signal.

According to this aspect, when the real image of one track is image-formed on the predetermined plane, this real image is detected by one light detection portion on the predetermined plane, in the light receiving process. Then, one detection signal, which is based on this real image of the one track, and the first differential signal of two detection signals, which are respectively obtained at two light detection portions for receiving the inner and outer portions of the real image of the one track with respect to the center of the one track, are generated. Then, in the judging process, the judgment of the recording portion and the non-recording portion of the real image is performed, on the basis of at least the one detection signal.

Here, the first differential signal exceeds a predetermined threshold value with respect to a fine positional deviation in the radial direction of the real image, in a case of such an arrangement that the real image of one adjacent track is the recording portion and the real image of another adjacent track is the non-recording portion, and the polarity of the first differential signal is inverted depending on the arrangement thereof. For example, in the case of such a manner of the arrangement that the real image of the central track is the non-recording portion and the real image of the outer track is the recording portion, the first differential signal has a positive (plus) value, while, in the case of such a manner of the arrangement that the real image of the central track is the recording portion and the real image of the outer track is the non-recording portion, the first differential signal has a negative (minus) value. In the case of such a manner of the arrangement that the recording portion and the non-recording portion appear alternatively with respect to the radial direction from the real image of the inner track to the real image of the central track, and further from the real image of the central track to the real image of the outer track, the first differential signal in a S-letter shape zero-crossing at a position of the central track is obtained. In the case of such a manner of the arrangement that all of the real images of the tracks are the non-recording portions, the first differential signal is not obtained. By appropriately select the manners of the arrangements of the recording portion and the non-recording portion, it is possible to prevent the first differential signal from being averaged out or canceled when the first differential signal passes through the low pass filter, even if the incidence probabilities of the recording and non-recording portions are equal to each other. For example, on one hand, in case that the real image of the central track is the non-recording portion, if the real image of the inner track is the recording portion, the first differential signal having the negative (minus) value is obtained whether the real image of the outer track is the recording portion or the non-recording portion. On the other hand, in case that the real image of the central track is the non-recording portion, if the real image of the outer track is the recording portion, the first differential signal having the positive (plus) value is obtained whether the real image of the inner track is the recording portion or the non-recording portion. Therefore, even if the first differential signal is averaged by passing through the low pass filter, the first differential signal in the S-letter shape can be obtained in the end. Further, even in case that the real image of the central track is the recording portion, the first differential signal can be obtained in the similar manner, and the polarity of the first differential signal in this case is in reverse to that in case that the real image of the central track is the non-recording portion.

In this way, by the signal acquiring device, the first differential signal is acquired as the specific signal. Finally, on the basis of the judgment result of the recording and non-recording portions of at least the real image of the central track, by keeping the polarity of the first differential signal as the specific signal constant in the polarity switching process, it is possible to generate the specific signal suitably usable as the tracking error signal, which is not averaged out when passing through the low pass filter.

In this manner, according to this aspect, it is possible to obtain the specific signal by use of an optical system having a rather simple construction. Thus, even if the track interval on the information record medium is smaller than the size of the light beam, it is possible to generate the tracking error signal with a low cost.

In another aspect of the second method of the present invention, the light receiving process includes a process of receiving the reflection light at three light detection portions arranged in the radial direction on the predetermined plane, and generating the detection signals based on the real image of the tracks detected by the three light detection portions, the judging process includes a process of calculating a second differential signal of the detection signals detected by an inner one and an outer one of the three light detection portions, to thereby perform the judgment on the basis of a calculation result, the signal acquiring process includes a process of acquiring the detection signal detected by a central one of the three light detection portions as the specific signal, and the polarity switching process includes a process of multiplying the detection signal detected by the central one of the three light detection portions and the calculated second differential signal, to thereby switch the polarity of the specific signal on the basis of a multiplication result.

According to this aspect, when the real image of at least one of the tracks is image-formed on the predetermined plane, the reflection light is received at the three light detection portions arranged in the radial direction on the predetermined plane, in the light receiving process. Then, the detection signals based on the real image of the tracks detected by the three light detection portions are generated respectively. Then, in the judging process, the second differential signal of the detection signals based on the inner and outer light detection portions is calculated, so that the judgment is performed on the basis of the calculation result. At this time, in case that the real images of the tracks detected by the inner and outer light detection portions are the combination of the recording and non-recording portions, the detection signal detected by the central light detection portion is acquired as the specific signal which changes with following up the deviation of the real image of the track detected by the central light detection portion, in the signal acquiring process. Thus, in this combination of the recording and non-recording portions, the second differential signal becomes a signal which polarity is always plus or always minus. Therefore, the recording portion and the non-recording portion of the real images of the tracks detected by the inner and outer light detection portions are distinguished by this second differential signal.

In this way, in the signal acquiring process, the detection signal detected by the central light detection portion is acquired as the specific signal. In the polarity switching process, the detection signal detected by the central light detection portion is multiplied with the calculated second differential signal, so that the polarity of the specific signal is switched over on the basis of the multiplication result.

Therefore, by keeping the polarity of the specific signal constant in accordance with the manner of the arrangement in the polarity switching process, it is possible to generate the specific signal suitably usable as the tracking error signal, which is not averaged out when passing through the low pass filter.

In this manner, according to this aspect, it is possible to surely perform the judgment and surely obtain the specific signal even if the track interval on the information record medium is smaller than the size of the light beam.

In another aspect of the second method of the present invention, the light receiving process includes a process of generating one detection signal based on the real image of one track detected by one light detection portion positioned on the predetermined plane, and generating a first differential signal of two detection signals obtained at two light detection portions for receiving an inner portion and an outer portion of the real image of the one track with respect to a center of the one track respectively, the judging process includes a process of performing the judgment of the recording portion and the non-recording portion of the real image of the one track, on the basis of the first differential signal, the signal acquiring process includes a process of acquiring the one detection signal as the specific signal, and the polarity switching process includes a process of multiplying the specific signal and the first differential signal, to thereby switch the polarity of the specific signal on the basis of a multiplication result.

According to this aspect, when the real image of one track is image-formed on the predetermined plane, this real image is detected by one light detection portion on the predetermined plane, in the light receiving process. Then, one detection signal, which is based on this real image of the one track, and the first differential signal of two detection signals, which are respectively obtained at two light detection portions for receiving the inner and outer portions of the real image of the one track with respect to the center of the one track, are generated. Then, in the judging process, the judgment of the recording portion and the non-recording portion of the real image is performed, on the basis of at least the first differential signal.

Here, the first differential signal exceeds a predetermined threshold value with respect to a fine positional deviation in the radial direction of the real image, in a case of such an arrangement that the real image of one adjacent track is the recording portion and the real image of another adjacent track is the non-recording portion, and the polarity of the first differential signal is inverted depending on the arrangement thereof. Thus, by judging a case where the first differential signal exceeds a plus threshold value or a minus threshold value, the manner of the arrangement in the above mentioned combination is selected.

On the other hand, in a case of the manner of the arrangement in the above mentioned combination, the detection signal based on the real image of the track corresponding to the one light detection portion is also a signal, which changing direction varies in correspondence with the deviation direction of the real image, and the changing direction is also inverted in the same manner as the polarity of the first differential signal.

In this way, in the signal acquiring process, the one detection signal is acquired as the specific signal. In the polarity switching process, the specified signal is multiplied with the first differential signal, so that the polarity of the specific signal is switched over on the basis of the multiplication result. Namely, the polarity of the specific signal can be made same as the polarity of the first differential signal.

Therefore, by keeping the polarity of the specific signal constant in accordance with the manner of the arrangement in the polarity switching process, it is possible to generate the specific signal suitably usable as the tracking error signal, which is not averaged out when passing through the low pass filter.

In this manner, according to this aspect, it is possible to perform the judgment by use of an optical system having a rather simple construction. Thus, even if the track interval on the information record medium is smaller than the size of the light beam, it is possible to generate the tracking error signal with a low cost.

The above object of the present invention can be also achieved by a second tracking error signal generating apparatus including: a light irradiating device for irradiating a plurality of tracks, which are on an information record medium and adjacent to each other with an interval smaller than a size of a light beam in a radial direction of the information record medium, with the light beam, while relatively moving the light beam in the radial direction and a tangential direction of the tracks with respect to the tracks;

an image-forming device for image-forming a real image of a portion of the tracks, which is irradiated with the light beam on the information record medium, on a predetermined plane by a reflection light from the irradiated portion; a light receiving device for receiving the reflection light from the irradiated portion at a detection surface positioned on the predetermined plane to detect the real image, and generating a detection signal based on the detected real image of at least one of the tracks; a judging device for performing a judgment of a recording portion and a non-recording portion on the at least one of the tracks, on the basis of the detection signal; a signal acquiring device for acquiring a specific signal, which is changed with following up a deviation in the radial direction of the real image on the predetermined plane and whose changing direction is varied depending on a direction of the deviation, on the basis of a judgment result by the judging device; and a polarity switching device for switching over a polarity of the specific signal on the basis of the judgment result.

According to the second apparatus of the present invention, by the light irradiating device, while the light beam is relatively moved in the radial direction and the tangential direction, the tracks, which are adjacent to each other with an interval smaller than the size of the light beam in the radial direction, are irradiated with the light beam. Then, by the image forming device, the real image of at least one of the tracks is image-formed on the predetermined plane. Then, by the light receiving device, the reflection light from the irradiation portion at the detection surface positioned on the predetermined plane is received, so that the real image is detected. Further, by the light receiving device, the detection signal based on the detected real image is generated. Then, by the judging device, the judgment of the recording portion and the non-recording portion on at least one of the tracks irradiated with the light beam, is performed on the basis of the detection signal. Then, by the signal acquiring device, the specific signal is acquired on the basis of the judgment result. Finally, by the polarity switching device, the polarity of the specific signal is switched over on the basis of the judgment result as for the real image of at least one track, so that the polarity of the specific signal be kept constant.

Therefore, in the same manner as the aforementioned second method of the present invention, according to the second apparatus of the present invention, it is possible to prevent the specific signal from being averaged when passing through a low pass filter. Thus, even if the track interval on the information record medium is smaller than the size of the light beam, it is possible to generate the tracking error signal after the specific signal passes through the low pass filter, so that it is possible to precisely perform the tracking servo control. Further, since it is possible to narrow the track interval, it is possible to improve the recording density of the information record medium such as an optical disk or the like. Moreover, since the light detection surface of the reflected light is coincident with the image-forming surface, the information of plural tracks can be easily read out simultaneously, so that the information recorded as high density can be reproduced at a high transfer rate.

In one aspect of the second apparatus of the present invention, the light receiving device includes a device for receiving the reflection light at three light detection portions arranged in the radial direction on the predetermined plane, and generating the detection signals based on the real image of the tracks detected by the three light detection portions, the judging device includes a device for performing the judgment of the recording portion and the non-recording portion of the real image of the tracks, on the basis of the detection signals of at least an outer one and an inner one of the three light detection portions, and the signal acquiring device includes a device for acquiring the detection signal detected by a central one of the three light detection portions as the specific signal.

According to this aspect, when the real image of at least one of the tracks is image-formed on the predetermined plane, the reflection light is received at the three light detection portions, by the light receiving device. Then, the detection signals based on the real image of the tracks detected by the three light detection portions are generated respectively. Then, by the judging device, the judgment of the recording portion and the non-recording portion of the real image of the tracks is performed, on the basis of the detection signals of at least the outer and inner light detection portions. Then, by the signal acquiring device, the detection signal based on the reflection light, which image-forms the real image of the central track in case of the selected manner of the arrangement, is acquired as the specific signal. Finally, by the polarity switching device, the polarity of the specific signal is switched over in accordance with the manner of the arrangement.

Therefore, according to this aspect, it is possible to surely perform the judgment and surely obtain the specific signal even if the track interval on the information record medium is smaller than the size of the light beam. Moreover, since the light detection surface of the reflected light is coincident with the image-forming surface, the judgment can be easily performed.

In another aspect of the second apparatus of the present invention, the light receiving device includes a device for generating one detection signal based on the real image of one track detected by one light detection portion positioned on the predetermined plane, and generating a first differential signal of two detection signals obtained at two light detection portions for receiving an inner portion and an outer portion of the real image of the one track with respect to a center of the one track respectively, the judging device includes a device for performing the judgment of the recording portion and the non-recording portion of the real image, on the basis of at least the first differential signal, and the signal acquiring device includes a device for acquiring the one detection signal as the specific signal.

According to this aspect, when the real image of one track is image-formed on the predetermined plane, this real image is detected by the one light detection portion, by the light receiving device. Then, the one detection signal, which is based on this real image of the one track, and the first differential signal of two detection signals, which are respectively obtained at the two light detection portions for receiving the inner and outer portions of the real image of the one track with respect to the center of the one track, are generated. Then, by the judging device, the judgment of the recording portion and the non-recording portion of the real image is performed, on the basis of at least the first differential signal. Then, by the signal acquiring device, the specific signal which changes with following up the deviation of the real image is acquired. Finally, by the polarity switching device, the polarity of the specific signal is switched over in accordance with the manner of the arrangement.

Therefore, according to this aspect, it is possible to perform the judgment by use of an optical system having a rather simple construction. Thus, even if the track interval on the information record medium is smaller than the size of the light beam, it is possible to generate the tracking error signal with a low cost.

In another aspect of the second apparatus of the present invention, the light receiving device includes a device for receiving the reflection light at three light detection portions arranged in the radial direction on the predetermined plane, and generating the detection signals based on the real image of the tracks detected by the three light detection portions, the judging device includes a device for performing the judgment of the recording portion and the non-recording portion of the real image of the tracks, on the basis of the detection signal of at least a central one of the three light detection portions, and the signal acquiring device includes a device for acquiring the detection signal detected by an outer one and an inner one of the three light detection portions as the specific signal.

According to this aspect, when the real image of at least one of the tracks is image-formed on the predetermined plane, the reflection light is received at the three light detection portions, by the light receiving device. Then, the detection signals based on the real image of the tracks detected by the three light detection portions are generated respectively. Then, by the judging device, the judgment of the recording portion and the non-recording portion of the real image of the central track is performed, on the basis of the detection signal of at least the central light detection portion. Then, by the signal acquiring device, the specific signal which changing direction varies with respect to the direction of the deviation of the real image is acquired. Finally, by the polarity switching device, the polarity of the specific signal is switched over in accordance with the manner of the arrangement.

Therefore, according to this aspect, it is possible to surely perform the judgment and surely obtain the specific signal even if the track interval on the information record medium is smaller than the size of the light beam.

In another aspect of the second apparatus of the present invention, the light receiving device includes a device for generating one detection signal based on the real image of one track detected by one light detection portion positioned on the predetermined plane, and generating a first differential signal of two detection signals obtained at two light detection portions for receiving an inner portion and an outer portion of the real image of the one track with respect to a center of the one track respectively, the judging device includes a device for performing the judgment of the recording portion and the non-recording portion of the real image, on the basis of at least the one detection signal, and the signal acquiring device includes a device for acquiring the first differential signal as the specific signal.

According to this aspect, when the real image of one track is image-formed on the predetermined plane, this real image is detected by the one light detection portion, by the light receiving device. Then, the one detection signal, which is based on this real image of the one track, and the first differential signal of two detection signals, which are respectively obtained at two light detection portions for receiving the inner and outer portions of the real image of the one track with respect to the center of the one track, are generated. Then, by the judging device, the judgment of the recording portion and the non-recording portion of the real image is performed, on the basis of at least the one detection signal. Then, by the signal acquiring device, the first differential signal is acquired as the specific signal. Finally, by the polarity switching device, the polarity of the specific signal is switched over in accordance with the manner of the arrangement.

Therefore, according to this aspect, it is possible to obtain the specific signal by use of an optical system having a rather simple construction. Thus, even if the track interval on the information record medium is smaller than the size of the light beam, it is possible to generate the tracking error signal with a low cost.

In another aspect of the second apparatus of the present invention, the light receiving device includes a device for receiving the reflection light at three light detection portions arranged in the radial direction on the predetermined plane, and generating the detection signals based on the real image of the tracks detected by the three light detection portions, the judging device includes a device for calculating a second differential signal of the detection signals detected by an inner one and an outer one of the three light detection portions, to thereby perform the judgment on the basis of a calculation result, the signal acquiring device includes a device for acquiring the detection signal detected by a central one of the three light detection portions as the specific signal, and the polarity switching device includes a device for multiplying the detection signal detected by the central one of the three light detection portions and the calculated second differential signal, to thereby switch the polarity of the specific signal on the basis of a multiplication result.

According to this aspect, when the real image of at least one of the tracks is image-formed on the predetermined plane, the reflection light is received at the three light detection portions, by the light receiving device. Then, the detection signals based on the real image of the tracks detected by the three light detection portions are generated respectively. Then, by the judging device, the second differential signal of the detection signals based on the inner and outer light detection portions is calculated, so that the judgment is performed on the basis of the calculation result. Then, by the signal acquiring device, the detection signal detected by the central light detection portion is acquired as the specific signal. Finally, by the polarity switching device, the polarity of the specific signal is switched over in accordance with the manner of the arrangement.

Therefore, according to this aspect, it is possible to surely perform the judgment and surely obtain the specific signal even if the track interval on the information record medium is smaller than the size of the light beam.

In another aspect of the second apparatus of the present invention, the light receiving device includes a device for generating one detection signal based on the real image of one track detected by one light detection portion positioned on the predetermined plane, and generating a first differential signal of two detection signals obtained at two light detection portions for receiving an inner portion and an outer portion of the real image of the one track with respect to a center of the one track respectively, the judging device includes a device for performing the judgment of the recording portion and the non-recording portion of the real image of the one track, on the basis of the first differential signal, the signal acquiring device includes a device for acquiring the one detection signal as the specific signal, and the polarity switching device includes a device for multiplying the specific signal and the first differential signal, to thereby switch the polarity of the specific signal on the basis of a multiplication result.

According to this aspect, when the real image of one track is image-formed on the predetermined plane, this real image is detected by the one light detection portion, by the light receiving device. Then, the one detection signal, which is based on this real image of the one track, and the first differential signal of two detection signals, which are respectively obtained at two light detection portions for receiving the inner and outer portions of the real image of the one track with respect to the center of the one track, are generated. Then, by the judging device, the judgment of the recording portion and the non-recording portion of the real image is performed, on the basis of at least the first differential signal. Then, by the signal acquiring device, the one detection signal is acquired as the specific signal. Finally, by the polarity switching device, the polarity of the specific signal is switched over in accordance with the manner of the arrangement.

Therefore, according to this aspect, it is possible to perform the judgment by use of an optical system having a rather simple construction. Thus, even if the track interval on the information record medium is smaller than the size of the light beam, it is possible to generate the tracking error signal with a low cost.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 11 is a list diagram showing the pit and mirror patterns for judgment and the judgment results thereof by the circuit in FIG. 10;

FIG. 13 is a list diagram showing the pit and mirror patterns for judgment and the judgment results thereof by the circuit in FIG. 12;

FIG. 17 is a list diagram showing the pit and mirror patterns for judgment and the judgment results thereof by the circuit in FIG. 16;

FIG. 19 is a list diagram showing the pit and mirror patterns for judgment and the judgment results thereof by the circuit in FIG. 18;

DETAILED DESCRIPTION OF THE PREFERRED EMBODIMENTS

Figure 1:
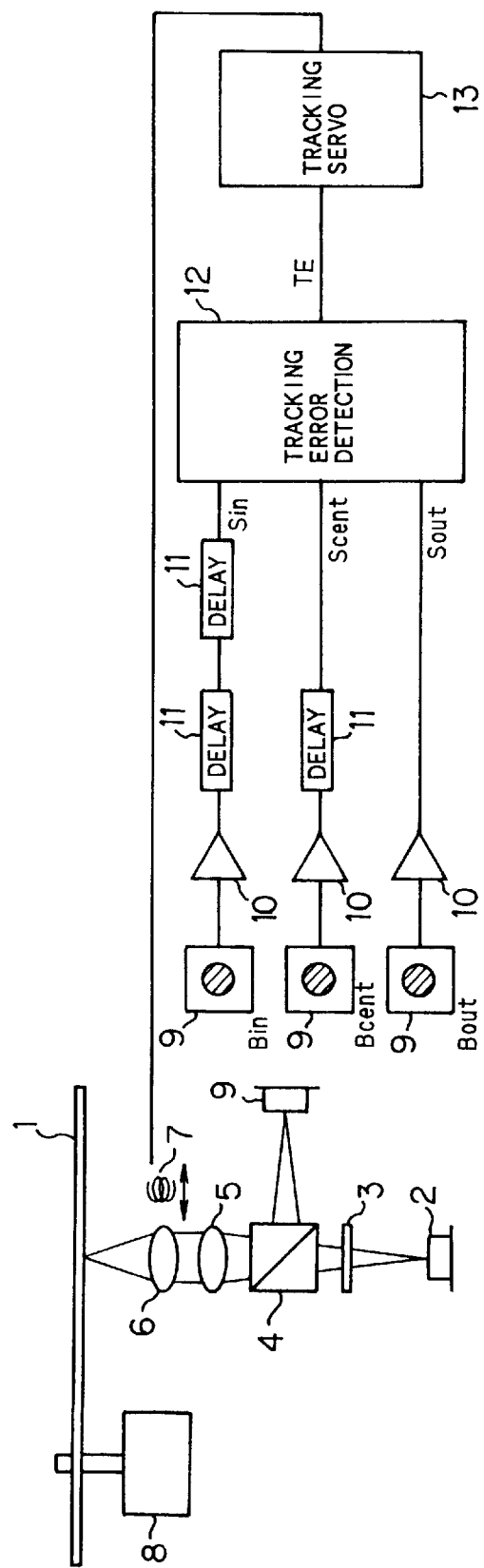
FIG. 1 is a block diagram showing a constitution of an optical disk reproducing apparatus for realizing a tracking error signal generating method according to a first embodiment of the invention.

Referring now to the drawings, embodiments of the invention are described in detail below.

(1) First embodiment

To begin with, a first embodiment of the invention is described with referring to FIGS. 1 to 15.

FIG. 1 is a block diagram showing a constitution of an optical disk reproducing apparatus for carrying out a tracking error signal generating method as a first embodiment according to the present invention.

As shown in FIG. 1, the optical disk reproducing apparatus for reproducing the information recorded on an optical disk 1 is provided with: a laser diode 2 as one example of an irradiating device for emitting a light beam to the optical disk 1 as one example of an information recording medium; a grating 3 for dividing the light beam into three beams; a beam splitter 4 for splitting a reflected light from a reading light; a collimator lens 5 for collimating the reading light; an objective lens 6 for condensing the reading light onto the information recording surface of the optical disk 1; an actuator 7 as one example of moving device for moving the objective lens 6 in the radial direction of the optical disk 1; a spindle motor 8 for rotating the optical disk 1 at a predetermined rotating speed; photo detectors 9 as one example of light receiving devices, each detector receiving the reflected light to obtain a detection signal; preamplifiers 10, each amplifying the detection signal obtained from the corresponding photo detector 9; delays 11, each correcting the time delay of the corresponding one of three beams; a tracking error detection circuit 12 for obtaining a tracking error signal TE; and a tracking servo circuit 13 for controlling the actuator 7 on the basis of the tracking error signal TE obtained from the tracking error detection circuit 12.

In the first embodiment, the three beams obtained from the grating 3 are spaced at a distance equal to the track pitch Tp, and the reflected lights from the optical disk 1 of individual beams are received by three photo detectors 9, and then are converted into electric signals, respectively.

Figure 2:
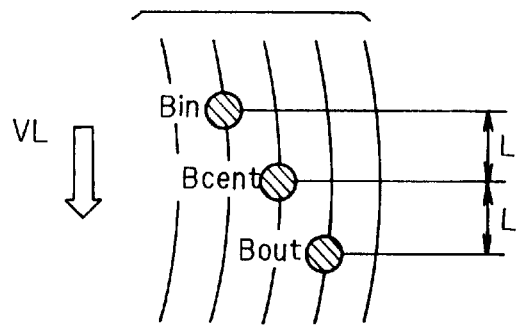
FIG. 2 is a plan view showing the interval of three beams in the tangential direction and the interval in the radial direction in the first embodiment of the invention.

When using the grating 3, meanwhile, since the three beams are not aligned in the radial direction, a time lag occurs in the reproduction signal of each beam as shown in FIG. 2. This delay DL is expressed as "DL=L/VL", wherein L represents the interval of each beam in the tangential direction and VL represents the linear velocity of the optical disk 1.

As shown in FIG. 2, as the IN (inner circumferential) side beam Bin is most advanced and the OUT (outer circumferential) side beam Bout is most delayed, in the first embodiment, it is designed to align the time axis of each of the reproduction signals by delaying, as shown in FIG. 1, a signal Sin due to a Bin beam by using two of delays 11 each having the delay amount DL, and a signal Scent due to a Bcent beam by using one of the delays 11.

By processing three signals Sin, Scent and Sout thus aligned in the time axis in the tracking error detection circuit 12, the tracking error signal TE is generated, and the actuator 7 is driven accordingly, so that the reproduction beam may follow up the track.

The first embodiment relates to an example of obtaining reproduction signals of adjacent tracks by use of a three-beam pickup using the grating 3, but the invention is not limited only to the embodiment. Namely, any reading method may be employed as far as the reproduction signals of adjacent tracks are obtained.

In the following description, it is supposed that the delay of the three-beam pickup has been already corrected, and the three signals aligned in the time axis are obtained. It is explained here how to generate the tracking error signal TE from these three signals. In the following explanation, conceptually, it is assumed that the three beams are arranged linearly in the radial direction.

Figure 3:
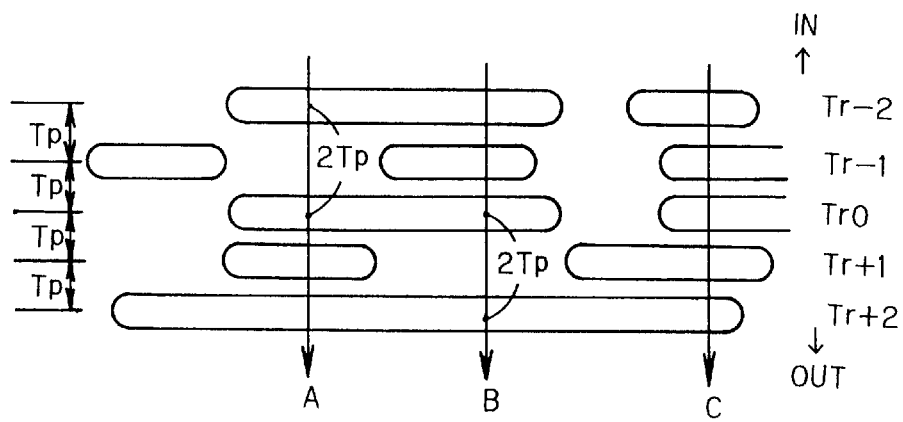
FIG. 3 is a plan view showing an example of pit layout in the first embodiment of the invention.

First, the principle of the invention is described with reference to FIGS. 3 to 9. FIG. 3 is a diagram showing an example of pit arrangement by magnifying a part of the optical disk 1. The vertical direction in FIG. 3 corresponds to the radial direction of the optical disk 1, in which the upper side is the IN (inner circumferential) side and the lower side is the OUT (outer circumferential) side. FIG. 3 also shows five tracks from track Tr−2 to track Tr+2, in which elliptical portions which are the pits are recording areas of information signals, and other positions which are the mirrors are non-recording areas. In this example, the track pitch Tp is not larger than the optical cut-off wavelength. In the case of the pit arrangement as shown in FIG. 3, supposing that a reading beam crosses a portion A, since the track Tr−1 is a mirror, there is a pit at the pitch of the track Tr−2 and the track Tr0 in the portion A. Thus, the pit pitch in this portion A is two times that of the track pitch Tp. Therefore, since the pit pitch is larger than the optical cut-off wavelength, a sufficient tracking error signal TE can be detected with respect to the portion A. Similarly, when the reading beam crosses a portion B, since the track Tr+1 is a mirror in the portion B, the pit pitch of the track Tr0 and track Tr+2 is two times that of the track pitch Tp. Thus, in this portion B, since the pitch is also larger than the optical cut-off wavelength, a sufficient tracking error signal TE can be detected. The mode of the reproduction signal when the reading beam crosses the portions A and B is shown in FIG. 4.

Figure 4:
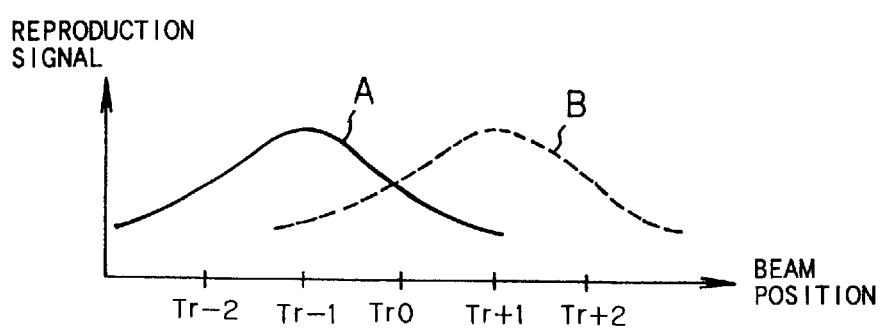
FIG. 4 is a graph showing a reproduction signal versus a beam position when the beam crosses portions A and B in FIG. 3.

In FIG. 4, the axis of ordinates denotes the reproduction signal on the basis of the quantity of the return light (i.e. the reflected light) of the reading beam from the optical disk, and the axis of abscissas indicates the crossing direction position of the reading beam. Also in FIG. 4, characteristic curves A and B respectively show the changes of the reproduction signal when the reading beam crosses the portions A and B in FIG. 3. The characteristic curve A in FIG. 4 shows that the quantity of the return light is large and the value of the reproduction signal is large at the track Tr–1 because the track Tr–1 is a mirror as stated above. At the other track positions, even in the portions between the tracks, since the track pitch is not larger than the optical cut-off wavelength, no sufficient reproduction signal is obtained even if crossing each track. In case of the characteristic curve B, since the pit pitch between track Tr0 and the track Tr+2 is two times that of track pitch Tp as mentioned above, and the track Tr+1 is a mirror, the quantity of the return light is large and it shows that the value of the reproduction signal is large at the track Tr+1. From the other tracks, even if crossing each track, no sufficient reproduction signal is obtained.

By contrast, when the reading beam crosses the portion of C in FIG. 3, since all of the tracks are the pits and the pit pitch is not larger than the optical cut-off wavelength, no sufficient reproduction signal is obtained at any position. Thus, the sufficient tracking error signal TE cannot be detected.

In this manner, when the interval between the adjacent tracks is not larger than the optical cut-off wavelength, depending on the combination of the track pits and mirrors, there are a case capable of detecting the sufficient tracking error signal TE and a case not capable of detecting the sufficient tracking error signal TE.

Even in case that the track pitch is larger than the optical cut-off wavelength, if the light beam is not focused at the optimum focal length on the optical disk, the light spot size becomes large correspondingly, and the reproduction signal from one track is affected by the crosswalk from the other tracks adjacent thereto. Thus, the sufficient tracking error signal TE may not be obtained.

This is because, when reproducing the optical disk, the size of the light spot formed on the optical disk becomes larger than the focusing or condensing limit of $(0.85 \times \lambda)/NA$ due to the effect of aberration, and increases closely to the first dark ring of $(1.22 \times \lambda)/NA$, so that the light beam is likely to be influenced from the track adjacent to the presently reproduced track.

Figure 5:
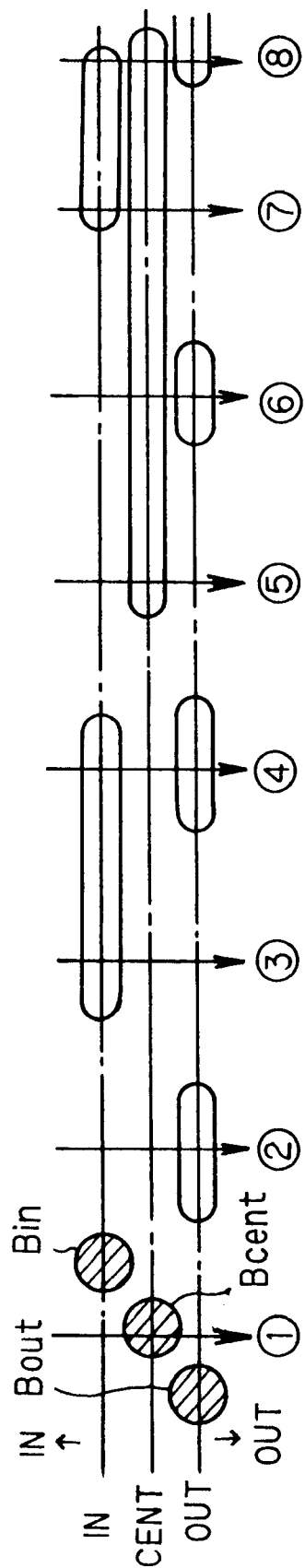
FIG. 5 is a plan view showing pit and mirror patterns ① to ⑧ of each track in the first embodiment of the invention.

Herein, in FIG. 3, supposing the track Tr0 to be a CENT (center) track, the track Tr–1 to be an IN (inner circumferential) track, and the track Tr+1 to be an OUT (outer circumferential) track, it is discussed herein what reproduction signals would be obtained in all combinations of the pits and mirrors in all tracks as shown in FIG. 5.

In FIG. 5, pit and mirror patterns ① to ⑧ composed of combinations of the pits and the mirrors are as follows.

TABLE 1

|   | IN track | CENT track | OUT track |
|---|----------|------------|-----------|
| ① | Mirror | Mirror | Mirror |
| ② | Mirror | Mirror | Pit |
| ③ | Pit | Mirror | Mirror |
| ④ | Pit | Mirror | Pit |
| ⑤ | Mirror | Pit | Mirror |
| ⑥ | Mirror | Pit | Pit |
| ⑦ | Pit | Pit | Mirror |
| ⑧ | Pit | Pit | Pit |

Figure 6:
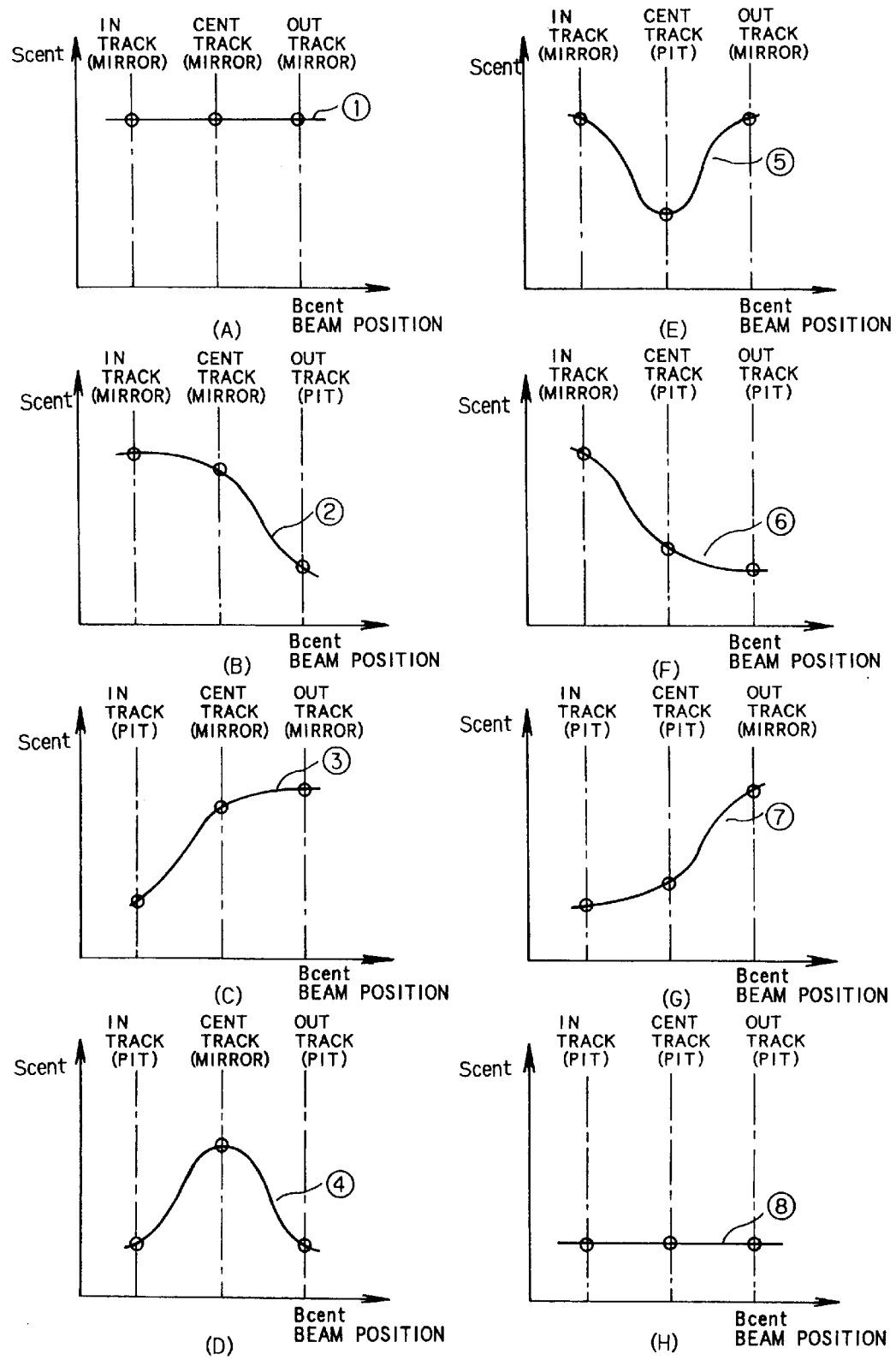
FIG. 6 is a set of graphs (A) to (H) showing there production signal waveforms when the central beam of the three beams crosses the three tracks, which are arranged in the radial direction and have the pit and mirror patterns ① to ⑧ of FIG. 5, respectively.
Figure 7:
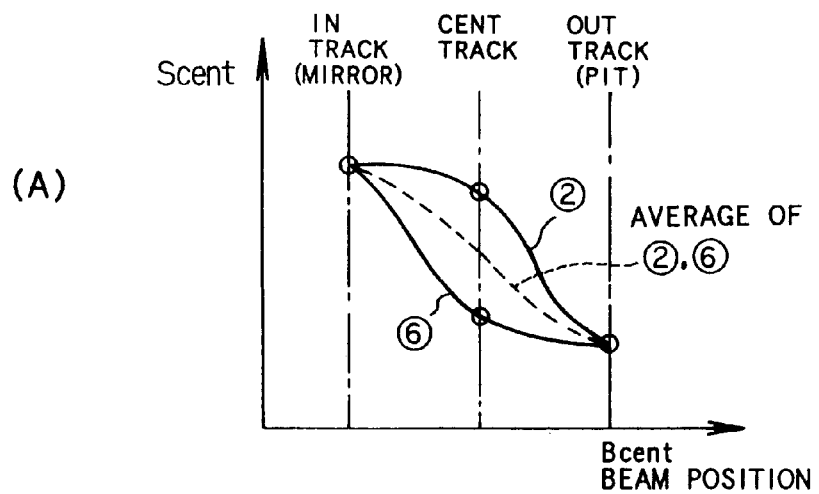
FIG. 7 is a set of graphs (A) to (C), in which the graph (A) shows a composite waveform by the signals of the patterns ② and ⑥ of FIG. 5, the graph (B) shows a composite waveform by the signals of the patterns ③ and ⑦ of FIG. 5, and the graph (C) shows a waveform obtained by subtracting the waveform in the graph (A) from the waveform in the graph (B)
Figure 7:
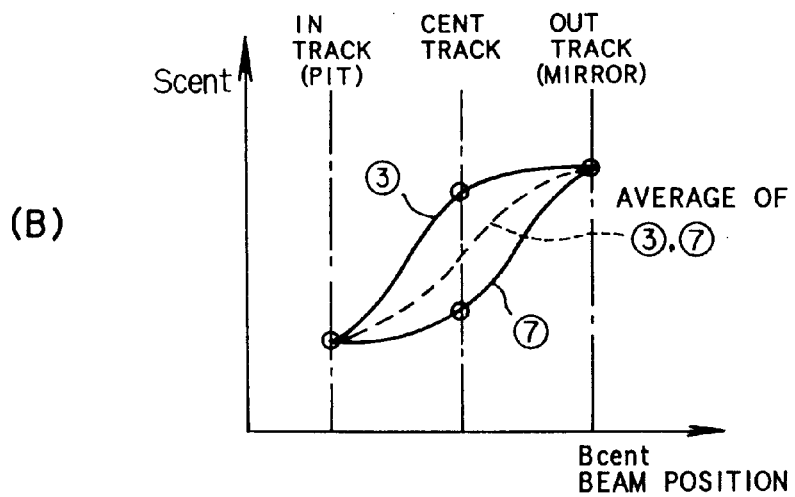
Figure 7:
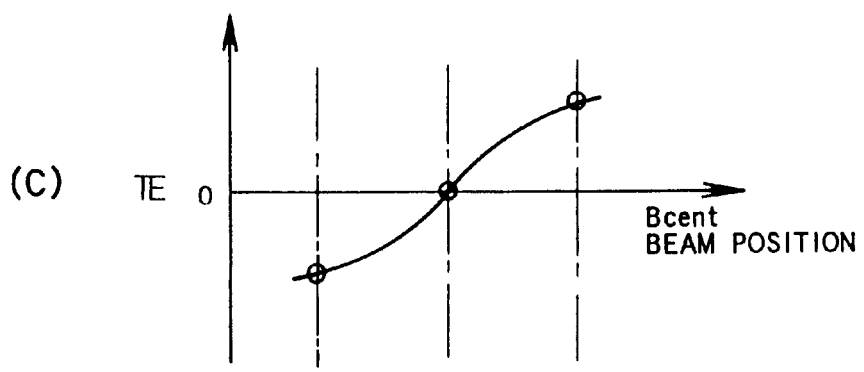

In the above combinations, when a Bcent (central) beam shown in FIG. 5 crosses the IN track, the CENT track and the OUT track in the direction perpendicular to each track, the change of the reproduction signals for respective pit and mirror patterns ① to ⑧ are shown in graphs (A) to (H) of FIG. 6.

In each of the graphs (A) to (H) in FIG. 6, the axis of ordinates denotes the reproduction signal Scent on the basis of the quantity of the return light from the Bcent beam, and the axis of abscissas represents the position of crossing direction of the Bcent beam.

The graph (A) of FIG. 6 shows the change of the reproduction signal Scent when the Bcent beam crosses the pattern ① in FIG. 5, in which, since each track in the pattern ① is a mirror, regardless of the position of the Bcent beam, the quantity of the return light from the Bcent beam is large, and the Scent signal is large.

However, as shown in the graph (B) of FIG. 6, in the case of the pattern ② in FIG. 5, since the OUT track is a pit, when the Bcent beam is at the position of the OUT track, the quantity of the return light from the Bcent beam is small, and the Bcent signal becomes small. When the Bcent beam is at the position of the CENT track, the majority of the Bcent beam is emitted to the mirror of the CENT track, and the quantity of the return light is increased. However, a part of the Bcent beam is emitted to the pit of the OUT track, and same as when the Bcent beam is at the position of the IN track in the pattern ② in FIG. 5, the quantity of the return light decreases as compared with the case in which the adjacent tracks are both mirrors. As a result, the waveform showing the reproduction signal declines gradually as the Bcent beam moves from the IN track to the CENT track as shown in the graph (B) of FIG. 6, and it further drops abruptly as moving to the OUT track.

Next, as shown in the graph (C) of FIG. 6, in the case of the pattern ③ in FIG. 5, since the IN track is a pit and the OUT track is a mirror, the reproduction signal waveform when the Bcent beam crosses is symmetrical from the central position of the CENT track position with respect to the reproduction signal waveform in the graph (B) of FIG. 6. Therefore, as the Bcent beam moves from the IN track to the OUT track, it rises sharply, and as moving from the CENT track to the OUT track, it rises gradually. Incidentally, when the Bcent beam is at the position of the CENT track, the quantity of the return light is smaller than when at the position of the OUT track. This is because, same as in the case of the pattern ② in FIG. 5, a part of the Bcent beam at the CENT track position is emitted to the pit of the IN track.

Next, as shown in the graph (D) of FIG. 6, in the case of the pattern ④ in FIG. 5, since both of the IN track and OUT track are pits, the quantity of the return light decreases when the Bcent beam is at each of the positions of the IN track and the OUT track, and hence the Scent signal becomes smaller thereat respectively. When the Bcent beam is at the position of the CENT track, since the CENT track is a mirror, the quantity of the return light is larger than when at the positions of the IN track and the OUT track. However, a part of the Bcent beam is emitted to a part of the pits of the IN track and the OUT track, so that the quantity is smaller than when all of the adjacent tracks are mirrors.

Next, as shown in the graph (E) of FIG. 6, in the case of the pattern ⑤ in FIG. 5, contrary to the case of the pattern ④, since the IN track and the OUT track are mirrors, when the Bcent beam is at the position of each of the IN track and the OUT track, the quantity of the return light increases, and the value of the Scent signal is larger. However, since the CENT track is a pit, when the Bcent beam is at the position of the CENT track, the quantity of the return light decreases, and the value of Scent signal is smaller. Nevertheless, since a part of the Bcent beam is emitted to the mirror portions of the IN track and the OUT track, the quantity of the return light is larger than in the case in which all adjacent tracks are pits.

Next, as shown in the graph (F) of FIG. 6, in the case of the pattern ⑥ in FIG. 5, same as in the case of the pattern ②, since the IN track is a mirror and the OUT track is a pit, the quantity of the return light is large when the Bcent beam is at the position of the IN track, and the quantity of the return light is small when positioned at the OUT track. However, different from the case of the pattern ②, since the CENT track is a pit, as far as the Bcent beam is at the position of the CENT track, the majority of the Bcent beam is emitted to the pit portion of the CENT track, and the quantity of the return light decreases. However, a part of the Bcent beam is emitted to the mirror of the IN track, and the quantity of the return light is larger than in the case where all adjacent tracks are pits. As a result, the waveform showing the reproduction signal falls suddenly, as shown in the graph (F) of FIG. 6, as the Bcent beam is moved from the IN track to the CENT track. As moving further to the OUT track, the quantity of the return light declines gradually, and supposing the intermediate value of the value corresponding to the mirror of the Scent signal and the value corresponding to the pit to be 0, the polarity of the signal in the graph (C) of FIG. 6 is inverted.

Next, as shown in the graph (G) of FIG. 6, in the case of the pattern ⑦ in FIG. 5, supposing the intermediate value to be 0, the waveform is in the opposite polarity to the polarity of the signal in the graph (C) of FIG. 6. That is, since the IN track is a pit and the OUT track is a mirror, the quantity of the return light is small when the Bcent beam is at the position of the IN track, and the quantity of the return light is large when positioned at the OUT track. The CENT track is a pit same as in the case of the pattern ⑥, and when the beam is at the position of the CENT track, the majority of the Bcent beam is emitted to the pit of the CENT track, so that the quantity of the return light is small. However, a part of the Bcent beam is emitted to the mirror of the OUT track, and the quantity of the return light is larger than in the case in which all adjacent tracks are pits. As a result, the waveform showing the reproduction signal is as shown in the graph (G) of FIG. 6, in which the quantity of the return light increases gradually as the Bcent beam moves from the IN track to the CENT track. As further moving to the OUT track, the quantity of the return light increases suddenly.

Next, as shown in the graph (H) of FIG. 6, in the case of the pattern ⑧ in FIG. 5, contrary to the case of the pattern ①, since all tracks are pits, as the Bcent beam moves from the IN track to the OUT track, the quantity of the return light is minimum at all positions, and the Scent signal is small.

As mentioned above, there are a total of $2^3=8$ patterns ① to ⑧ composed of the combinations of the pits and the mirrors of the IN track, CENT track, and OUT track. Out of the reproduction signal waveforms obtained from these pit patterns ① to ⑧, the waveforms in the graphs (A) and (H) in FIG. 6, the waveforms in graphs (B) and (G) in FIG. 6, the waveforms in the graphs (D) and (E) in FIG. 6, and the waveforms in the graphs (C) and (F) in FIG. 6 are the waveforms mutually inverted in polarity, assuming the intermediate value to be 0. Usually on the optical disk, the pits and the mirrors are recorded so as to be equal in the incidence probabilities thereof, and that, the pits and mirrors on one track do not correlate with the adjacent tracks. Therefore, the incidence probabilities of the patterns ① to ⑧ are equal to each other. Therefore, when the reproduction signals having such waveforms pass through a low pass filter, they are integrated and averaged, and a sufficient tracking error signal TE cannot be obtained.

Figure 8:
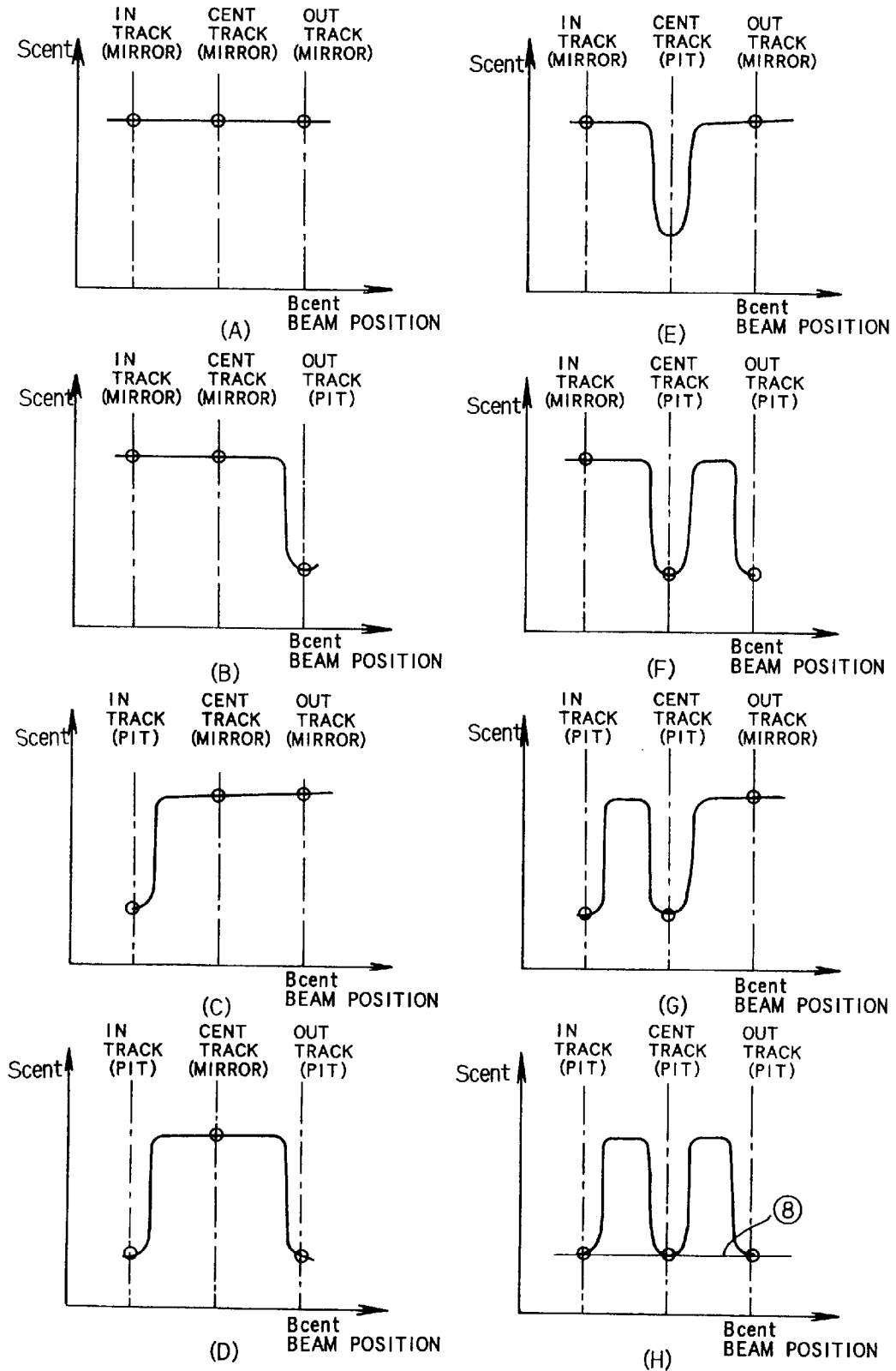
FIG. 8 is a set of graphs (A) to (H) showing the reproduction signal waveforms and the composite waveform of all signal waveforms when the central beam of the three beams crosses the three tracks, which are arranged in the radial direction and have the pit and mirror patterns ① to ⑧ of FIG. 5, in case that the track pitch is larger than the optical cut-off wavelength and the light spot is focused at the optimum focal length.

By contrast, when the interval of the tracks is larger than the optical cut-off wavelength and the light spot is focused at the optimum focal length, with respect to the pit patterns in FIG. 5, the waveforms of the reproduction signals obtained when the Bcent beam crosses from the IN track to the OUT track are as shown in the graphs (A) to (H) in FIG. 8, respectively. In each of the graphs (A) to (H) in FIG. 8, same as those in FIG. 6, the axis of ordinates denotes the reproduction signal Scent on the basis of the quantity of the return light from the Bcent beam, and the axis of abscissas shows the Bcent beam position.

Figure 9:
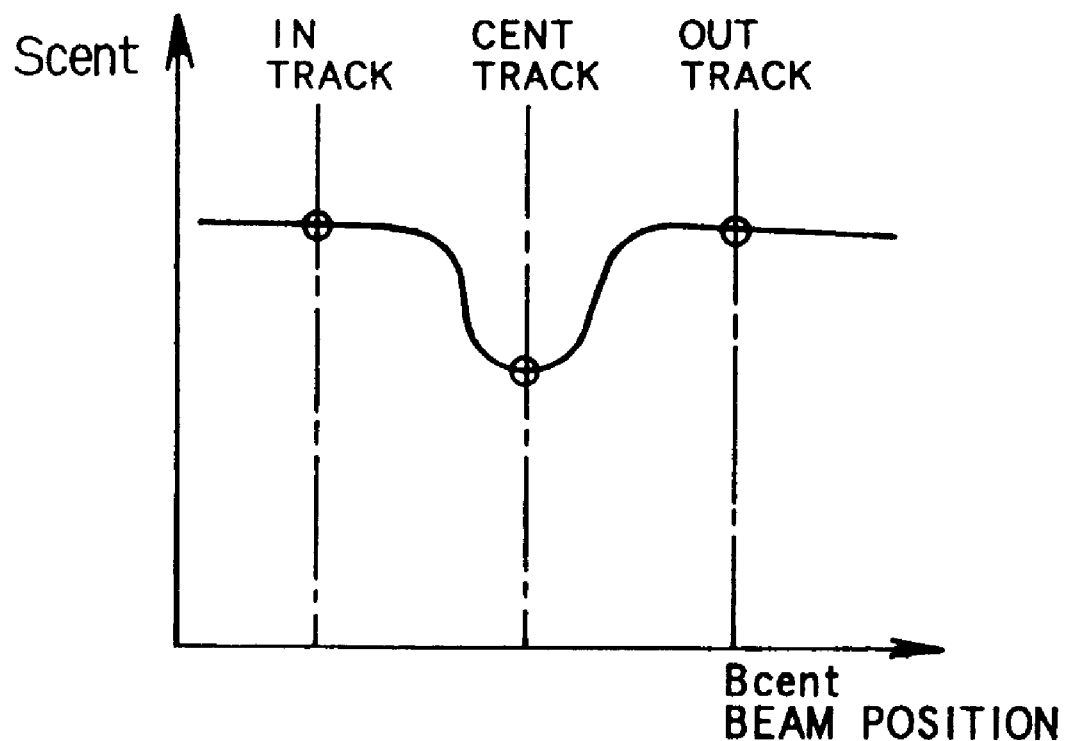
FIG. 9 is a graph showing a composite waveform of all signal waveforms shown in FIG. 8.

As understood from FIG. 8, when the interval of the tracks is larger than the optical cut-off wavelength and the light spot is focused at the optimum focal length, in the sense of meaning mentioned above, the polarity of the signal waveform is not inverted. Even if the signals having the waveforms in the graphs (A) and (H) in FIG. 8 pass through a low-pass filter and are integrated, they are not averaged. Thus, a composite waveform as shown in FIG. 9 is obtained, for example. Accordingly, when such a waveform is obtained, a sufficient tracking error signal TE can be obtained by the conventional three-beam method.

When the light spot is focused at the optimum focal length, depending on whether the track interval is larger or not larger than the optical cut-off wavelength, the above difference appears. The reason of this is as following. Namely, when the track interval is larger than the optical cut-off wavelength, as far as the light spot is focused at the optimum focal length, there is no influence of a crosstalk from the adjacent track thereto onto the quantity of the return light from the Bcent beam. Thus, the change of the waveform is abrupt and the portion of the pits and mirrors appear sharply as shown in the graphs (A) to (H) of FIG. 8. On the contrary to this, when the track interval is not larger than the optical cut-off wavelength, or if the light spot is not focused at the optimum focal length although the track interval is larger than the optical cut-off wavelength, the waveform change becomes slow due to the influence of the crosstalk from the adjacent tracks thereto, resulting in that the boundary of pits and mirrors becomes unclear.

Accordingly, when the track interval is not larger than the optical cut-off wavelength, or if the light spot is not focused at the optimum focal length although the track interval is larger than the optical cut-off wavelength, in order to obtain a sufficient tracking error signal TE in the case of the slow change as shown in the graphs (A) to (H) in FIG. 6, instead of passing the reproduction signals of all pit patterns through the low-pass filter, it is necessary to select several pit and mirror patterns from among the eight pit and mirror patterns ① to ⑧ in FIG. 5, and then to invert the polarity of the reproduction signals so as not to be averaged, even if passing the reproduction signals through the low-pass filter.

Taking note of this point, the waveforms in the graphs (A) and (H) in FIG. 6 are not changed if the Bcent beam is moved from the CENT track to the side of the IN track or the OUT track, and hence the sufficient tracking error signal TE is not obtained as for these cases.

The waveforms in the graphs (D) and (E) in FIG. 6 are mutually inverted in the direction of the change. Therefore, by inverting the polarity of the waveform in each of these cases of the graphs (D) and 6(E), a sufficient tracking error signal TE can be obtained even after passing the reproduction signals through the low-pass filter.

In this case however, whether the Bcent beam is moved from CENT track to the side of the IN track or the OUT track, the direction of the change of the Scent signal is same. Thus, by use of only the Scent signal, it cannot be recognized in which direction the tracking error occurs.

In the first embodiment, therefore, the tracking error signal TE is obtained by use of the reproduction signal Scent by the Bcent beam alone. The tracking error signal generating method by use of the reproduction signals having the waveforms in these graphs (D) and (E) in FIG. 6 will be explained later in a fourth embodiment.

On the other hand, in the waveforms in the graphs (B), (C), (F) and (G) in FIG. 6 respectively, the direction of the change of the Scent signal differs between the case where the Bcent beam moves from the CENT track to the IN track side and the case where the Bcent beam moves from the CENT track to the OUT track side. Thus, unless the signals of these waveforms are averaged after passing through the low-pass filter, the sufficient tracking error signal TE can be obtained by the reproduction signal Scent of the Bcent beam alone.

Herein, when the reproduction signals of these waveforms pass through the low-pass filter, the waveforms are considered below. In the case of FIG. 6, the beam is crossing perpendicularly to the track. However, in fact, the optical disk 1 is rotating and is moving very fast in the tangential direction, i.e., much faster than the track crossing speed. Therefore, the output of the low-pass filter of the extracted signal in each of the pit and mirror patterns is an intermediate value of the pit and mirror patterns. For example, the Scent signals corresponding to the patterns ② and ⑥ in FIG. 5 are averaged as shown in a graph (A) in FIG. 7, while the Scent signals corresponding to the patterns ③ and ⑦ in FIG. 5 are averaged as shown in a graph (B) in FIG. 7. In these cases, the averaged waveforms are symmetrical to each other in the direction of the change. Thus, if the reproduction signals having these patterns are simply passed through a low-pass filter, they are averaged, so that the tracking error signal TE cannot be detected in this state.

In the first embodiment, therefore, as for the Scent signals corresponding to the patterns ② and ⑥ of FIG. 5, as shown in FIG. 7(A), the polarity of their waveforms is inverted before passing through the low pass filter. The Scent signals corresponding to patterns ③ and ⑦ of FIG. 5, as shown in FIG. 7(B), are directly passing through the low-pass filter without inverting the polarity, so that a sufficient tracking error signal TE is obtained as shown in FIG. 7(C).

That is, in this embodiment, from the eight pit and mirror patterns ① and ⑧ FIG. 5, only the patterns ②, ③, ⑥ and ⑦ are distinguished, and only the Scent signals corresponding to these patterns ②, ③, ⑥ and ⑦ are employed. Further, the polarity is inverted as for the Scent signals corresponding to the patterns ② and ⑥ of FIG. 5.

As a method of judging the pit and mirror patterns, a first method of judging by using the reproduction signals based on the Bin beam, the Bcent beam and the Bout beam may be employed. Alternatively, a second method of judging by using the reproduction signals based on the Bin beam and the Bout beam, regardless of the reproduction signal based on the Bcent beam, may be employed.

In the first method, since the combinations of the pits and mirrors of the IN track, the CENT track and the OUT track are different in all of the patterns ② to ⑦, it is intended to judge the pit and mirror patterns by using all of the Sin signal, the Scent signal and the Sout signal.

In the second method, in each of the portions ② to ⑦, the combinations of the IN track and the OUT track are the combinations of all pits or the combinations of all mirrors. Therefore, without using the Scent signal, it is intended to judge the pit and mirror patterns by use of the Sin signal and the Sout signal.

On the other hand, as the method of inverting the polarity of the reproduction signal Scent based on the Bcent beam, it is considered to selectively input the reproduction signal into either one of an inverting input terminal and a non-inverting input terminal of an amplifier by use of a switching element or a gate element.

A specific circuit arrangement for obtaining the tracking error signal TE, by means of the above mentioned pit pattern judging method and the above mentioned polarity inverting method, is described below.

Figure 10:
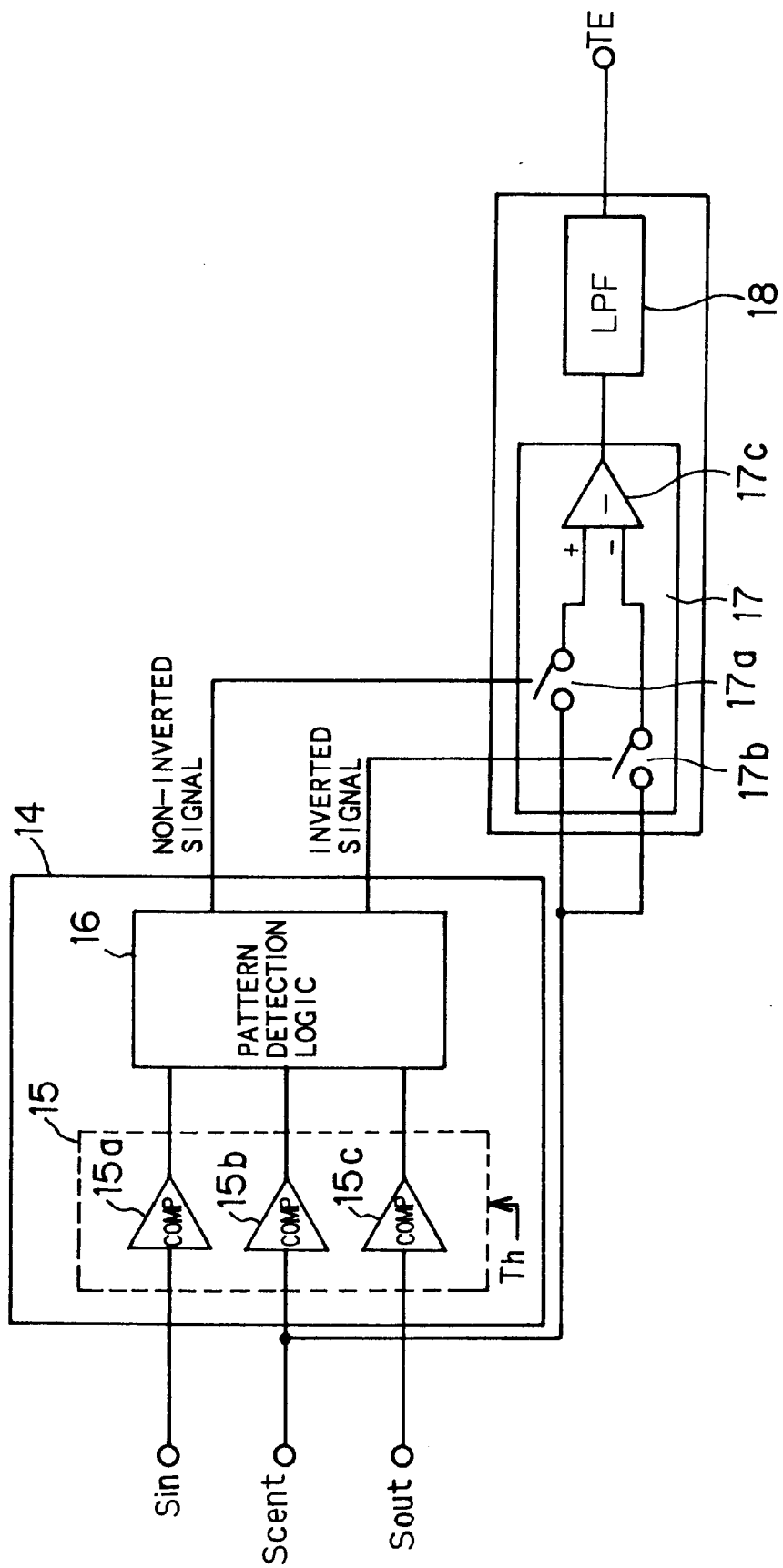
FIG. 10 is a block diagram showing one constitution of a tracking error detection circuit in the first embodiment of the invention.

FIG. 10 shows a specific circuit example, in which the first method is employed as the method of judging the pit and mirror pattern, and the method of switching over from one input terminal to the other input terminal of the amplifier is employed as the method of inverting the polarity.

In FIG. 10, a pattern judging circuit 14 of the tracking error detection circuit is provided with: a pit/mirror judging circuit 15 as one example of a judging device composed of comparators 15a, 15b and 15c; and a pattern detection logic 16 as one example of a signal acquiring device. The reproduction signal Sin by the Bin beam, the reproduction signal Scent by the Bcent beam and the reproduction signal Sout by the Bout beam are inputted respectively into the comparators 15a, 15b and 15c, in which each reproduction signal is compared with a predetermined threshold Th, so that the pit and mirror pattern of the IN track, the CENT track and the OUT track are judged. The judgment results are outputted to the pattern detection logic 16.

The pattern detection logic 16 outputs an inverted signal when the judgment result by the pit/mirror judging circuit 15 indicates the case of the pattern ② of FIG. 11, or outputs a non-inverted signal when the judgment result indicates the case of the pattern ③ of FIG. 11. The numbers of the patterns ① to ⑧ of FIG. 11 correspond to the numbers of the patterns ① to ⑧ of FIG. 5.

This inverted signal or non-inverted signal is outputted to a polarity selection circuit 17 of the tracking error detection circuit 12. The polarity selection circuit 17 as one example of the polarity changeover device includes switching elements 17a and 17b as shown in FIG. 10. The reproduction signal Scent by the Bcent beam is inputted into both of the switching elements 17a and 17b. The switching elements 17a and 17b are constructed to be turned on or off by the non-inverted signal output or the inverted signal output of the pattern detection logic 16 respectively. When the non-inverted signal is outputted, the switching element 17a is turned on, and when the inverted signal is outputted, the switching element 17b is turned on. If neither non-inverted signal nor inverted signal is outputted, that is, if the pattern is neither pattern ② nor ③ of FIG. 11, the reproduction signal Scent by the Bcent beam is not outputted to a low-pass filter 18.

When a non-inverted signal is outputted from the pattern detection logic 16, the switching element 17a is turned on.

Then, the reproduction signal Scent by the Bcent beam is inputted into the non-inverting input terminal of a differential amplifier 17c, and is outputted into the low-pass filter 18 without inverting the polarity. On the other hand, when an inverted signal is outputted from the pattern detection logic 16, the switching element 17b is turned on. Then, the reproduction signal Scent is inputted into the inverted input terminal of the differential amplifier 17c, is inverted in polarity and is then outputted into the low-pass filter 18.

Figure 12:
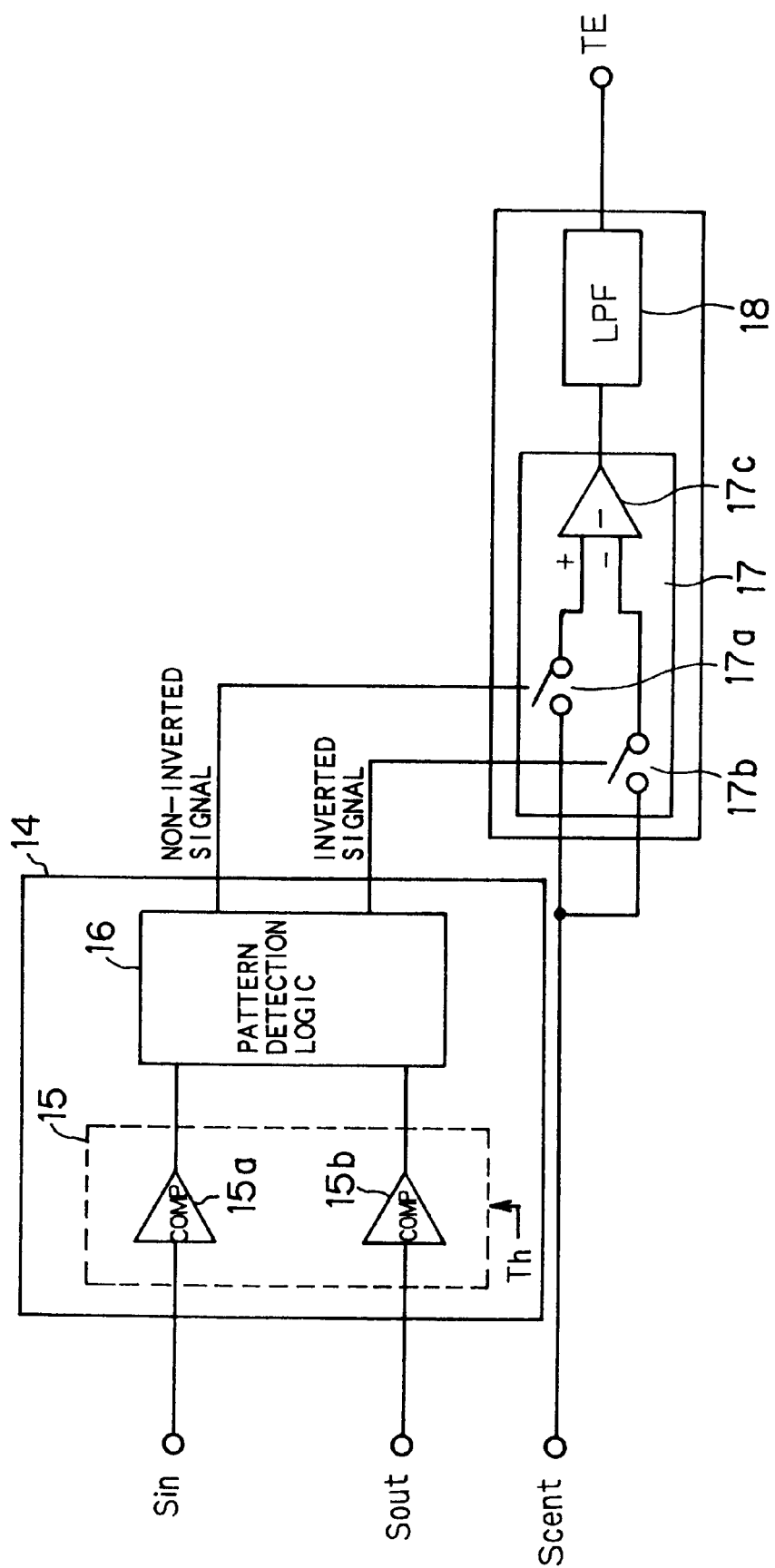
FIG. 12 is a block diagram showing another constitution of a tracking error detection circuit in the first embodiment of the invention.

FIG. 12 shows a specific circuit example, in which the aforementioned second method is employed as the method of judging the pit and mirror pattern, and the method of switching over from one input terminal to the other terminal of the amplifier is employed as the method of inverting the polarity. The pattern judging circuit 14 shown in FIG. 12 is composed nearly same as the pattern judging circuit shown in FIG. 10, except that the pit/mirror judging circuit 15 is composed of only two comparators 15a and 15b. The reproduction signal Sin by the Bin beam and the reproduction signal Sout by the Bout beam are input into the comparators 15a and 15b, respectively, in which each reproduction signal is compared with a predetermined threshold Th, to thereby judge whether pit or mirror exists in the IN track, the CENT track and the OUT track, and the judgment results are outputted to the pattern detection logic 16.

The pattern detection logic 16 issues an inverted signal when the judgment result by the pit/mirror judging circuit 15 indicates the case of the pattern ② or ⑥ of FIG. 13, or outputs a non-inverted signal when the judgment result indicates the case of the pattern ③ or ⑦ of FIG. 13. The numbers of the patterns ① to ⑧ of FIG. 13 correspond to the numbers of the pit and mirror patterns ① to ⑧ of FIG. 5.

The inverted signal or the non-inverted signal is outputted into the polarity selection circuit 17 of the tracking error detection circuit 12. The constitution of the polarity selection circuit 17 is the same as that in FIG. 10, and by the inverted signal or the non-inverted signal, the polarity of the reproduction signal Scent at the time of inputting it into the low-pass filter 18 is selected.

Figure 14:
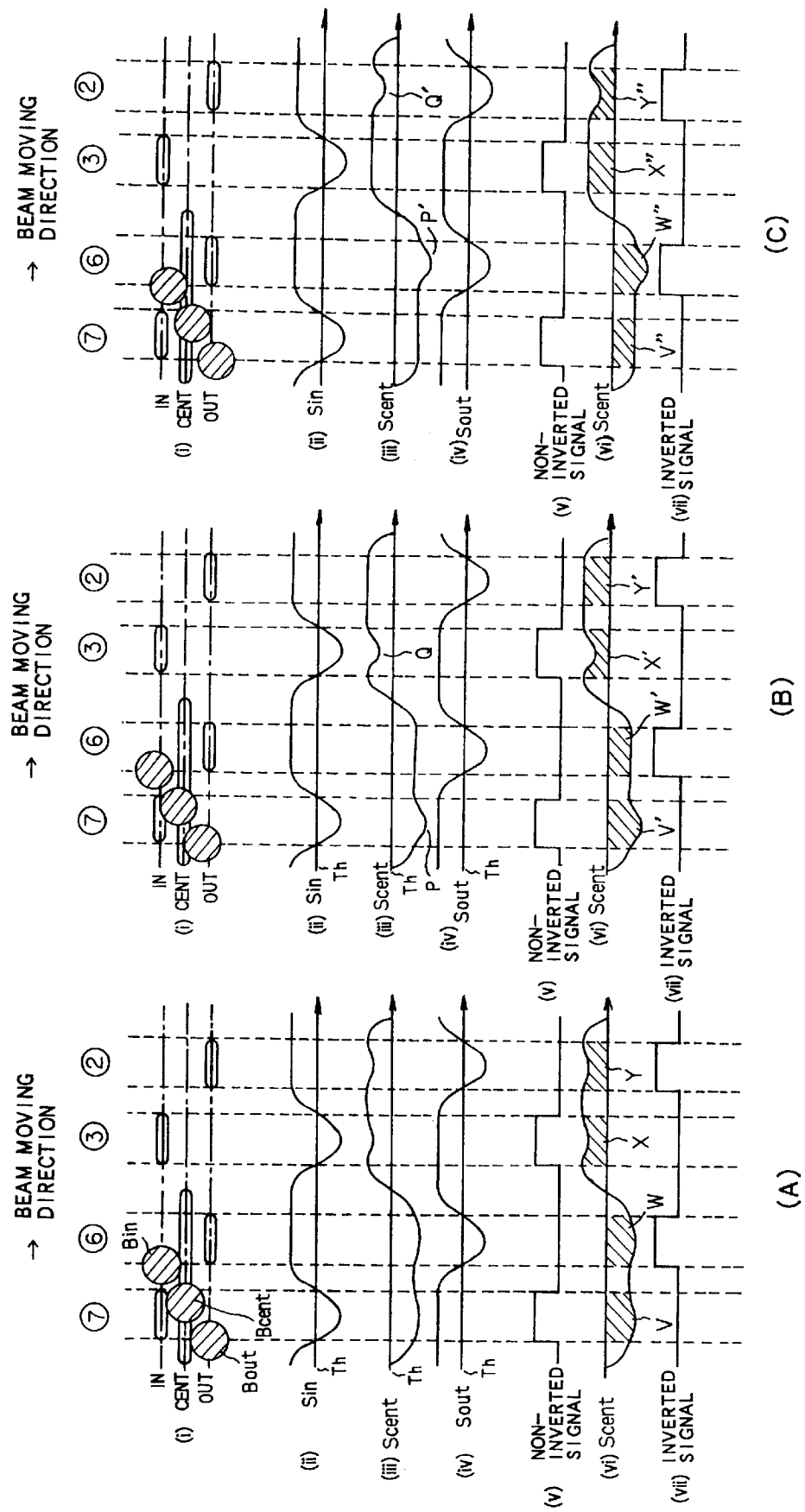
FIG. 14 is a set of timing charts (A) to (C) showing the reproduction signal waveforms etc. for explaining an example of the operation by using the circuit in FIG. 10.

An example of the operation by using the circuit in FIG. 12 is described in FIG. 14. In FIG. 14, a timing chart (A) shows an on-track case, a timing chart (B) shows an IN side off-track case, and a timing chart (C) indicates an OUT side off-track case, each showing the positions of the reading beams and the reproduction signals.

In each of the timing charts (A) to (C) of FIG. 14, the highest stage (i) shows the positions of the Bin beam, the Bcent beam and the Bout beam on each track. Each beam is supposed to move to the right side in FIG. 14 relatively to the optical disk 1, and examples of appearance of the pit and mirror patterns ⑦, ⑥, ③ and ② of FIG. 5 are indicated. The vertical dotted lines drawn in FIG. 14 show the divisions of the time period of the output of the non-inverted signal or the inverted signal, and each of the circled numbers shown between two adjacent vertical dotted lines represents the period coincident with the number of respective one of the pit and mirror patterns of FIG. 5. The three beams are assumed to be aligned line in a direction perpendicular to the beam moving direction.

The second stage (ii) from the top in each of the timing charts (A) to (C) of FIG. 14 denotes the changes of the reproduction signal Sin by the Bin beam, in which the axis of abscissas represents the position of the Bin beam in the beam moving direction, and the axis of ordinates indicates the reproduction signal Sin on the basis of the quantity of the return light by the Bin beam.

The third stage (iii) from the top in each of the timing charts (A) to (C) of FIG. 14 denotes the changes of the reproduction signal Scent by the Bcent beam, in which the axis of abscissas represents the position of the Bcent beam in the beam moving direction, and the axis of ordinates indicates the reproduction signal Scent on the basis of the quantity of the return light by the Bcent beam.

The fourth stage (iv) from the top in each of the timing charts (A) to (C) of FIG. 14 denotes the changes of the reproduction signal Sout by the Bout beam, in which the axis of abscissas represents the position of the Bout beam in the beam moving direction, and the axis of ordinates indicates the reproduction signal Sout on the basis of the quantity of the return light by the Bout beam.

The fifth stage (v) from the top in each of the timing charts (A) to (C) of FIG. 14 denotes the output timing of non-inverted signal from the pattern detection logic 16 shown in FIG. 12. If the reproduction signal Sin is lower than the threshold Th and the reproduction signal Sout is higher than the threshold Th, the pit/mirror judging circuit 15 judges the IN track to be a pit and the OUT track to be a mirror, and the judgment result is outputted to the pattern detection logic 16, and therefore a non-inverted signal is outputted from the pattern detection logic 17 as shown in the stage (v). Thus, a non-inverted signal is outputted in the case of the patterns ⑦ and ③ respectively where the IN track is a pit and the OUT track is a mirror.

The sixth stage (vi) from the top in each of the timing charts (A) to (C) of FIG. 14 denotes the area of regions X, Y, V, W, etc. obtained when the polarity of the reproduction signal Scent is selected by the non-inverted signal mentioned above or the inverted signal mentioned below, and is integrated by passing through the low-pass filter 18.

The final stage (vii) in each of the timing charts (A) to (C) of FIG. 14 denotes the output timing of the inverted signal from the pattern detection logic 16 shown in FIG. 12. If the reproduction signal Sout is lower than the threshold Th and the reproduction signal Sin is higher than the threshold Th, the pit/mirror judging circuit 15 judges the OUT track to be a pit and the IN track to be a mirror, and the judgment result is outputted to the pattern detection logic 16. Therefore, an inverted signal is outputted from the pattern logic 16 as shown in the stage (vii). Hence, the inverted signal is outputted in the case of the patterns ⑥ and ② respectively where the OUT track is a pit and the IN track is a mirror.

In FIG. 14 as described herein, in the on-track case shown in the timing chart (A), the quantity of the return light from the Bcent moving on the CENT track is, as known from the stage (iii), nearly equal between the patterns ⑦ and ⑥, and nearly equal between the patterns ③ and ②. Therefore, when the output period of the non-inverted signal and the output period of the inverted signal are equal to each other, as shown in the stage (vi), the area of the region V and the region W and the area of the region X and the region Y are nearly equal to each other. Then, the polarity is mutually inverted. Finally the output of the low-pass filter becomes almost zero, and the value of the tracking error signal TE becomes almost zero.

However, in the IN side off-track case as shown in the timing chart (B) of FIG. 14, for example, as in the pattern ⑦, the Bcent beam is emitted not only to the pit of the CENT track, but also to the pit of the IN track, and therefore the quantity of the return light by the Bcent beam is decreased from the case in the timing chart (A) as indicated by a curve portion P in the (iii) stage of the timing chart (B). Similarly, in the case of the pattern ③, it is decreased from the case in the timing chart (A) as indicated by a curve portion Q in the (iii) stage. As a result, as shown in the stage (vi), the area of the region V' after passing through the low-pass filter 18 is larger than the area of the region W', and the area of the region X' is smaller than the area of the region Y'. Therefore, if the polarity is mutually inverted, the output of the low-pass filter 18 is not zero, so that a tracking error signal TE of a sufficient minus value is outputted.

On the other hand, in the OUT side off-track case as shown in the timing chart (C) of FIG. 14, for example, as in the pattern ⑥, the Bcent beam is emitted not only to the pit of the CENT track, but also to the pit of the OUT track, and therefore the quantity of the return light by the Bcent beam is decreased from the case in the timing chart (A) as indicated by a curve portion P' in the stage (iii). Similarly, in the case of the pattern ②, it is decreased from the case in the timing chart (A) as indicated by a curve portion Q'. As a result, as shown in the stage (vi), the area of the region W" after passing through the low-pass filter 18 is larger than the area of the region V", and the area of the region Y" is smaller than the area of the region X". Therefore, if the polarity is mutually inverted, the output of the low-pass filter 18 is not zero, so that a tracking error signal TE of a sufficient plus value is outputted.

In this way, even if the track interval is not larger than the optical cut-off wavelength, or the light spot is not focused at the optimum focal length, by selecting the signal to be passed through the low-pass filter and inverting the polarity of the signal, a tracking error signal TE can be still generated, and thereby the tracking servo control can be performed accurately. Moreover, it is possible to shortening the track pitch, so that the information recording medium may be enhanced in density.

Figure 15:
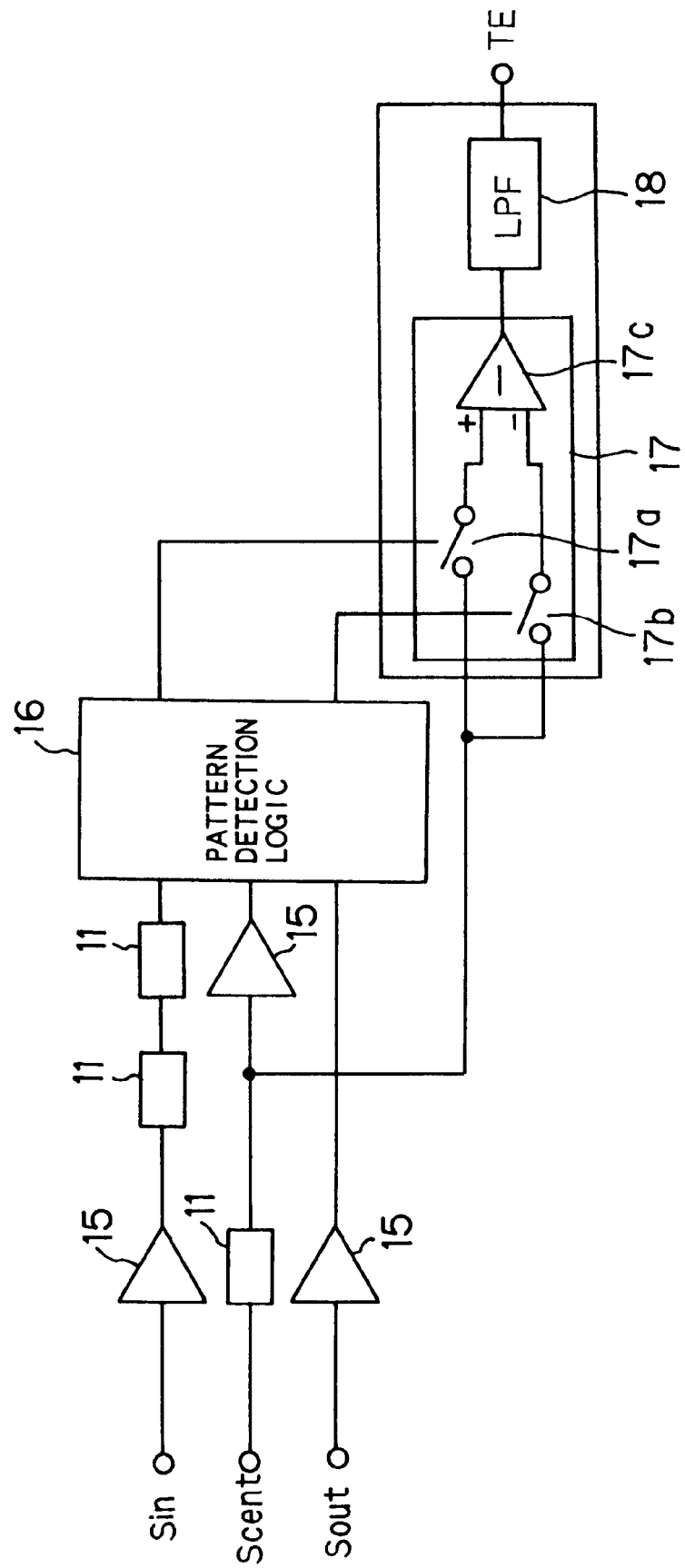
FIG. 15 is a block diagram showing a modified example, in which the delay position is changed in the tracking error detection circuit, of the first embodiment of the invention.

Incidentally, in the case of using the three-beam pickup as in the first embodiment, a delay correction may be effected after the pit/mirror judgment in a circuit as shown in FIG. 15. When the delay is corrected after the pit/mirror judgment, the delay 11 can be realized easily by using a shift register or the like, and the circuit structure may be simplified.

Namely, in a method of performing the delay correction before the pit/mirror judgment, the delay correction for the analog quantity is necessary. However in such a construction, since an analog delay line is used, the parts involve variations, it is hard to correct the delay accurately, and an aging effect is also present. On the other hand, in a method of performing the delay correction by using a shift register after the A/D conversion, many bits (for example, eight bits) are needed for expressing the analog quantity. By contrast, in a method of performing the delay correction after the pit/mirror judgment, only one bit is enough and the circuit structure may be simplified.

The threshold Th used in the pit/mirror judgment may be either a fixed value (for example, zero cross after AC coupling), or a variable value based on an ATC (automatic threshold control) as used in the data of 0/1 judgment.

The above method is intended to detect the balance of the crosstalk from the IN side and the crosstalk from the OUT side, and both of the IN and OUT signals are used to judge whether the crosstalk amount to the CENT is due to the IN side or the OUT side. Hence, the pit/mirror judgment of the signal for the CENT track is not always necessary. For example, it is easier to detect the crosstalk when the CENT track is a mirror, and it may be designed to extract only when the CENT track is a mirror.

As the pattern detection logic 16, for example, it may be defined to non-invert the polarity if the IN track is a pit and to invert the polarity if the IN track is a mirror, or to invert the polarity if the OUT track is a pit and to non-invert the polarity if the OUT track is a mirror. At this time, when both of the IN track and the OUT track are mirrors or pits, both of the invert and non-invert are selected, and the signal supplied to the low-pass filter 18 is zero. Hence, this processing is equivalent to the logic of the second method shown in FIGS. 12 and 13.

(2) Second embodiment

A second embodiment of the present invention is described below with referring to FIGS. 16 to FIG. 21. The same constitutional elements as those in the first embodiment carry the same reference numerals and the explanations thereof are omitted.

In the first embodiment, both of the Sin signal and the Sout signal are used for judgment, so that the different pit and mirror patterns of the IN track and the OUT track are detected (i.e., either one of the pattern in which the IN track is a pit and the OUT track is a mirror, and the pattern in which the IN track is a mirror and the OUT track is a pit is detected). In this embodiment, by contrast, in order to detect the different pit and mirror patterns of the IN track and the OUT track, a differential signal Sin-out of the Sin signal and the Sout signal (i.e., Sin-out=Sin signal−Sout signal) is used, which is different from the first embodiment. The pit and mirror patterns to be selected are the patterns ⑦, ⑥, ③ and ② of FIG. 5 in the same manner as the first embodiment, and a tracking error signal TE is generated on the basis of the Scent signal.

Herein, the principle of judging the pit/mirror by use of the differential signal Sin-out is described. For example, supposing that the Bcent beam is emitted to the CENT track in on-track state, at this time, when the IN track is a pit and the OUT track is a mirror, the quantity of the return light from the Bin beam emitted to the IN track is decreased, and the Sin signal becomes a small value. On the contrary, the quantity of the return light from the Bout beam emitted to the OUT track is increased, and the Sout signal becomes a large value. Therefore, by subtracting the Sout signal of large value from the Sin signal of small value, the Sin-out signal becomes minus.

On the other hand, when the IN track is a mirror and the OUT track is a pit, the quantity of the return light from the Bin beam is increased, and the Sin signal becomes a large value. On the contrary, the quantity of the return light from the Bout beam is decreased, and the Sout signal becomes a small value. Therefore, by subtracting the Sout signal of small value from the Sin signal of large value, the Sin-out signal becomes plus.

In this way, since the Sin-out signal varies depending on the pit and mirror pattern, it is possible to judge the pit and mirror pattern on the basis of the Sin-out signal.

Figure 16:
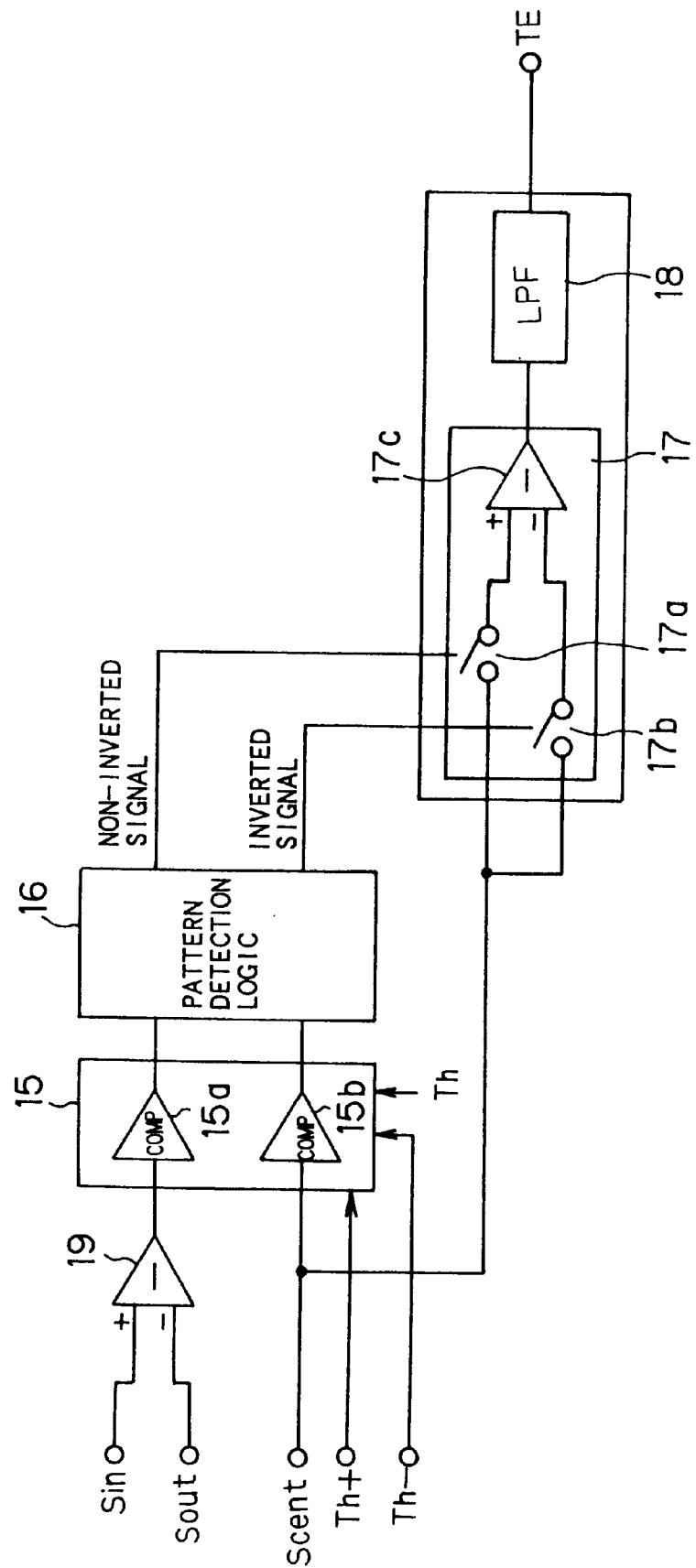
FIG. 16 is a block diagram showing a constitution of a tracking error detection circuit in a second embodiment of the invention.

More specifically, as shown in FIG. 16, the pit pattern is judged by determining the differential signal Sin-out by using a differential amplifier 19, and feeding this differential signal Sin-out and the Scent signal into comparators 15a and 15b of the pit/mirror judging circuit 15.

As for the Scent signal, same as in the first embodiment, the pit/mirror judgment is performed by comparing the Scent signal with the threshold Th. As for the differential signal Sin-out, the pit/mirror judgment is performed by comparing it with two thresholds Th+ and Th−. That is, when the differential signal Sin-out is smaller than the threshold Th−, the IN track is judged to be a pit and the OUT track is judged to be a mirror. When the differential signal Sin-out is larger than the threshold Th+, the IN track is judged to be a mirror and the OUT track is judged to be a pit.

As shown in FIG. 17, in the case of the pit and mirror pattern ②, that is, when the CENT track is a mirror, the IN track is a mirror, and the OUT track is a pit, an inverted signal is outputted from the pattern detection logic 16. In the case of the pit and mirror pattern ③, that is, when the CENT track is a mirror, the IN track is a pit, and the OUT track is a mirror, a non-inverted signal is outputted from the pattern detection logic 16. This example corresponds to the examples in FIG. 10 in the first embodiment in the aspect that the Scent signal is used for the pit and mirror pattern judgment. In this embodiment, meanwhile, the thresholds Th+ and Th− are equal in absolute value to each other, and the numbers of the pit and mirror patterns in FIG. 17 correspond to the numbers of the patterns ① to ⑧ of FIG. 5, respectively.

Figure 18:
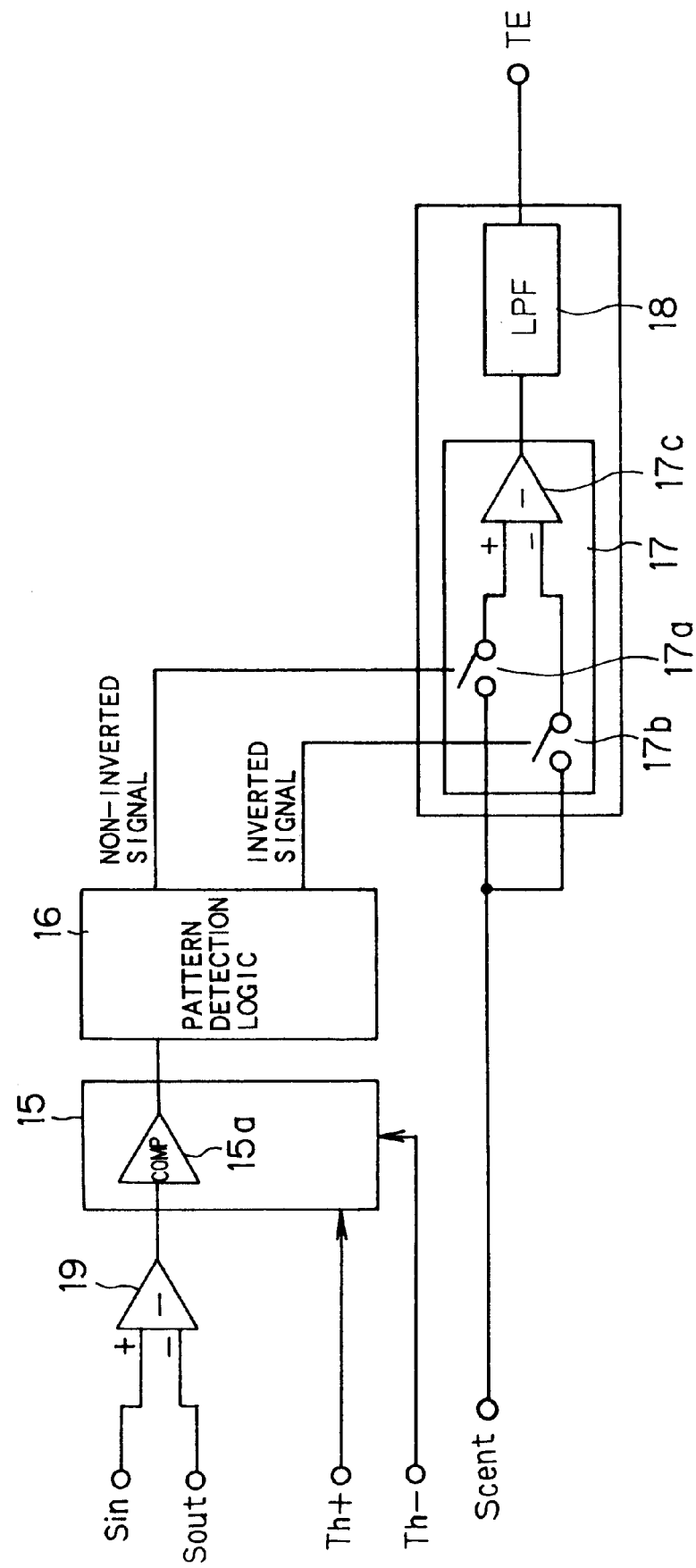
FIG. 18 is a block diagram showing another constitution of a tracking error detection circuit in the second embodiment of the invention.
Figure 20:
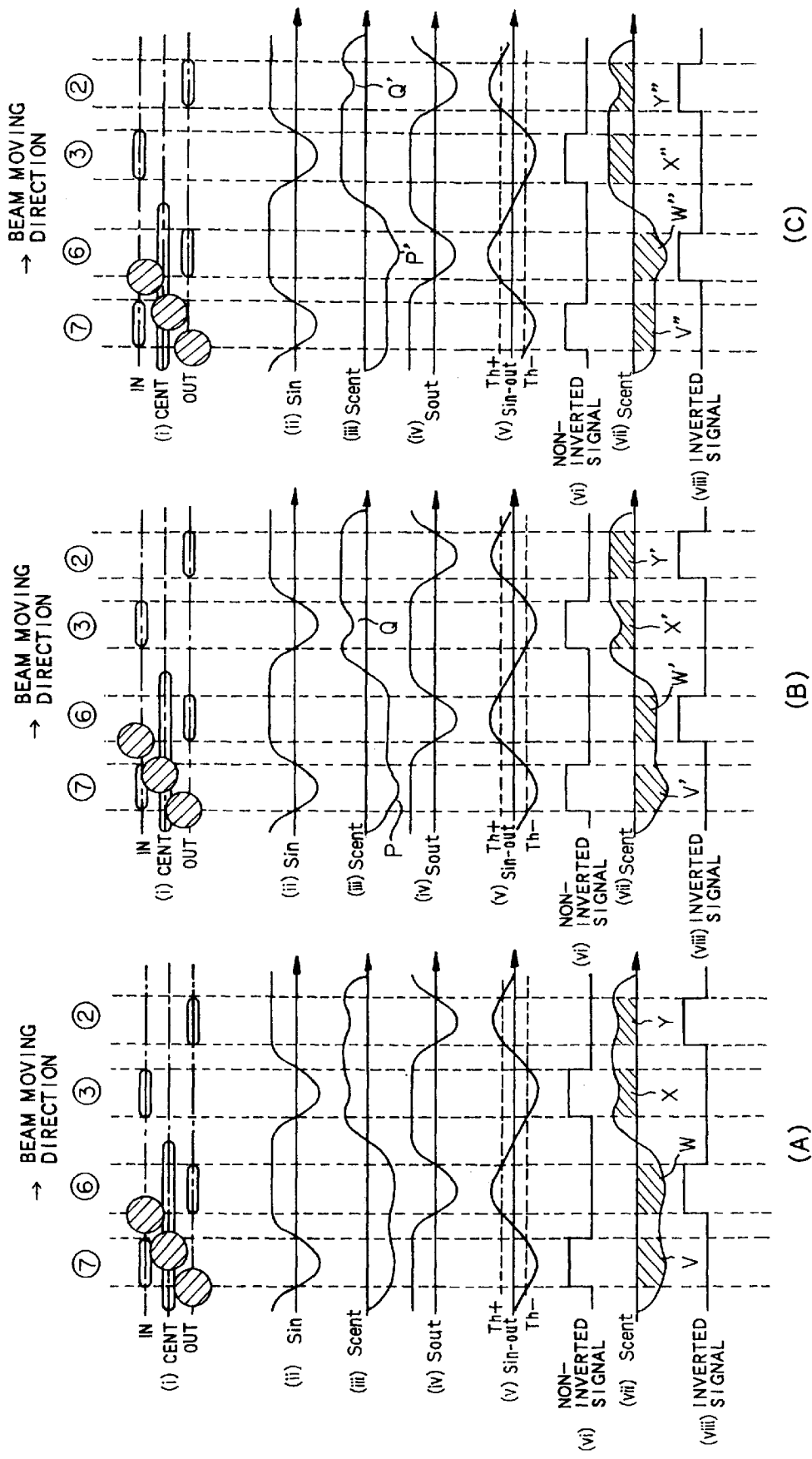
FIG. 20 is a set of timing charts (A) to (C) showing the reproduction signal waveforms etc. for explaining an example of the operation by using the circuit in FIG. 18.

Alternatively, as shown in FIGS. 18 and 19, the pit and mirror pattern may be judged from the Sin signal and the Sout signal, without using the Scent signal. In this case, as shown in FIG. 18, the Scent signal is not inputted into the pit/mirror judging circuit 15, and is inputted only into the polarity selection circuit 17. The other constitution is the same as the example in FIG. 16. In this case, as shown in FIG. 19, the pit and mirror patterns ② and ⑥, and the pit and mirror patterns ③ and ⑦ are judged, which corresponds to the example in FIG. 12 in the first embodiment. An example of the operation in this case is shown in FIG. 20. FIG. 20 corresponds to FIG. 14 in the first embodiment, and the timing charts (A), (B) and (C), corresponding to the timing charts (A), (B) and (C) of FIG. 14, indicate the positions of the reading beams and the reproduction signals in the on-track case, the IN side off-track case, and the OUT side off-track case, respectively. The stages (i) to (iv) in the timing charts (A) to (C) of FIG. 20 indicate the beam positions and the reproduction signals same as in FIG. 14, and the stages (vi) to (viii) indicates the signals corresponding to the stages (vi) to (vii) in FIG. 14. In FIG. 20, the stage (v) indicates the changes of the differential signal Sin-out. Also in FIG. 20, the beam scanning direction is same as in FIG. 14.

Thus, in FIG. 20, in the on-track case shown in the timing chart (A), the quantity of the return light from the Bcent moving on the CENT track is, as understood from the stage (iii), nearly equal between the patterns ⑦ and ⑥, and is nearly equal between the patterns ③ and ②. As shown in the stage (v), further, the output period of the non-inverted signal where the differential signal Sin-out is smaller than the threshold Th− is equal to the output period of the inverted signal where the differential signal Sin-out is larger than the threshold Th+. Therefore, as shown in the stage (vii), the area of the region V and the region W and the area of the region X and the region Y are nearly equal to each other, and the polarity is mutually inverted. Therefore, the output of the low-pass filter 18 is almost zero, and the tracking error signal TE is nearly zero.

However, in the IN side off-track case as shown in the timing chart (B) of FIG. 20, for example, in the case of the pattern ⑦, since the Bcent beam is emitted not only to the pit of the CENT track, but also to the pit of the IN track, the quantity of the return light by the Bcent beam is, as understood from the stage (iii), is decreased from the case of the timing chart (A) as indicated by a curve portion P. Similarly, in the case of the pattern ③, it is decreased from the case of the timing chart (A) as indicated by Q. As a result, as shown in the stage (vii), the area of the region V' after passing through the low-pass filter 18 is larger than the area of the region W', and the area of the region X' is smaller than the area of the region Y'. Therefore, if the polarity is mutually inverted, the output of the low-pass filter 18 is not zero, so that a tracking error signal TE of minus value is outputted.

Further, in the OUT side off-track case as shown in the timing chart (C) of FIG. 20, for example, in the case of the pattern ⑥, since the Bcent beam is emitted not only to the pit of the CENT track, but also to the pit of the OUT track, the quantity of the return light by the Bcent beam is, as understood from the stage (iii), is decreased from the case of the timing chart (A) as indicated by a curve portion P'. Similarly, in the case of the pattern ②, it is decreased from the case of the timing chart (A) as indicated by Q'. As a result, as shown in the stage (vii), the area of the region W" after passing through the low-pass filter 18 is larger than the area of the region V", and the area of the region Y" is smaller than the area of the region X". Therefore, if the polarity is mutually inverted, the output of the low-pass filter 18 is not zero, so that a tracking error signal TE of plus value is outputted.

In this way, also by using the differential signal Sin-out, the pit and mirror pattern can be judged, and by selecting the polarity of the Scent signal depending on the judgment result, even if the track pitch is not larger than the optical cut-off wavelength or if the light spot is not focused at the optimum focal length, a tracking error signal TE can be generated. Thus, the tracking servo control can be effected accurately. Further, by shortening the track pitch, the information recording medium may be enhanced in density.

Figure 21:
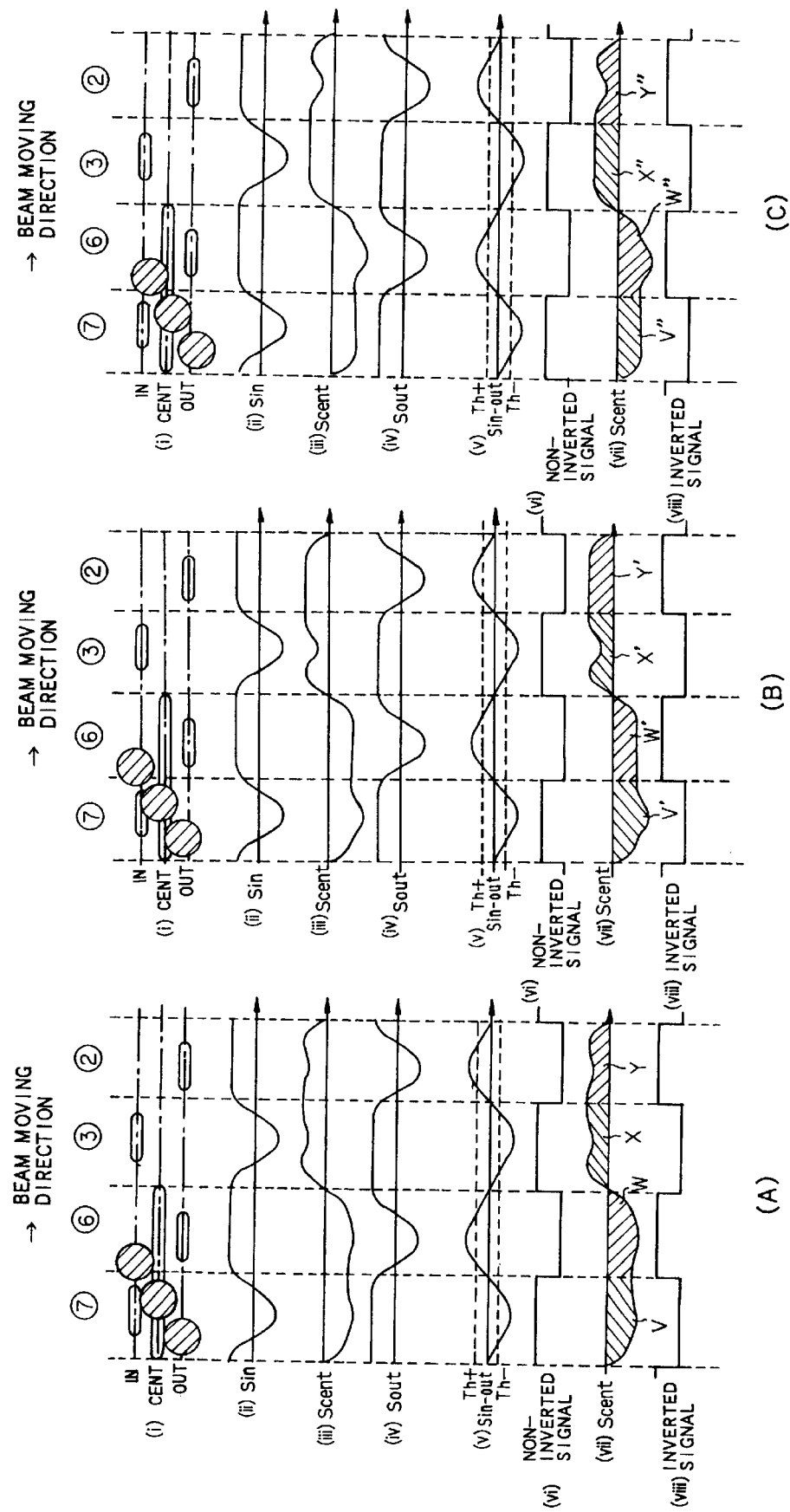
FIG. 21 is a set of timing charts (A) to (C) showing the reproduction signal waveforms etc. for explaining an example of the operation by varying the changeover method of a non-inverted signal and an inverted signal in the circuit in FIG. 18.

In the second embodiment, by use of the two thresholds, the bit pattern is judged on the basis of the differential signal Sin-out. However, the present invention is not limited to this. For example, the pit and mirror pattern may be judged by the zero cross of the differential signal Sin-out as shown in FIG. 21, which corresponds to FIG. 20.

(3) Third embodiment

A third embodiment of the invention is described below with referring to FIGS. 22 and 23. The same constitutional elements as those in the first and second embodiments carry the same reference numerals and the explanations thereof are omitted.

Figure 22:
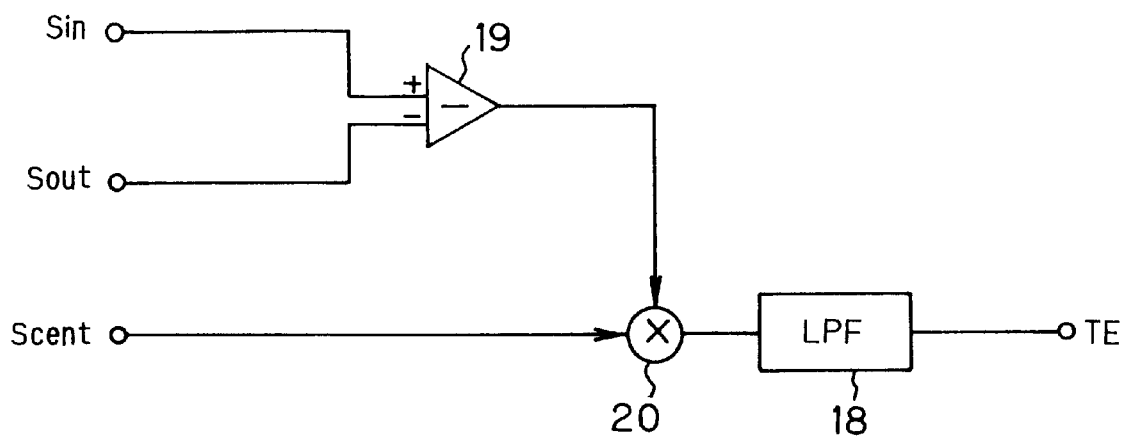
FIG. 22 is a block diagram showing a constitution of a tracking error detection circuit in a third embodiment of the invention.

This embodiment is similar to the second embodiment except that the polarity Scent signal is inverted by calculating the product of the differential signal Sin-out and the Scent signal by using a circuit as shown in FIG. 22, without using the pit/mirror judging circuit 15, the pattern detection logic 16 or the polarity selection circuit 17, as required in the second embodiment.

In such a constitution, if the differential signal Sin-out is plus (+), "Scent signal×(+)=non-inverting", and if the differential signal Sin-out is minus (−), "Scent signal×(−)= inverting". If the differential signal Sin-out is nearly 0, "Scent signal×0=0", so that the operation is nearly same as in the second embodiment.

In the circuit in FIG. 22, by a differential amplifier 19 as one example of a calculating device, a differential signal Sin-out is generated, and "Sin-out signal×Scent signal" is calculated in a multiplier 20 as one example of a multiplying device.

Figure 23:
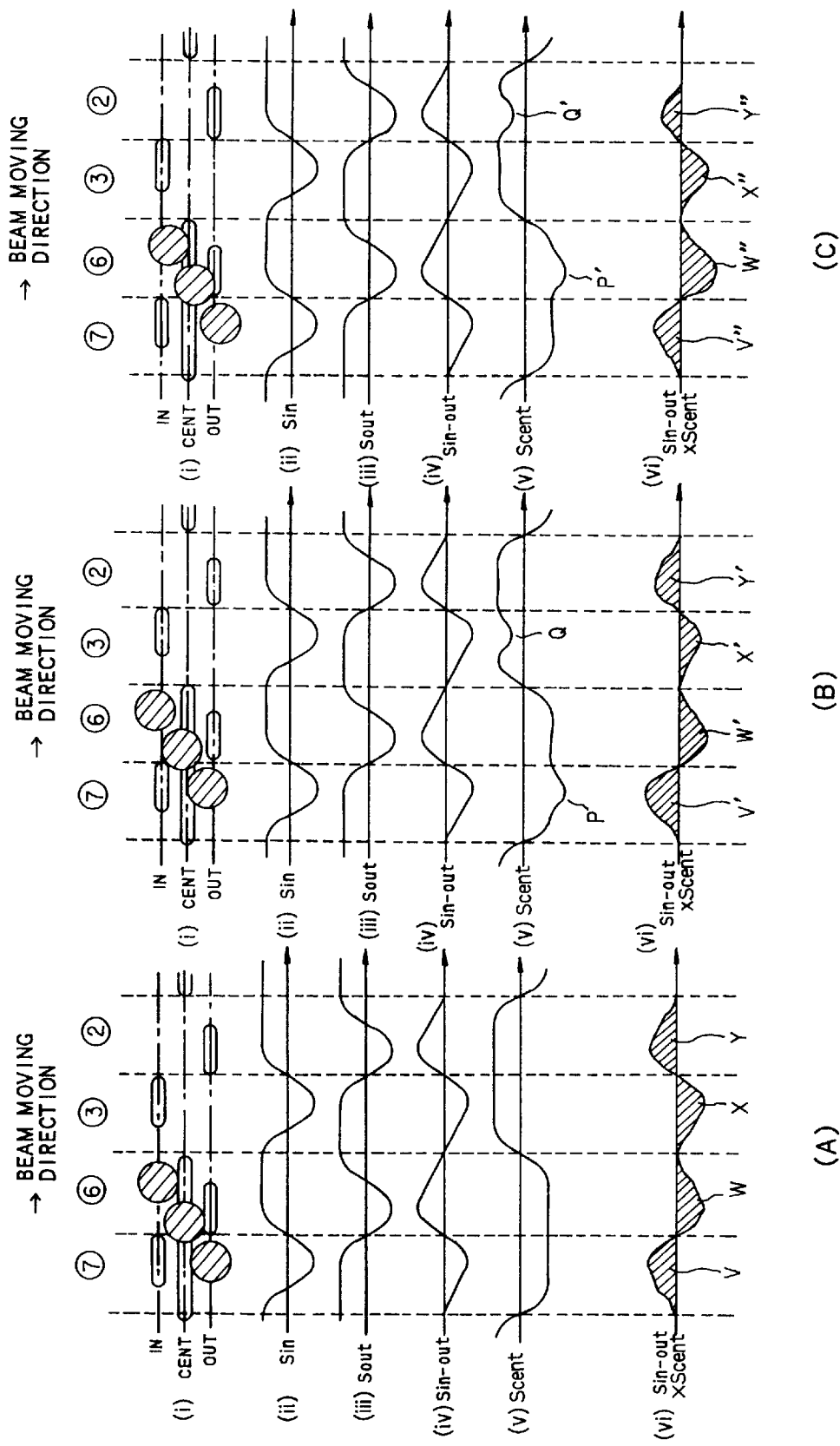
FIG. 23 is a set of timing charts (A) to (C) showing the reproduction signal waveforms etc. for explaining an example of the operation by using the circuit in FIG. 22.

An example of the operation by using this circuit in FIG. 22 is shown in FIG. 23. FIG. 23 corresponds to FIG. 14 in the first embodiment. Namely, the timing charts (A), (B) and (C) of FIG. 23, corresponding to those of FIG. 14 respectively, show the positions of the reading beams and the reproduction signals in the on-track case, the IN side off-track case, and the OUT side off-track case, respectively. The stages (i), (ii) and (iii) of timing charts (A) to (C) of FIG. 23 indicate, same as the stages (i), (ii) and (iii) of FIG. 14, the reproduction signals Sin and Sout at the positions of the Bin beam and the Bout beam on each track. The stage (v) in the timing charts (A) to (C) of FIG. 23 indicates, same as the stage (iii) of FIG. 14, the reproduction signal Scent by the Bcent beam, while the stage (iv) of FIG. 23 shows the differential signal Sin-out. The lowest stage (vi) in the timing charts (A) to (C) of FIG. 23 shows the area of the regions X, Y, V, W, etc. obtained when the multiplied signal of the differential signals Sin-out and the Sout passes through the low-pass filter 18 and is integrated. The beam moving direction and the pit pattern are same as in FIG. 14. The vertical dotted lines drawn in FIG. 23 indicate the timings of the differential signal Sin-out changing to plus or minus side.

Thus, in FIG. 23, in the on-track case shown in the timing chart (A), the quantity of the return light from the Bcent moving on the CENT track is, as understood from the stage (v), nearly equal between the patterns (7) and (6), and nearly equal between the patterns (3) and (2). As shown in the stage (iv), further, the time duration of the differential signal Sin-out changing from minus to plus and that from plus to minus are equal to each other. Therefore, as shown in the stage (vi), the area of the region V and the region W and the area of the region X and the region Y obtained from "Sin-out signal×Scent signal" are nearly equal to each other. Thus, the output of the low-pass filter 18 is almost zero, so that the tracking error signal TE is nearly zero.

However, in the IN side off-track case of the Bcent beam as shown in the timing chart (B) of FIG. 23, the crosstalk from the IN side is large, and the quantity of the return light from the Bcent beam is decreased from the case of the timing chart (A) as indicated by curve portions P and Q in the stage (v). Therefore, as shown in the stage (vi), the area of the region V' obtained from "Sin-out signal×Scent signal" is larger than the area of the region W', and the area of the region X' is smaller than the area of the region Y'. That is, if passing through the low-pass filter 18, the output of the low-pass filter 18 is not zero, and a tracking error signal TE of plus value is outputted.

Further, in the OUT side off-track case of the Bcent beam as shown in the timing chart (C) of FIG. 23, the crosstalk from the OUT side is large, and the quantity of the return light from the Bcent beam is increased from the case of the timing chart (A) as indicated by curve portions P' and Q' in the stage (v). Therefore, as shown in the stage (vi), the area of the region W" obtained from "Sin-out signal×Scent signal" is larger than the area of the region V", and the area of the region Y" is larger than the area of the region X". That is, if passing through the low-pass filter 18, the output of the low-pass filter 18 is not zero, and a tracking error signal TE of minus value is outputted.

Although not shown in the drawing, in the case of the pit and mirror pattern, in which both of the IN track and the OUT track are either the pits or the mirrors, since the differential signal Sin-out is 0, the product of "differential signal Sin-out×Scent signal" is also 0.

In this manner, according to the third embodiment, the pit and mirror pattern is judged by using the differential signal Sin-out, and the polarity is changed over by multiplying the Scent signal and the differential signal Sin-out. In such a constitution, even if the track pitch is not larger than the optical cut-off wavelength or even if the light spot is not focused at the optimum focal length, a tracking error signal TE can be generated for the information recording medium, and the tracking servo control can be effected accurately. By shortening the track pitch, the information recording medium may be enhanced in density.

(4) Fourth embodiment

A fourth embodiment of the invention is described below with referring to FIGS. 24 to 27. The same constitutional elements as those in the first to third embodiments carry the same reference numerals and the explanations thereof are omitted.

In the foregoing first embodiment to the third embodiment, the tracking error signal TE is generated on the basis of the reproduction signal by the Bcent beam, and therefore the polarity of the Scent signal is switched over by selecting the patterns (7), (6), (3), and (2) of FIG. 5. The fourth embodiment is different from the other embodiments in that the tracking error signal TE is generated by selecting the patterns (4) and (5) of FIG. 5.

However, as shown in the graphs (D) and (E) of FIG. 6, in the case of the patterns (4) and (5) of FIG. 5, whether the Bcent beam is moved in the direction of the IN side or the OUT side, the changing direction of the Scent signal is the same. Therefore, the tracking error signal TE cannot be generated on the basis of only the Scent signal.

In the fourth embodiment, in the case of the patterns (4) and (5) of FIG. 5, therefore, the tracking error signal TE is generated on the basis of the differential signal Sin-out. The principle of generating the tracking error signal in the fourth embodiment is described below.

Figure 24A:
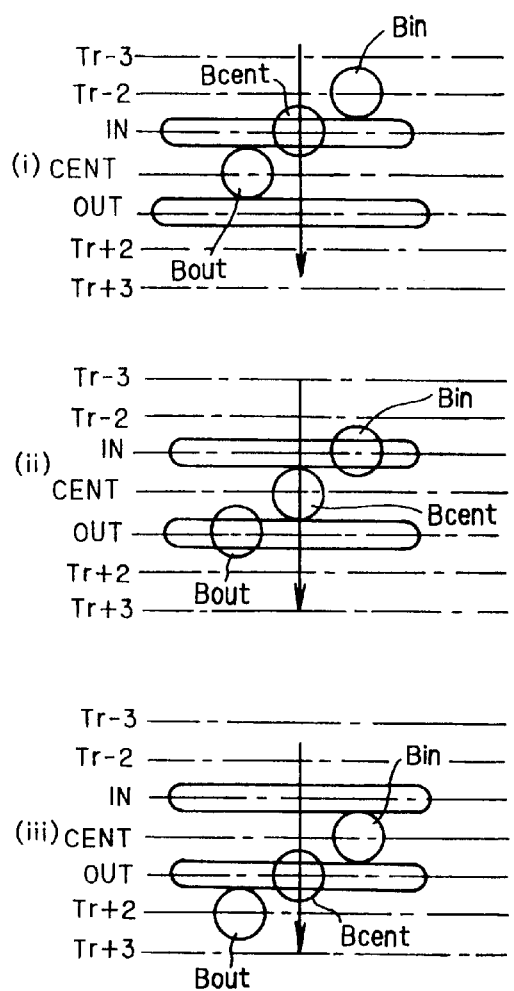
FIG. 24A is a set of plan views (i) to (iii) showing one pit and mirror pattern and the position of each beam when crossing on the tracks having such patterns in a fourth embodiment of the invention.
Figure 24B:
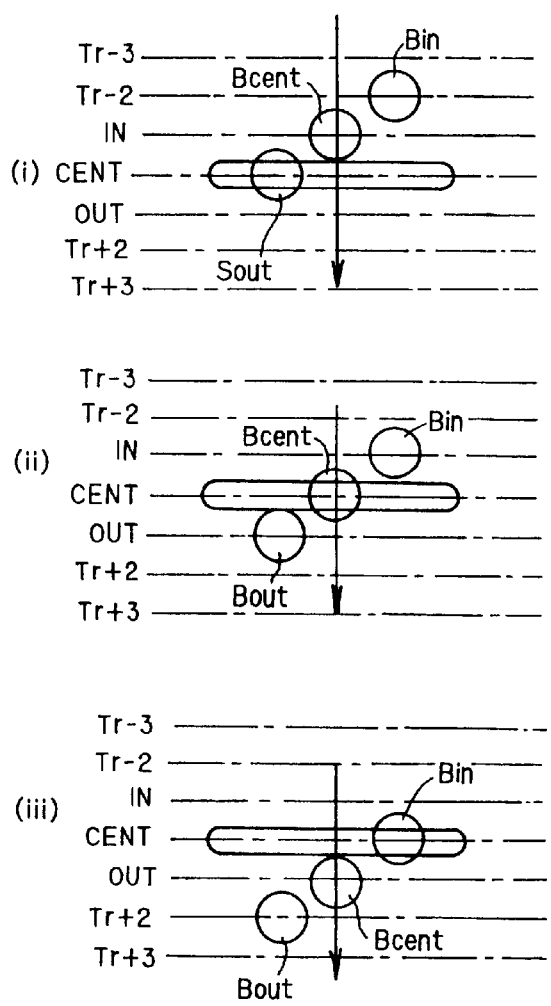
FIG. 24B is a set of plan views (i) to (iii) showing another pit and mirror pattern and the position of each beam when crossing on the tracks having such patterns in the fourth embodiment of the invention.

In the following explanation, the three reading beams are assumed to move from the IN side to the OUT side in a case corresponding to the pattern (4) of FIG. 5, in which the IN track is a pit, the CENT track is a mirror, and the OUT track is a pit as shown in FIG. 24A, and in a case corresponding to the pattern (5) of FIG. 5, in which the IN track is a mirror, the CENT track is a pit, and the OUT track is a mirror as shown in FIG. 24B. In each of FIGS. 24A and 24B, diagrams (i), (ii) and (iii) show the positions of the Bin beam and the Bout beam when the Bcent beam is at the position of the IN track, the CENT track, and the OUT track, respectively.

Figure 25:
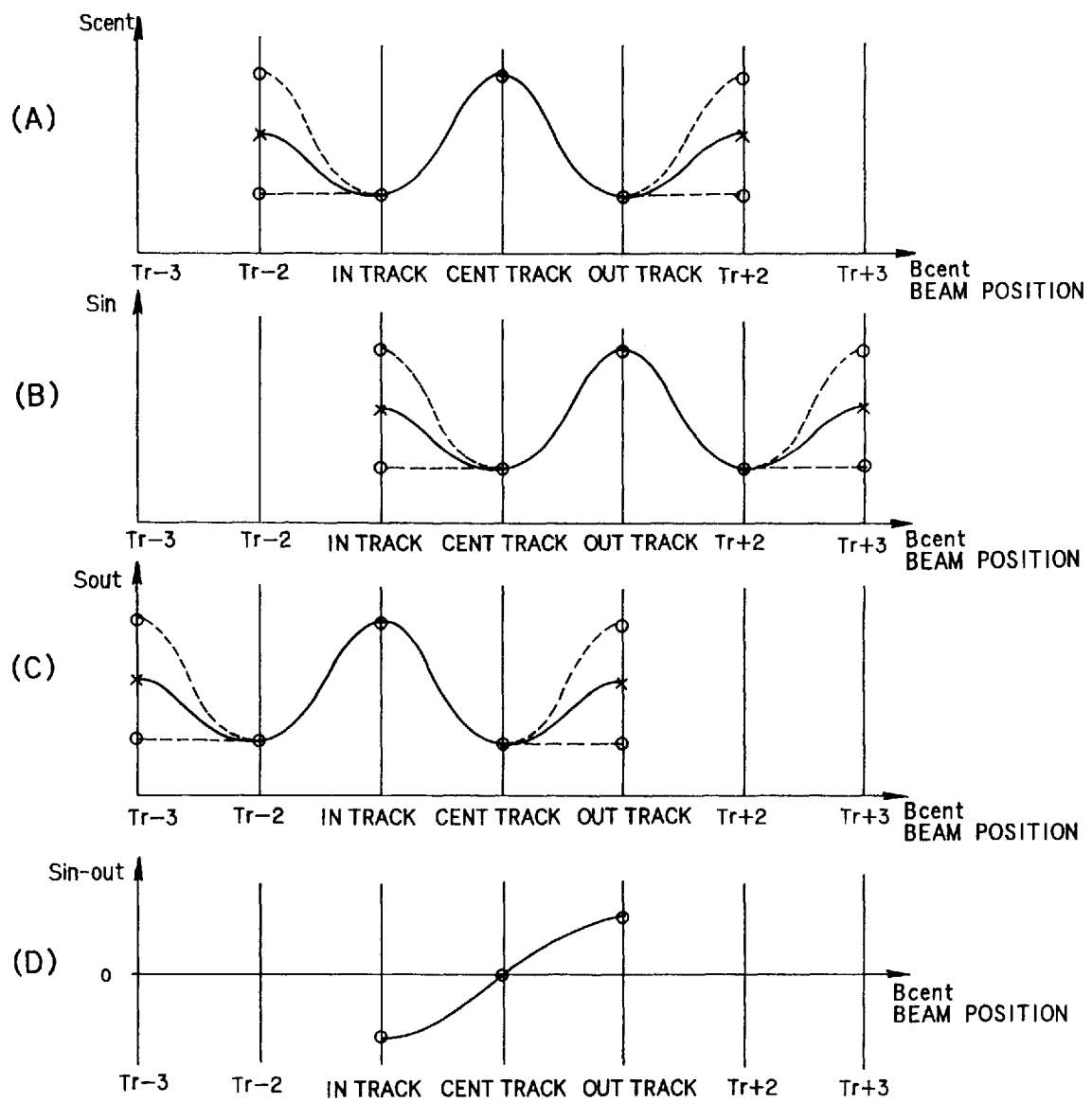
FIG. 25 is a set of graphs (A) to (D) showing the reproduction signal waveforms etc. obtained when each beam crosses the pattern in FIG. 24A.
Figure 26:
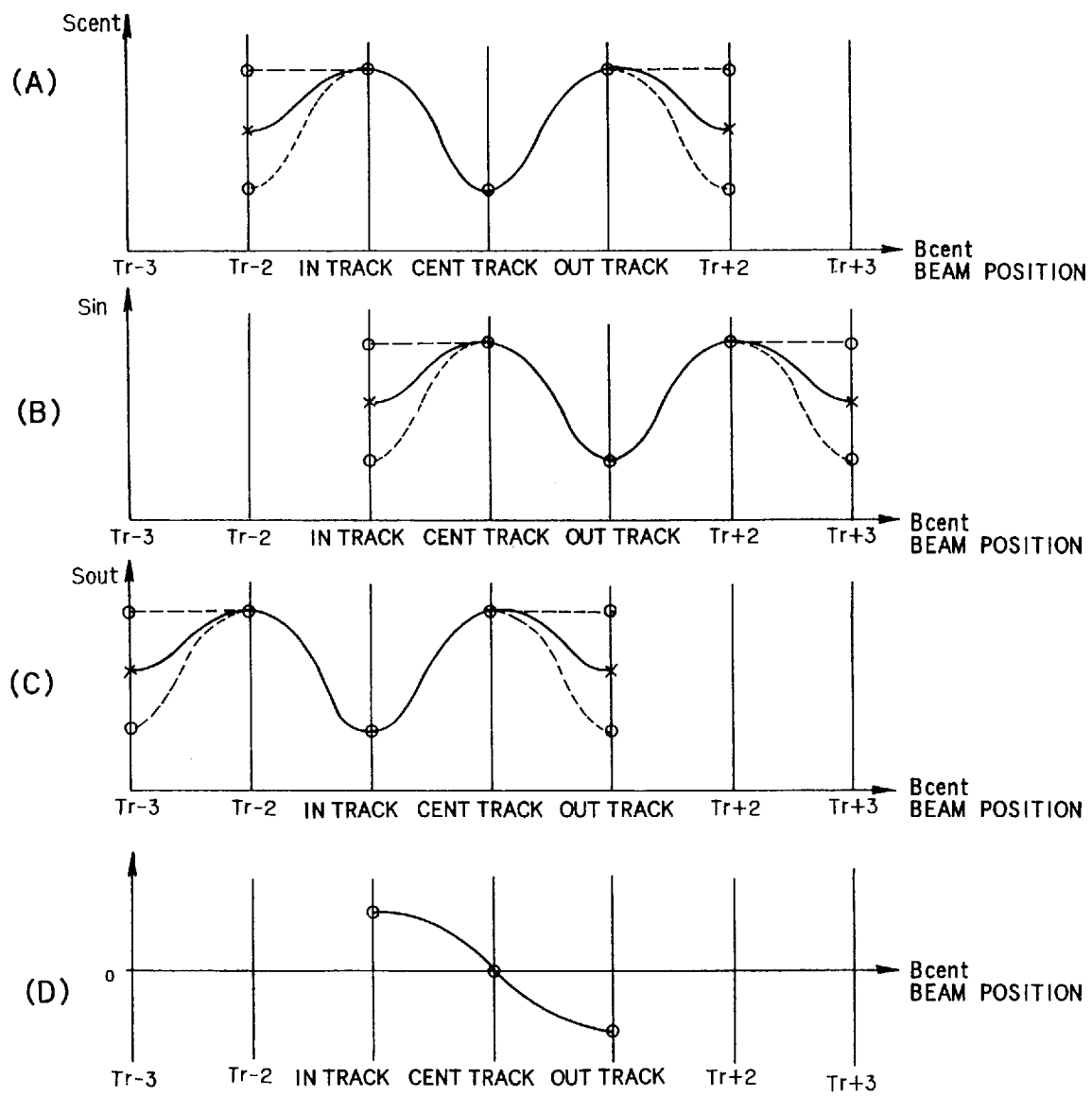
FIG. 26 is a set of graphs (A) to (D) showing the reproduction signal waveforms etc. obtained when each beam crosses the pattern in FIG. 24B.

When the three beams cross the tracks as shown in FIGS. 24A and 24B, the change of the reproduction signal become as shown in FIGS. 25 and 26 respectively. Graphs (A) to (D) of FIG. 25 show the changes of the reproduction signal by each beam in the case of the pattern (4) as shown in FIG. 24A. The axis of abscissas in each of the graphs (A) to (D) of FIGS. 25 indicates the Bcent beam position in the crossing direction of the Bcent beam from the track Tr−2, the track Tr−3 and the OUT tracks at the further IN side from the IN track shown in FIG. 24A to each track of the track Tr+2, the track Tr+3 at the further OUT side. The axis of the ordinates in the graph A of FIG. 25 denotes the reproduction signal Scent by the Bcent beam. The axis of ordinates in the graph B of FIG. 25 denotes the reproduction signal Sin by the Bin beam when the Bcent beam is at the position expressed by the axis of abscissas. The axis of ordinates in the graph C of FIG. 25 denotes the reproduction signal Sout by the Bout beam when the Bcent beam is at the position expressed by the axis of abscissas. The axis of ordinates in the graph D of FIG. 25 denotes the differential signal Sin-out.

FIG. 26 shows the changes of the reproduction signal by each beam in the case of the pattern (5) of FIG. 5, in a manner shown in FIG. 24B. The axis of abscissas and the axis of ordinates in the graphs (A) to (D) are the same as those in FIG. 25.

With referring to FIGS. 25 and 26, the changes of the reproduction signals are described below. First, as for the Scent signal, when the Bcent beam is at the position of the IN track or the OUT track, since the IN track or the OUT track is a pit as shown in the diagrams (i) and (iii) of FIG.

24A, the quantity of the return light decreases as shown in the graph (A) of FIG. 25. When the Bcent beam is at the position of the CENT track, since the CENT track is a mirror as shown in FIG. 24A, the quantity of the return light increases. At the position of the tracks Tr−2 and Tr+2 respectively, it is not recognized whether this track is a pit or a mirror. But, since the incidence probabilities of the pits and the mirrors are equal to each other, the average of the quantity of the return light is an intermediate value as shown in the graph (A) of FIG. 25.

Next, when the Bcent beam is at the position of the CENT track, the Bin beam is at the position of the IN track as shown in the diagram (ii) of FIG. 24A, since the IN track is a pit, the quantity of the return light from the Bin beam decreases as shown in the graph (B) of FIG. 25. When the Bcent beam is at the position of the OUT track, the Bin beam is at the position of the CENT track as shown in the diagram (iii) of FIG. 24A. At this time, since the CENT track is a mirror, the quantity of the return light from the Bin beam increases as shown in the graph (B) of FIG. 25. Further, when the Bcent beam is at the position of track TR+2, the Bin beam is similarly at the position of the OUT track. At this time, since the OUT track is a pit, the quantity of the return light from the Bin beam decreases as shown in the graph (B) of FIG. 25. When the Bcent beam is at the position of the IN track, the Bin beam is at the position of track Tr−2 as shown in the diagram (i) FIG. 24A. Although it is not recognized whether this track is a pit or a mirror, since the incidence probabilities of the pits and the mirrors are equal to each other, the average of the quantity of the return light from the Bin beam is an intermediate value as shown in the graph (B) of FIG. 25. It is also the same when the Bcent beam is at the position of the track Tr+3, and the average of the quantity of the return light from the Bin beam is an intermediate value as shown in the graph (B) of FIG. 25.

When the Bcent beam is at the position of the CENT track, the Bout beam is at the position of the OUT track as shown in the diagram (ii) of FIG. 24A. At this time, since the OUT track is a pit, the quantity of the return light from the Bout beam decreases as shown in the graph (C) of FIG. 25. When the Bcent beam is at the position of the IN track, the Bout beam is at the position of the CENT track as shown in the diagram (i) of FIG. 24A. At this time, since the CENT track is a mirror, the quantity of the return light from the Bout beam increases as shown in the graph (C) of FIG. 25. Further, when the Bcent beam is at the position of the track TR−2, the Bout beam is similarly at the position of the IN track. At this time, since the IN track is a pit, the quantity of the return light from the Bout beam decreases as shown in the graph (C) of FIG. 25. When the Bcent beam is at the position of the OUT track, the Bout beam is at the position of the track Tr+2 as shown in the diagram (iii) of FIG. 24A. Although it is not recognized whether this track is a pit or a mirror, since the incidence probabilities of the pits and the mirrors are equal to each other, the average of the quantity of the return light from the Bout beam is an intermediate value as shown in the graph (C) FIG. 25. It is also the same when the Bcent beam is at the position of the track Tr−3, and the average of the quantity of the return light from the Bout beam is an intermediate value as shown in the graph (C) of FIG. 25.

Thus, in the case of the pit and mirror pattern ④, regarding the Scent signal only, if the Bcent beam is moved in the direction of either the IN side or the OUT side of the CENT track, the increasing and decreasing directions of the Scent signal are the same. As for the Sin signal and the Sout signal, when the Sin signal is an intermediate value, the Sout signal becomes a specific value corresponding to a pit or mirror, and when the Sin signal is a specific value, the Sout signal becomes an intermediate value. Therefore, by determining the Sin-out signal as the differential signal of the Sin signal and the Sout signal, following the direction of the deviation or displacement as shown in the graph (D) of FIG. 25, the signals different in the changing direction are obtained, which can be used as the tracking error signal TE.

Similarly, when the three beams cross each track in the case of the pit and mirror pattern ⑤ as shown in FIG. 24B, the signals change as shown in FIG. 26. As clear from FIG. 26, in the case of the pit and mirror pattern ⑤, the waveform is inverted in polarity as compared with the case of the pit and mirror pattern ④ in FIG. 25. It is common that the increasing and decreasing direction of the Scent signal are the same if the Bcent beam is moved in either direction of the IN side or the OUT side of the CENT track. It is also common that the Sin signal and the Sout signal may take the intermediate value and the specific value. Therefore, when the Sin-out signal which is the differential signal of the Sin signal and the Sout signal is determined, the tracking error signal is obtained as shown in the graph (D) of FIG. 26.

However, since the polarity of the Sin-out signal is opposite between the case corresponding to the graph (D) of FIG. 25 and the case corresponding to the graph (D) of FIG. 26, if the signals are directly passed through the low-pass filter, they are averaged, and the sufficient tracking error signal is not obtained.

In this embodiment, accordingly, by distinguishing the cases of the pit and mirror patterns ④ and ⑤, in the case of the pattern ④, the polarity of the Sin-out signal is not inverted, while, in the case of the pattern ⑤, the polarity of the Sin-out signal is inverted, so that a sufficient tracking error signal TE may be obtained even after passing through the low-pass filter.

Figure 27:
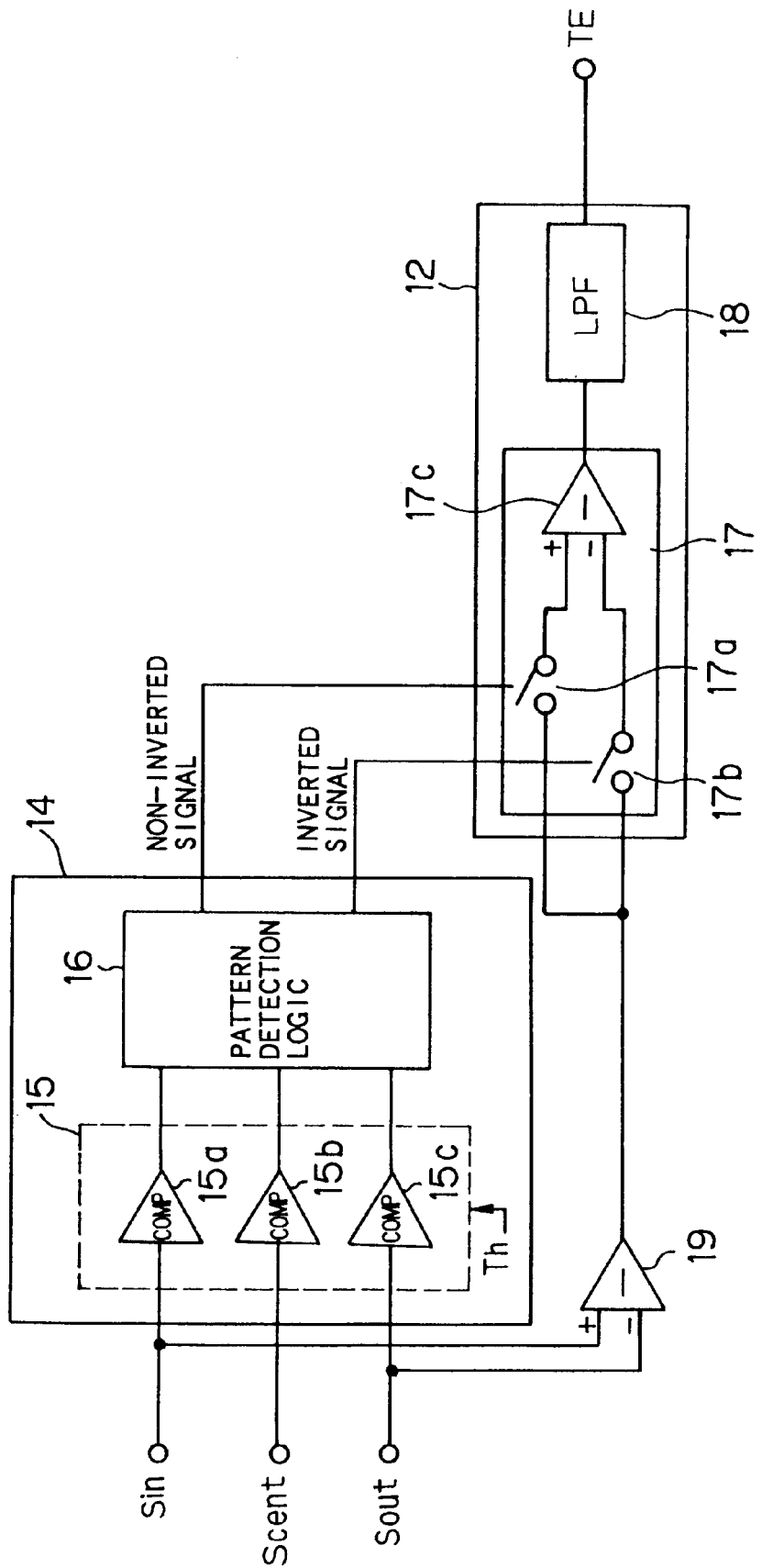
FIG. 27 is a block diagram showing other constitution of a tracking error detection circuit in the fourth embodiment of the invention.

More specifically, the circuit is constructed as shown in FIG. 27.

In FIG. 27, the differential signal Sin-out is determined by the differential amplifier 19, and the three signal values, i.e., the Sin signal, the Scent signal and the Sout signal are compared with the threshold Th. Thereby, the IN track, the CENT track and the OUT track are judged to be pits or mirrors, and on the basis of the judgment result, the polarity of the differential signal Sin-out is inverted.

Thus, according to the fourth embodiment, even if using the pattern in which both of the IN track and the OUT track are the pits or the mirrors, even if the track pitch is not larger than the optical cut-off wavelength or even if the light spot is not focused at the optimum focal length, a tracking error signal TE can be generated. Thus, the tracking servo control can be effected accurately. Further, by shortening the track pitch, the information recording medium may be enhanced in density.

(5) Fifth embodiment

A fifth embodiment of the invention is described below with referring to FIGS. 28 to 32. The same constitutional elements as those in the first to fourth embodiments carry the same reference numerals and the explanations thereof are omitted.

The fifth embodiment is similar to the fourth embodiment in that the polarity of the differential signal Sin-out is inverted or not inverted so as to obtain a tracking error signal TE, but is different from the fourth embodiment in that the polarity is changed over by the value of the Scent signal only.

Figure 28:
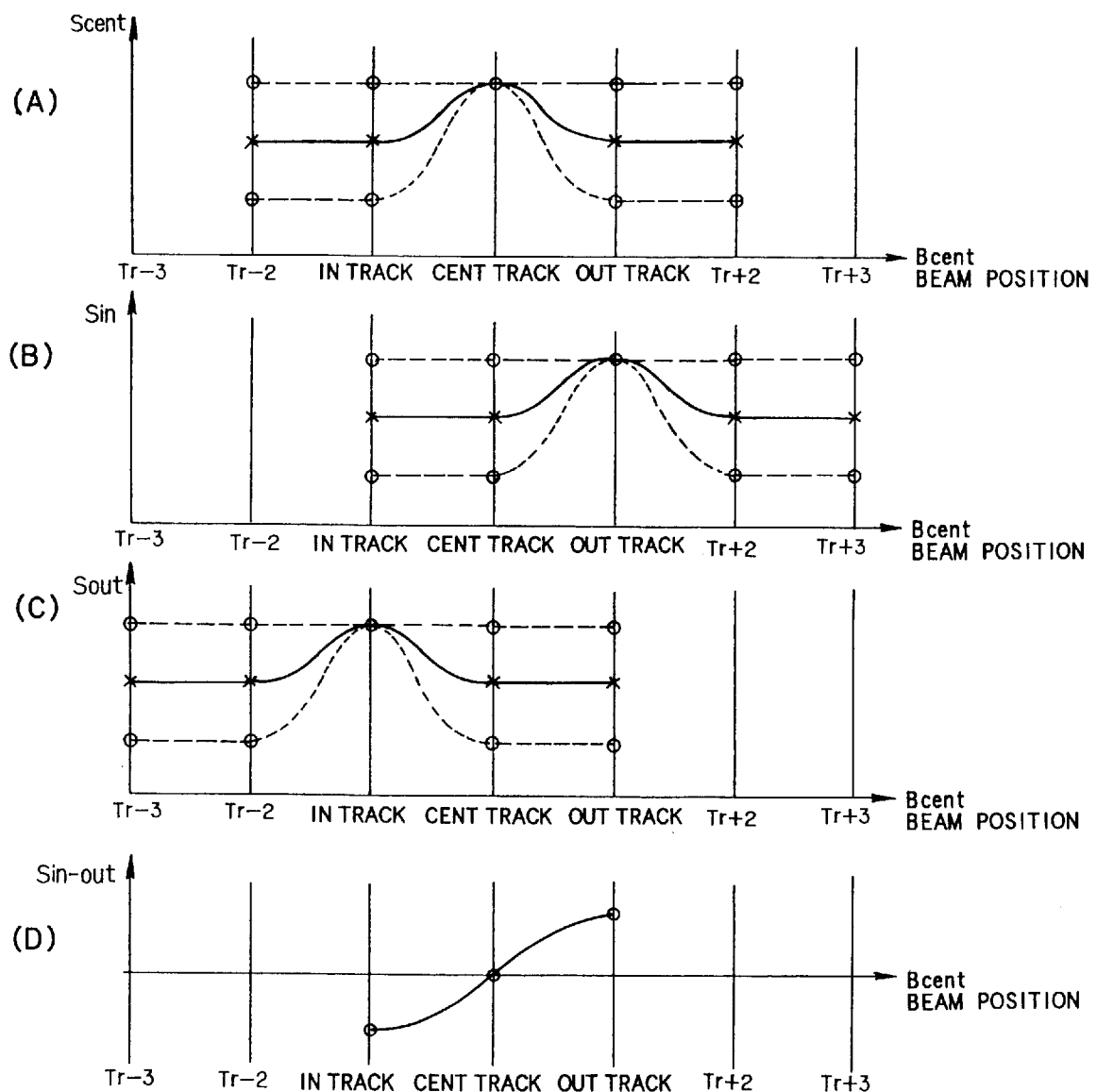
FIG. 28 is a set of graphs (A) to (D) showing the reproduction signal waveforms etc. obtained when each beam crosses each track in case that the central track is a mirror in a fifth embodiment of the invention.

Graphs (A) to (D) of FIG. 28 show the changes of the Scent signal, the Sin signal, the Sout signal and the differential signal Sin-out respectively when the three beams cross in the cases of the patterns ① to ④ of FIG. 5, in each of which the axis of abscissas denotes the position of the Bcent beam same as in FIGS. 25 and 26. The axis of ordinates in the graphs (A) and (B) of FIG. 28 represents the reproduction the Sin signal and the Sout signal by the Bin beam and the Bout beam respectively when the Bcent beam is at the position expressed by the axis of abscissas same as in FIGS. 25 and 26. The axis of ordinates in the graph (D) of FIG. 28 indicates the value of the differential signal Sin-out.

Figure 29:
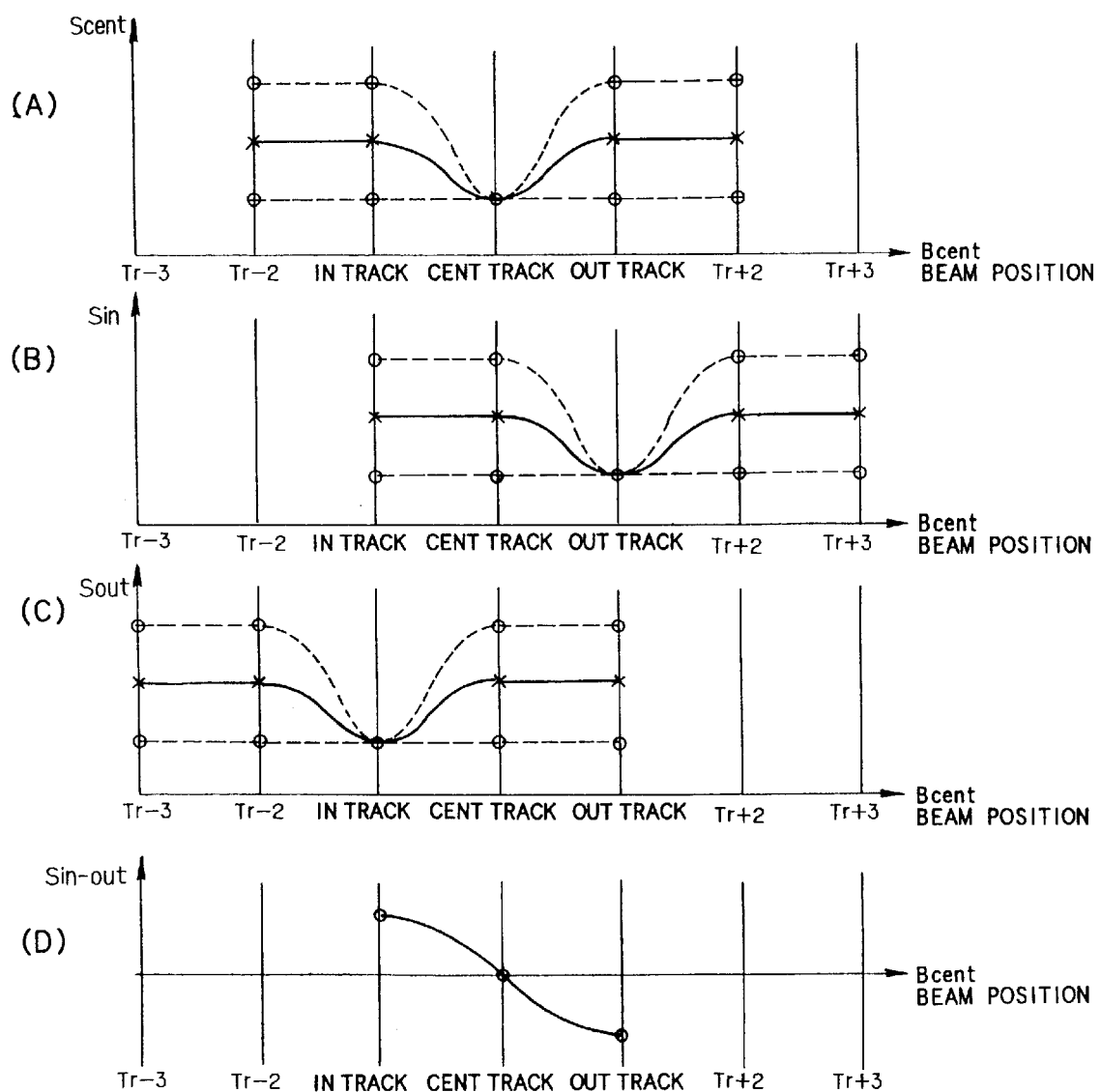
FIG. 29 is a set of graphs (A) to (D) showing the reproduction signal waveforms etc. obtained when each beam crosses each track in case that the central track is a pit in a fifth embodiment of the invention.

Similarly, the graphs (A) to (D) of FIG. 29 show the changes of the Scent signal, the Sin signal, the Sout signal and the differential signal Sin-out when the three beams cross in the cases of the patterns ⑤ to ⑧ of FIG. 5, in each of which the axis of abscissas denotes, same as in FIG. 28, the position of the Bcent beam. The axis of ordinates in each of the graphs (A) and (B) of FIG. 29 represents, same as in FIG. 28. The Sin signal Sin and the Sout signal by the Bin beam and the Bout beam respectively when the Bcent beam is at the position expressed by the axis of abscissas. The axis of the ordinates in the graph (D) of FIG. 29 indicates the value of the differential signal Sin-out.

As understood from the graph (A) of FIG. 28, when the Bcent beam crosses the tracks of the pit and mirror patterns ① to ④, since the CENT track is a mirror in all of the pit and mirror patterns ① to ④, the quantity of the return light from the Bcent beam increases, and the value of Scent signal is always large. However, since the tracks other than the CENT track are either pits or mirrors in the pit and mirror patterns ① to ④, and the incidence probabilities of the pit and the mirror are equal to each other. Accordingly, the average of the Scent signal is an intermediate value.

When the Bcent beam is at the OUT track, the Bin beam is at the position of the CENT track, and the CENT track is a mirror in all of the pit and mirror patterns ① to ④, the quantity of the return light from the Bin beam increases, and the value of Sin signal is always large. However, the tracks other than the CENT track are either pits or mirrors in the pit and mirror patterns ① to ④, and the incidence probabilities thereof are equal to each other. Accordingly, the average of the Sin signal is an intermediate value.

As for the Bout beam, when the Bcent beam is at the IN track, it is at the position of the CENT track, and the CENT track is a mirror in all of pit and mirror patterns ① to ④. Therefore, the quantity of the return light from the Bout beam increases, and the value of the Sout signal is always large. However, the tracks other than the CENT track are either pits or mirrors in the pit and mirror patterns ① to ④. Thus, the incidence probabilities are equal to each other, so that the average of the Sout signal is an intermediate value.

As shown in FIG. 29, it is also same in the cases of the pit and mirror patterns ⑤ to ⑧ of FIG. 5. When the Bin beam, the Bcent, and the Bout beam are at the position of the CENT track. Since the CENT track is a pit in all pit patterns ⑤ to ⑧, the quantity of the return light from each beam decreases, and the value of each signal is always small. However, the tracks other than the CENT track are either pits or mirrors in the pit and mirror patterns ⑤ to ⑧, and the incidence probabilities are equal to each other. Accordingly, the average of the Scent signal is an intermediate value.

Therefore, when the Sin signal is either a large or small specific value, the Sout signal has an intermediate value, or when the Sout signal is either a large or small specific value, the Sin signal has an intermediate value. Because of this specific relation, when the differential signal Sin-out is determined, as shown in the graph (D) of FIG. 28 and the graph (D) of FIG. 29, the signals differing in the changing direction following up the deviation direction of the beams same as in the graph (D) of FIG. 25 and the graph (D) of FIG. 26 are obtained. The polarity is opposite between the cases of FIGS. 28 and 29. The difference between the cases of FIGS. 28 and 29 is the difference in whether the CENT track is a pit or a mirror.

Figure 30:
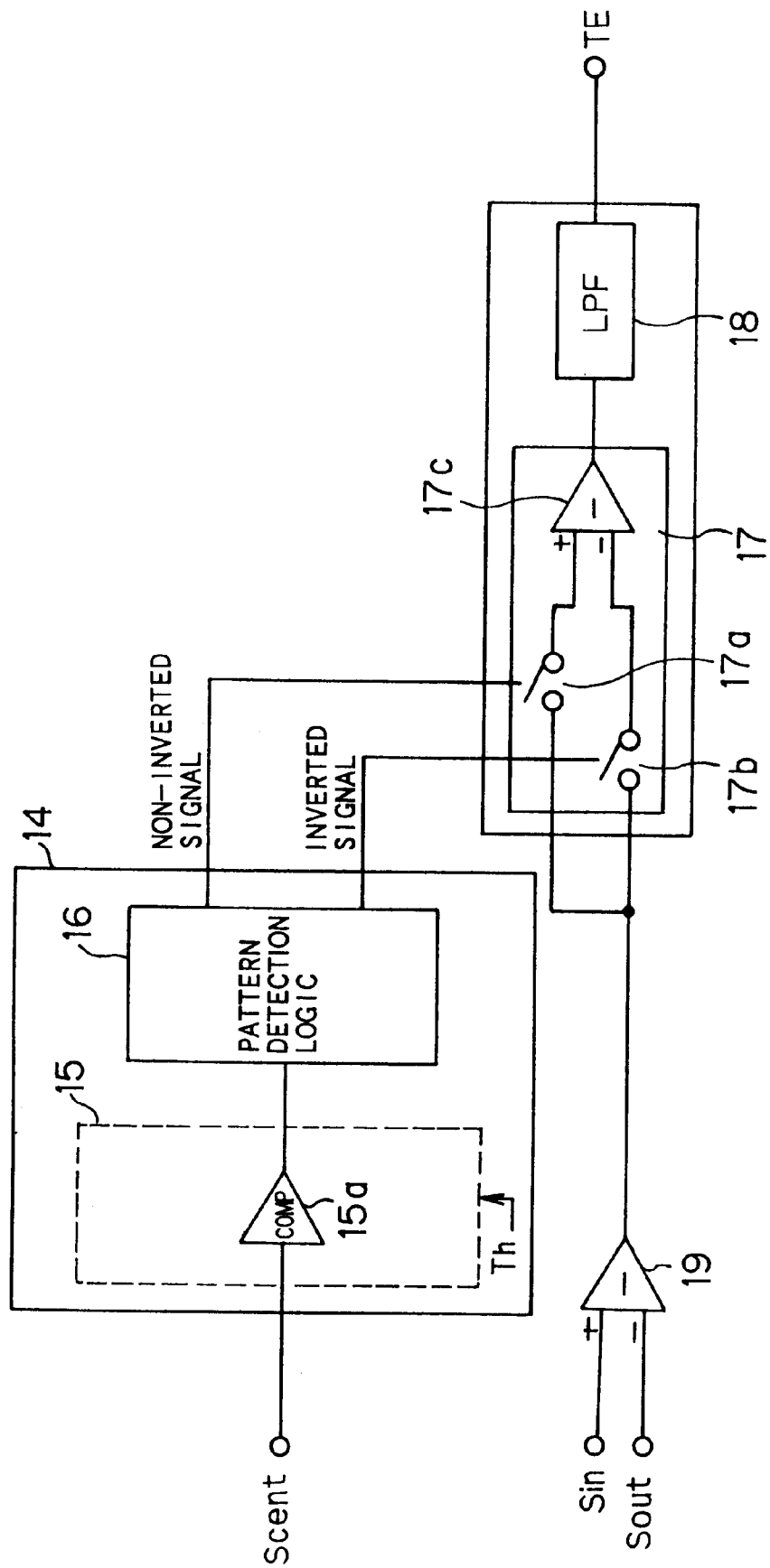
FIG. 30 is a block diagram showing one constitution of a tracking error detection circuit in the fifth embodiment of the invention.

In the fifth embodiment, as shown in FIG. 30, by the comparator 15a of the pit/mirror judging circuit 15, the CENT track is judged to be the pit or mirror on the basis of the reproduction signal Scent from the Bcent beam. If the CENT track is a pit, an inverted signal is outputted from the pattern detection logic 16, and if the CENT track is a mirror, a non-inverted signal is outputted, to thereby drive the switching elements 17a and 17b of the polarity inverting circuit 17. By inverting the polarity of the differential signal Sin-out obtained from the amplifier 19, a tracking error signal TE of the sufficient polarity is obtained as shown in the graph (D) of FIG. 28.

Figure 31:
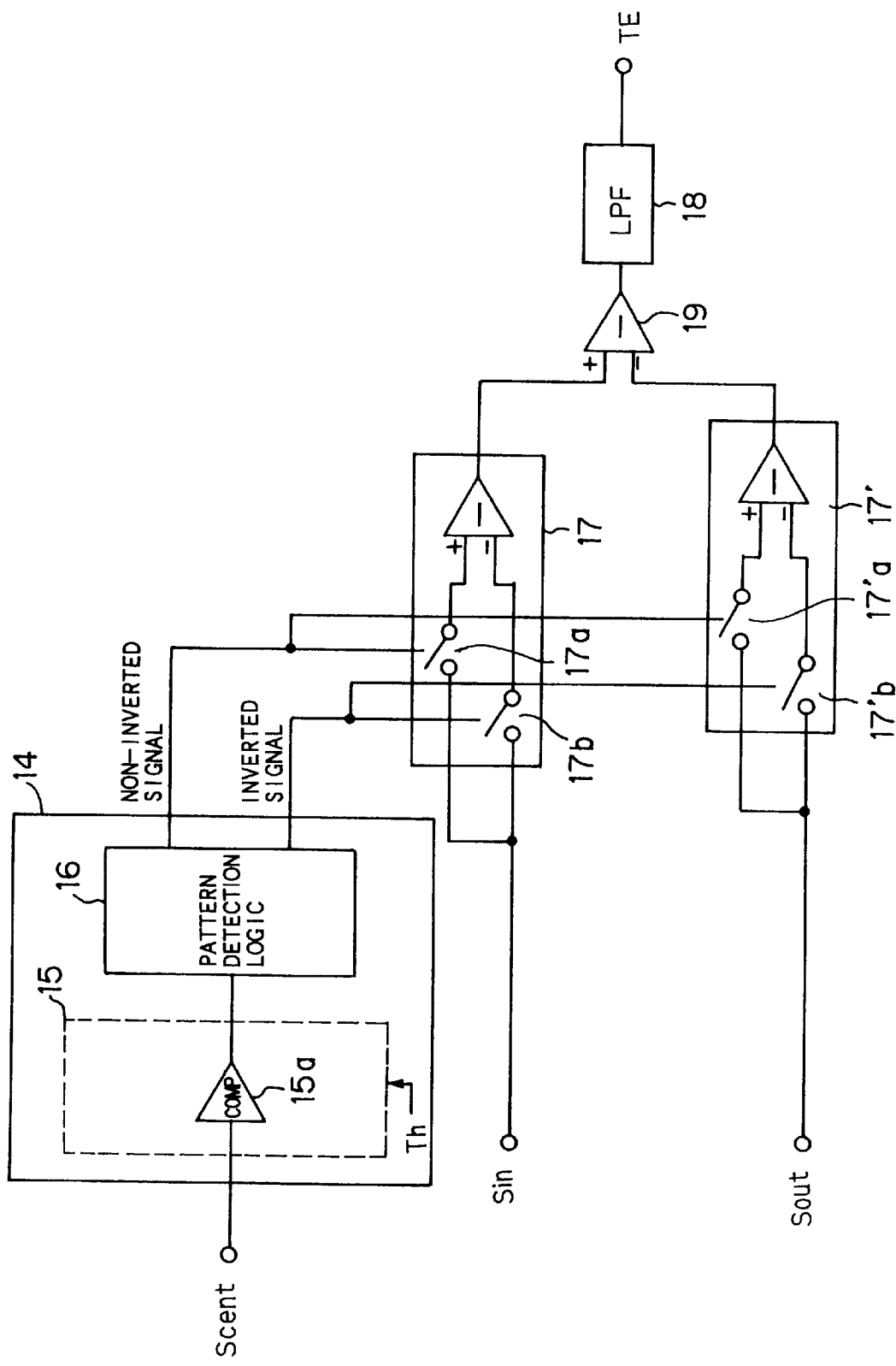
FIG. 31 is a block diagram showing another constitution of a tracking error detection circuit in the fifth embodiment of the invention.
Figure 32:
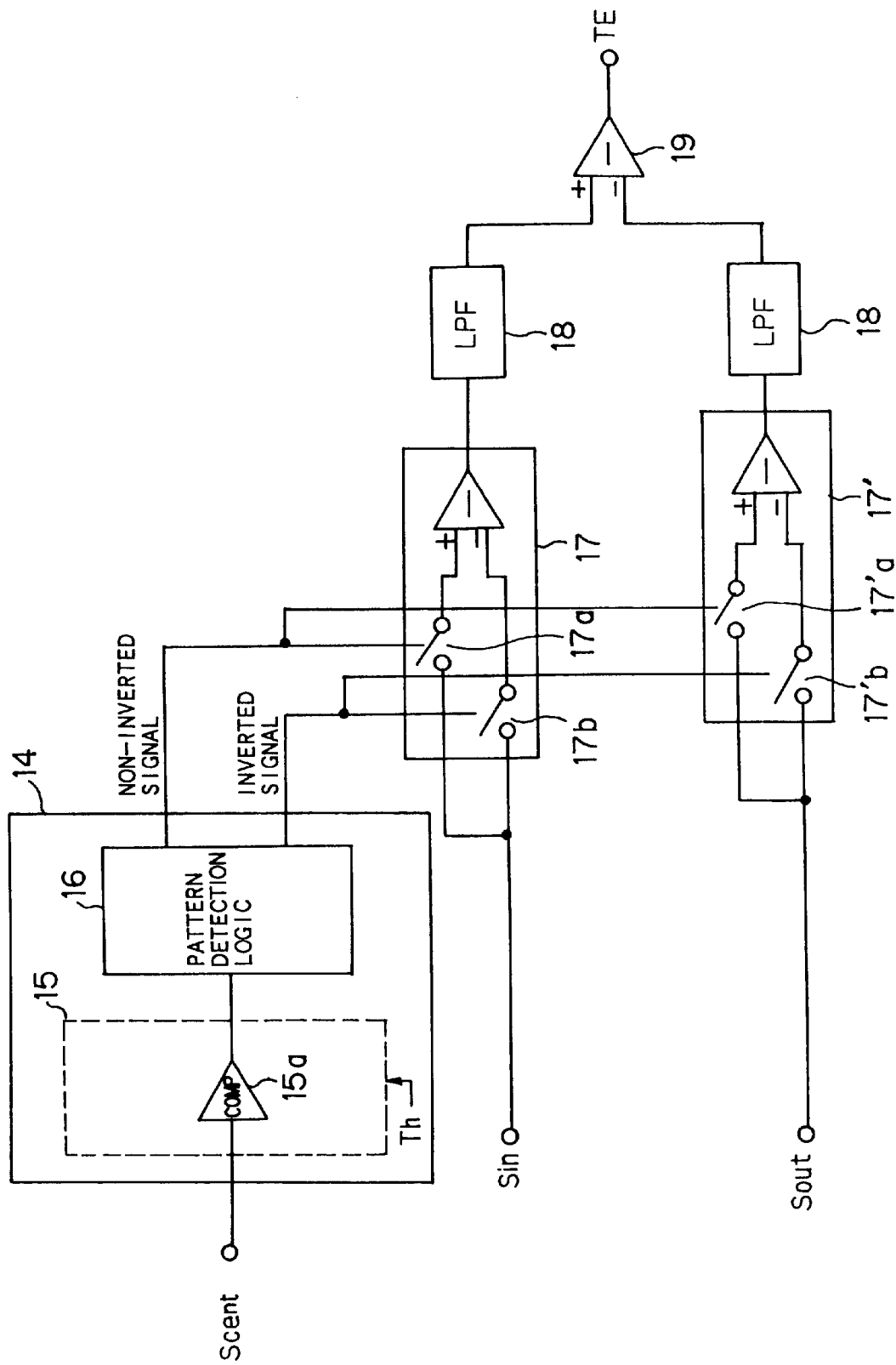
FIG. 32 is a block diagram showing another constitution of a tracking error detection circuit in the fifth embodiment of the invention.

Incidentally, as shown in FIG. 31, after selecting the polarity of the Sin signal and the Sout signal by the polarity inverting circuits 17 and 17', the Sin signal and the Sout signal may be subtracted in the differential amplifier 19. Further, as shown in FIG. 32, the subtraction may be performance after passing through the low-pass filter 18.

In this manner, according to the fifth embodiment, in case that the CENT track is judged to be the pit or mirror on the basis of the Scent signal only, even if the track pitch is not larger than the optical cut-off wavelength or even if the light spot is not focused at the optimum focal length, a tracking error signal TE can be generated from the information recording medium. The tracking servo control can be effected accurately. Also, by shortening the track pitch, the information recording medium may be enhanced in density.

In the fifth embodiment, the beam interval is supposed to be equal to the track pitch, but since only the Sin signal and the Sout signal are required to have the specific values at the positions deviated or displaced from the CENT track, the beam interval is not always required to be equal to the track pitch.

(6) Sixth embodiment

A sixth embodiment of the invention is described below with referring to FIG. 33 to FIG. 36. The same constitutional elements as those in the first to fifth embodiments carry the same reference numerals and the explanations thereof are omitted.

Figure 33:
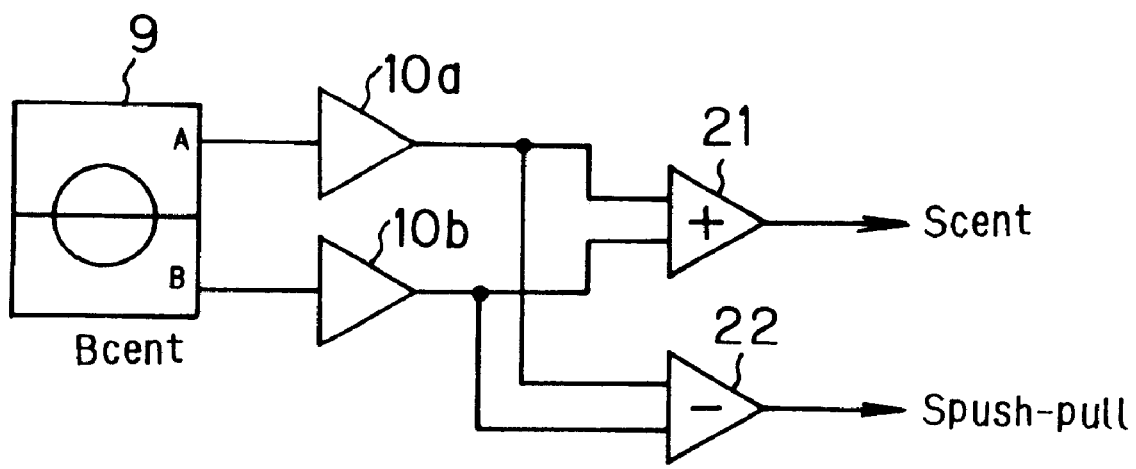
FIG. 33 is a block diagram showing a constitution of a push-pull signal generating circuit in a sixth embodiment of the invention.

The sixth embodiment is an example of obtaining a tracking error signal by using the push-pull method, and a push-pull signal S push-pull is obtained in the circuit composition as shown in FIG. 33.

In FIG. 33, a photo detector 9 in the present embodiment is a two-division photo detector whose division line is parallel to the track, and the output signal from a section A in the photo detector 9 is inputted into a preamplifier 10a, while the output signal from a section B of the photo detector 9 is inputted into a preamplifier 10b. The outputs of the preamplifiers 10a and 10b are inputted into a non-inverting amplifier 21 as one example of a first signal output device, and a inverting amplifier 22 as a second signal output device, and in the non-inverting amplifier 21, the signal from the section A and the signal from the section B are added together, to thereby output the Scent signal. In the inverting amplifier 22, the difference of the signal from the section A and the signal from the section B is calculated, to thereby output a push-pull signal Spush-pull.

Figure 34:
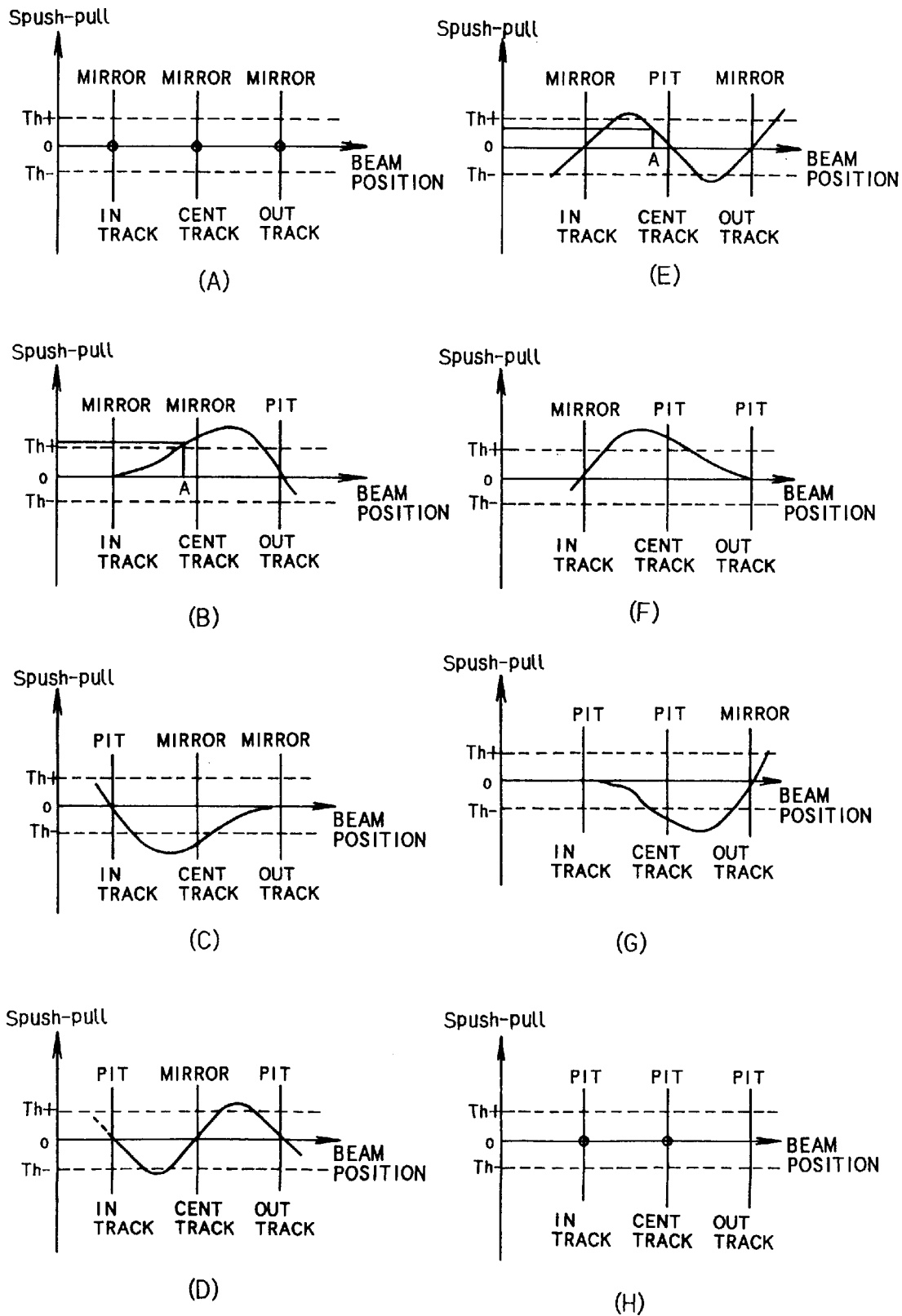
FIG. 34 is a set of graphs (A) to (H) showing the reproduction signal waveforms by the push-pull signal, corresponding to all the pit and mirror patterns of the three tracks adjacent in the radial direction in the sixth embodiment of the invention.

The waveforms of the push-pull signal Spush-pull obtained in such a circuit is shown in FIG. 34. Graphs (A)

to (H) of FIG. 34 show the waveforms of the push-pull signal Spush-pull when one beam Bcent crosses the pit and mirror patterns ①to ⑧in the IN track, the CENT track and the OUT track as shown in FIG. 5.

As shown in the graphs (A) and (H) of FIG. 34, if all tracks are either pits or mirrors, the push-pull signal Spush-pull is not obtained. If the patterns of adjacent tracks are the pits or mirrors, as shown in the graphs (B), (C), (F) and (G) of FIG. 34, the push-pull signals Spush-pull are obtained. However, even if the Bcent beam is at the position of CENT, these push-pull signals Spush-pull do not become zero but some specified positive or negative values. Therefore, these push-pull signals Spush-pull are not suitable to obtain the tracking error signal TE.

On the other hand, the signals shown in the graphs (D) and (E) of FIG. 34 are zero when the Bcent beam is at the position of the CENT track, and when the Bent beam is deviated to the IN track side or the OUT track side, the push-pull signal Spush-pull, which is S-curved, has the different polarity depending on the deviating direction and can be used as a tracking error signal, is outputted. However, the signals shown in the graphs (D) and (E) of FIG. 34 are mutually different in polarity, and hence either signal must be inverted in polarity.

Figure 35:
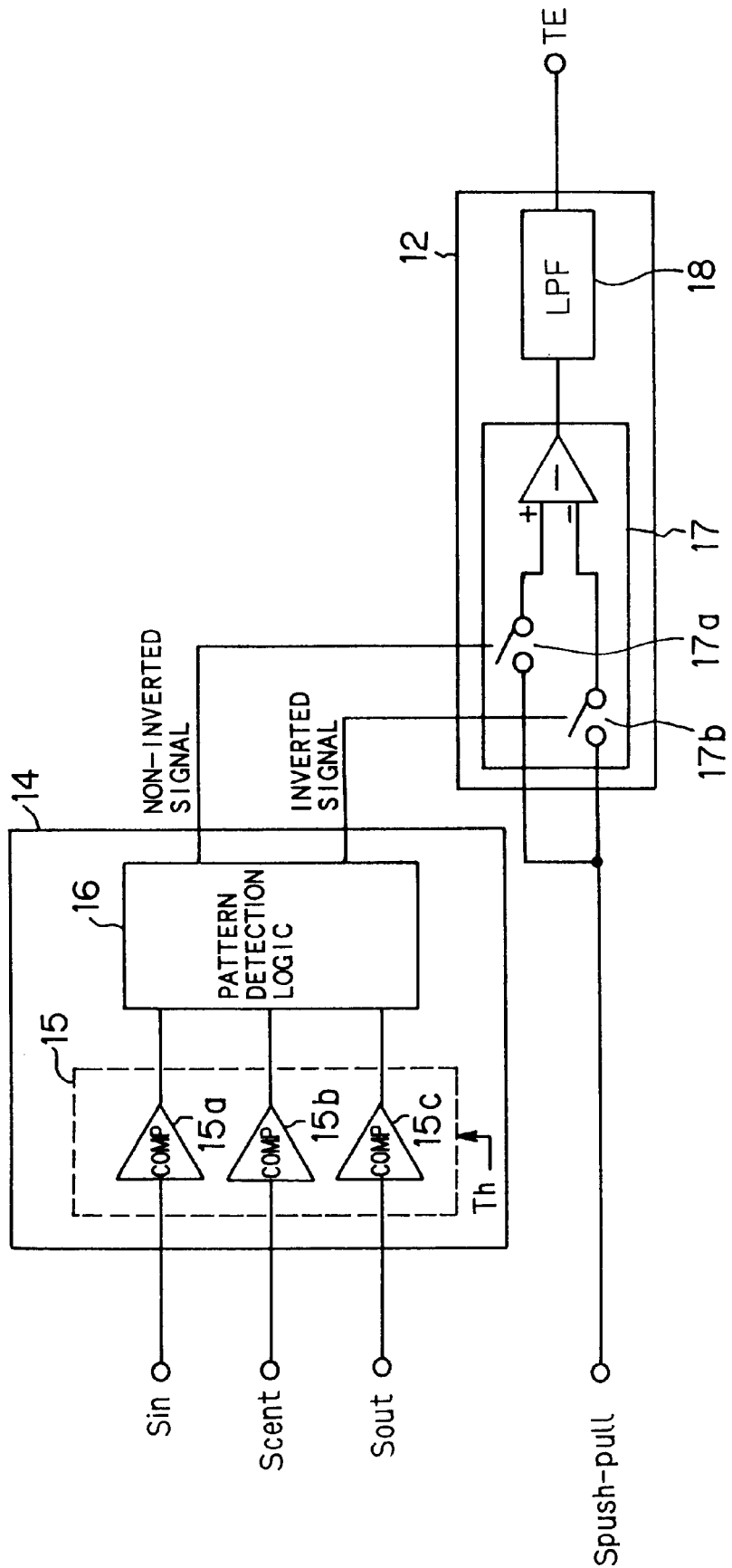
FIG. 35 is a block diagram showing one constitution of a tracking error detection circuit in the sixth embodiment of the invention.

In the sixth embodiment, as shown in FIG. 35, same as in the first embodiment etc., the pit patterns in the graphs (D) and (E) of FIG. 34 are selected on the basis of the Sin signal, the Scent signal and the Sout signal. Then, the polarity of the push-pull signal Spush-pull is inverted such that a non-inverted signal is outputted in the case of the pit pattern corresponding to the graph (D) and an inverted signal is outputted in the case of the pit pattern corresponding to the graph (E).

Figure 36:
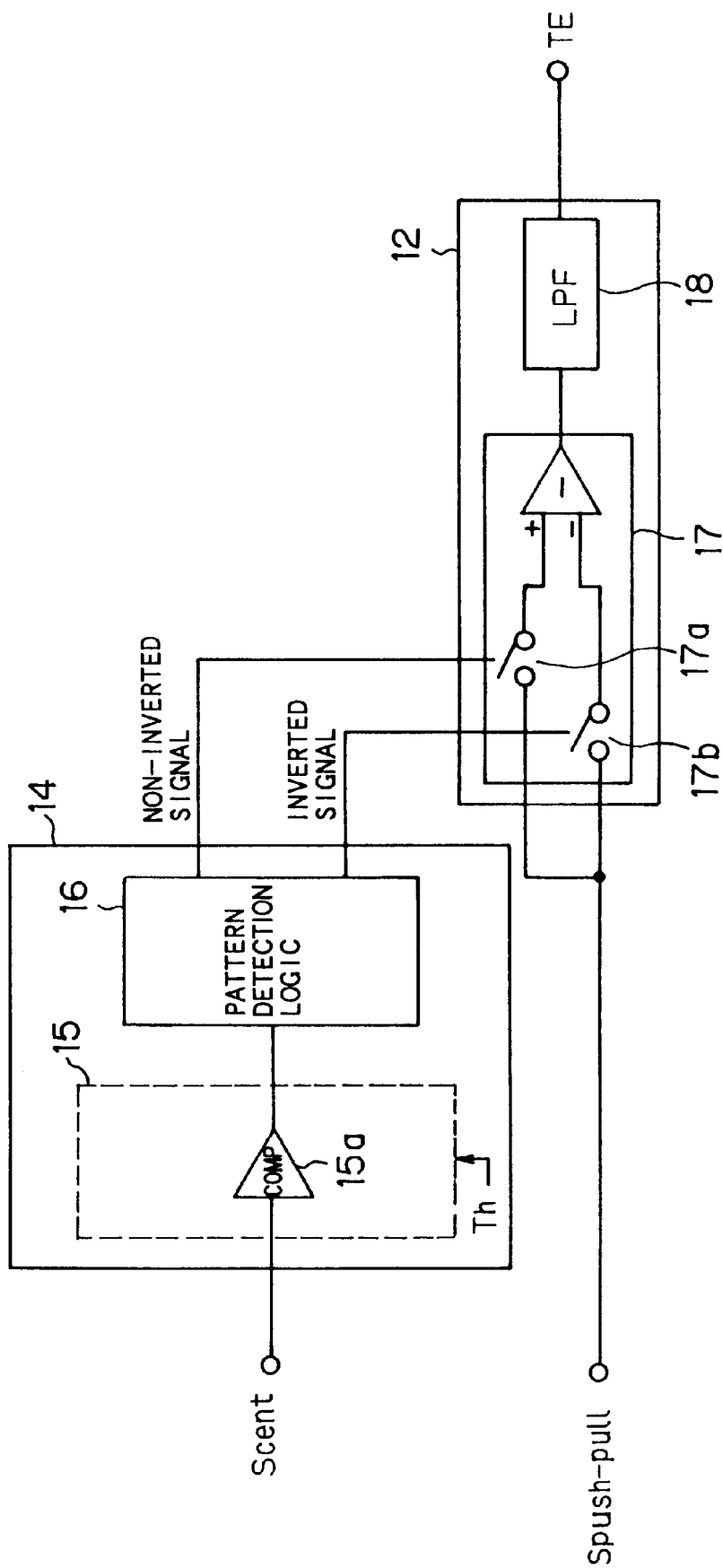
FIG. 36 is a block diagram showing another constitution of a tracking error detection circuit in the sixth embodiment of the invention.

This pit pattern judgment is not limited to the constitution shown in FIG. 35. For example, as shown in FIG. 36, it may be also constructed to judge it by the Scent signal only as in the case of the fifth embodiment. Such a constitution is possible because the incidence probabilities of the pit and mirror patterns corresponding to the graphs (A) to (H) of FIG. 34 are equal to each other, the signal passing through the low-pass filter 18 by extracting the pit and mirror patterns corresponding to the graphs (A) to (D) of FIG. 34 can be regarded as the average of patterns, and the average of these patterns has a nearly same waveform as the pattern corresponding to the graph (D) of FIG. 34. Hence, by the judgment result of pit/mirror of the CENT track only, the polarity of the push-pull signal Spush-pull can be selected as shown in FIG. 36, so that a sufficient tracking error signal TE may be obtained.

Meanwhile, when detecting the non-symmetry of the IN and OUT pit patterns same as in the second embodiment, instead of the Sin-out signal, the push-pull signal Spush-pull may be used. When the Bcent beam is off-track to the IN track side to be at a A position in the graphs (B) and (E) of FIG. 34, it is only in the case corresponding to the graph (B) that the value of the push-pull signal Spush-pull exceeds the specified positive threshold Th+, and it does not exceed the threshold Th+ in the case corresponding to the graph (E). In this way, when a tracking deviation of a slight distance occurs from the CENT track, the value of the push-pull signal Spush-pull exceeds the specified positive threshold Th+ or the specified negative threshold Th− only in the cases corresponding to the graphs (B), (C), (F) and (G) of FIG. 34 (not in the cases corresponding to the graphs (D) and (E) of FIG. 34). Therefore, by outputting the non-inverted signal or the inverted signal when the value of the push-pull signal Spush-pull exceeds the specified positive threshold Th+ or the specified negative threshold Th−, same as in the second embodiment, only the pit and mirror patterns ②, ③, ⑥ and ⑦ of FIG. 5 can be taken out. And that, same as in the second embodiment shown in FIG. 20, the changing portion of the Scent signal in the off-track state can be extracted even after passing through the low-pass filter. Not limited to the second embodiment, the push-pull signal may be also used in the pit pattern judgment in the first embodiment.

Moreover, same as in the third embodiment, by judging the pit patterns by use of the push-pull signal Spush-pull instead of the differential signal Sin-out, the Scent signal and the push-pull signal Spush-pull may be multiplied to change over the polarity. The principle of judging the pit patterns by push-pull signal Spush-pull is same as mentioned above.

In the foregoing embodiments, the recorded portion of the optical disk is expressed as the pits and the other non-recorded portion as the mirrors. But, the present invention is not limited to the recording of information as concave and convex pits as in a ROM disk. For example, the recording of information as pits of different reflectivity such as a phase change type optical disk and a pigment type optical disk may be employed.

As described above, according to the present embodiment, whether the push-pull signal is used as a signal for generating the tracking error signal or as a signal for judging the pit and mirror patterns, even if the track pitch is not larger than the optical cut-off wavelength or even if the light spot is not focused at the optimum focal length, a tracking error signal TE can be generated, and thereby the tracking servo control can be effected accurately. Also, by shortening the track pitch, the information recording medium may be enhanced in density. Further, by using the push-pull signal, the structure of the optical system can be simplified, and the cost may be lowered.

The methods of judging the pits and mirrors in the foregoing first to sixth embodiments described so far and the signals for determining the tracking error signal TE are summarized here in Table 2.

As shown in Table 2, according to the present invention, by the various judging methods, even if the track pitch is not larger than the optical cut-off wavelength or even if the light spot is not focused at the optimum focal length, a tracking error signal TE can be generated, and the tracking servo control can be effected accurately.

TABLE 2

| No. | Embodiment | Signal for detecting error | | | Pit pattern judgment | | | |
|---|---|---|---|---|---|---|---|---|
| | | Scent | Sin-out | Spush-pull | Scent | Sin & Sout | Sin-out | Spush-pull |
| 1 | First (FIG. 12) | ○ | | | | ○ | | |
| 2 | Second (FIG. 18) | ○ | | | | | ○ | |
| 3 | Sixth | ○ | | | | | | ○ |
| 4 | First (FIG. 10) | ○ | | | ○ | ○ | | |
| 5 | Second (FIG. 16) | ○ | | | ○ | | ○ | |
| 6 | Sixth | ○ | | | ○ | | | ○ |
| 7 | Fifth (FIG. 30) | | ○ | | ○ | | | |
| 8 | Fourth (FIG. 27) | | ○ | | ○ | ○ | | |
| 9 | Sixth (FIG. 36) | | | ○ | ○ | | | |
| 10 | Sixth (FIG. 35) | | | ○ | ○ | ○ | | |

TABLE 2-continued

|  |  | Signal for detecting error | | Pit pattern judgment | | |
|---|---|---|---|---|---|---|
| No. | Embodiment | Scent | Sin-out | Spush-pull | Scent | Sin & Sout | Sin-out | Spush-pull |
| 11 | Third (FIG. 22) |  |  |  | Scent × Sin-out | | |
| 12 | Sixth |  |  |  | Scent × Spush-pull | | |

In No. 1 to 12 in Table 2, individually independent methods are shown respectively. The same effects are also obtained by extracting some of those methods and weighting them so as to combine them into one method, and by applying it.

(7) Seventh embodiment

A seventh embodiment of the invention is described below with referring to FIGS. 37 and 38. The same constitutional elements as those in the first to sixth embodiments carry the same reference numerals and the explanations thereof are omitted.

The seventh embodiment is different from the foregoing embodiments in that the detection surface of the photo detector is disposed at the focusing position of the optical disk surface.

Figure 37:
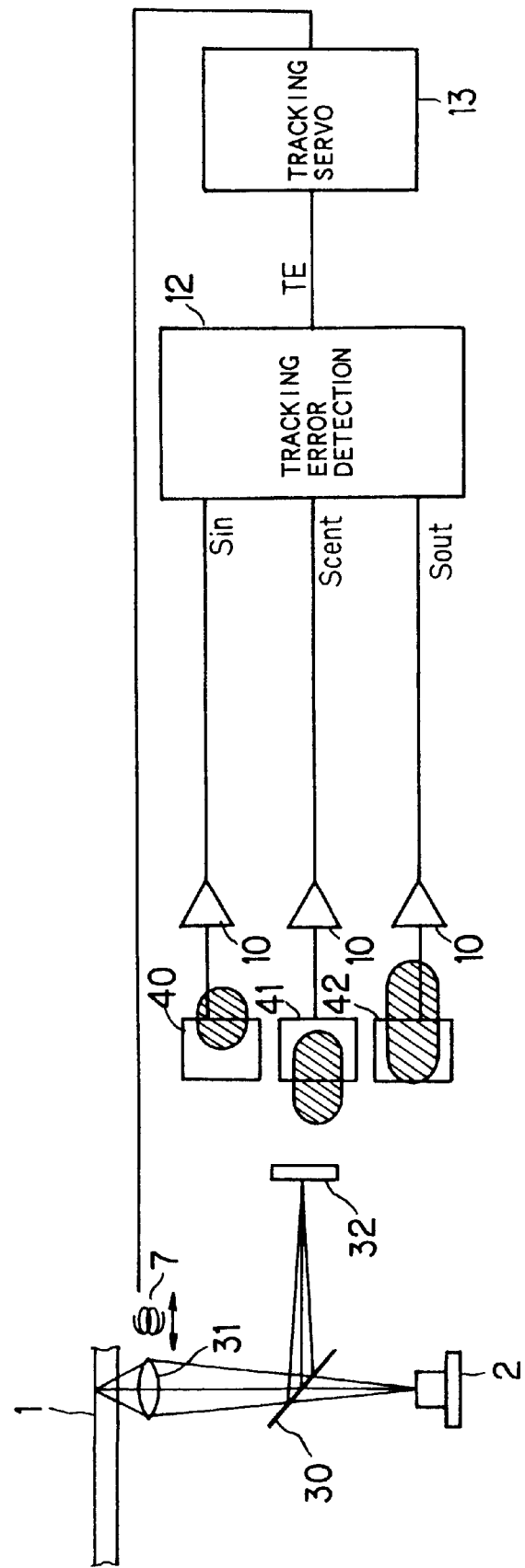
FIG. 37 is a block diagram showing a constitution of an optical disk reproducing apparatus for realizing a tracking error signal generating method in a seventh embodiment of the invention.

FIG. 37 is a block diagram showing a constitution of an optical disk reproducing apparatus for realizing the tracking error signal generating method according to the present embodiment.

In FIG. 37, the optical disk reproducing apparatus of the seventh embodiment is provided with a laser diode 2, a beam splitter 30, an objective lens 31 and a photo detector 32. The light beam emitted from the laser diode 2 illuminates the optical disk 1 through the beam splitter 30 and the objective lens 31. The light beam reflected on the optical disk 1 returns to the beam splitter 30 through the objective lens 31, is reflected by the beam splitter 30, is bent in the running direction, and reaches the photo detector 32. Thus, it is same as in the foregoing embodiments in that the information on the optical disk 1 is read out by using the reflected light from the optical disk 1.

In the foregoing embodiments, however, the light beam is emitted so that a light spot may be formed on the optical disk 1, and the light spot diameter on the optical disk 1 is reduced to the limit of diffraction. Then, the reflected light is received on the detection surface of the photo detector 9. At this time, the light spot emitted to the optical disk 1 is not focused or imaged on this detection surface of the photo detector 9, but it is detected as a so-called far viewing field image, which is deviated from the imaging or focusing position (focusing plane) in each direction by the half difference between the image-forming positions in the vertical direction and in the lateral direction of the optical axis due to the astigmatism.

In the present embodiment, by contrast, the detection surface of the photo detector 32 is disposed at the focusing position (focusing plane) by the objective lens 31. And that, onto the optical disk 1, not only the light spot but also the light having a region spreading to the area of the three tracks or a linear region reduced in one direction only is emitted. On the detection surface of the photo detector 32, the image of the irradiated three tracks of the optical disk is obtained.

Therefore, according to the present embodiment, when the signal is recorded on the optical disk 1 by the pits, (although, if it were observed with a sufficient aperture, the edge portions of the concave and convex pits would be observed as a black marginal image), the margin is spreading so that the entire pits are observed as a dark area since the numerical aperture is in fact limited.

Figure 38:
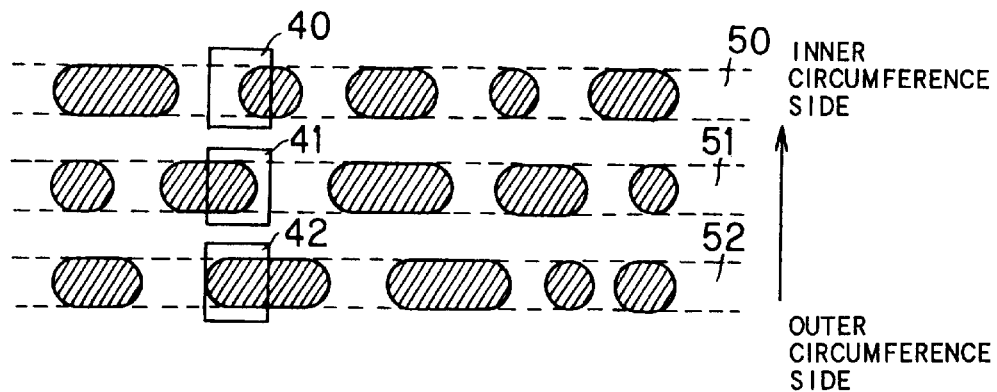
FIG. 38 is a diagram showing the image of the track formed on the photo detector and a detection surface of the photo detector in the seventh embodiment of the invention.

FIG. 38 shows an example of the pit image of the three tracks on the photo detector 32 provided at the image-forming position. In FIG. 38, the shaded area indicates the pit image.

The detection surfaces 40 to 42 of the photo detector 32 in the present embodiment are, as shown in FIG. 38, divided into the three sections in the radial direction so as to correspond to each of the tracks 50 to 52 at the image-forming position. Therefore, in the present embodiment, adjacent tracks on the radius can be detected simultaneously. In the example shown in FIG. 38, the track 51 is the track being read presently, and the tracks 50 and 52 are the tracks adjacent to the track 51.

In the present embodiment, since the three beams are formed by using the grating 3, the three beams are not aligned in the radial direction, and a time lag occurs in the reproduction signals by each beam. To correct this time lag, in the forgoing embodiments, the delay 11 is provided to provide the signal obtained from each beam with a time difference, which varies depending on the rotating speed, so that the signal obtained from each beam is converted into the signal on the same radius.

However, according to the present embodiment, not only the signal of the track being read out presently but also the signals of the tracks adjacent to this track on the same radius can be detected simultaneously by the detection surfaces 40 to 42 divided into the three sections. Therefore, as shown in FIG. 37, advantageously, it is not necessary to dispose a delay between the preamplifiers 10 connected to the detection portion having the detection surfaces 40 to 42, and the tracking error detection circuit 12.

Next, the method of generating the tracking error signal in the optical disk reproducing apparatus in the present embodiment constitution is explained.

In the embodiment, the detection surfaces 40 to 42 of the photo detector 32 are disposed at the image-forming position of the objective lens 31, but the optical system constitution for focusing an image at this image-forming position is basically common to the foregoing embodiments. Therefore, in this embodiment, same as in the foregoing embodiments, the detection signal of the track being presently read is influenced by the crosstalk form the adjacent tracks thereto, and when the track image at the image-forming position is deviated from each center of the detection surfaces 40 to 42, as shown in FIG. 14, a difference occurs in the quantity of the received light on the detection surface 41 for reading the information depending on the pit pattern. Accordingly, also in this embodiment, the tracking error detection circuit 12 is constructed same as in FIG. 12, and the polarity of the detection signal on the detection surface 41 is inverted in the case of a specific pit pattern to pass through the low-pass filter 18, to thereby obtain the tracking error signal TE. However, the invention is not limited to such a constitution alone. For example, if the detection surfaces 40 to 42 of the photo-detector 32 are disposed at the image-forming position of the objective lens 31, the tracking error detection circuit 12 may be constructed as shown in any one of FIGS. 16, 18, 22, 27, 30, 31 and 32.

In these constitutions, the output signal from the detector element corresponding to the detection surface 41 for detecting the signal of the track 51 being presently read corresponds to the Scent signal. Also, the output signal from the detector element corresponding to the detection surface 40 for detecting the signal of the track 50, which is adjacent to the track 51 and is positioned at the inner side of the track 51, corresponds to the Sin signal. Further, the output signal from the detector element corresponding to the detection surface 42 for detecting the signal of the track 52, which is adjacent to the track 51 and is positioned at the outer side of this track 51, corresponds to the Sout signal.

The tracking error signal TE is outputted to the tracking servo circuit 13, and in the tracking servo circuit 13, the actuator 7 is controlled on the basis of this tracking error signal TE, and the objective lens 31 is moved in the radial direction of the optical disk 1, to thereby perform the tracking servo control. In the first to sixth embodiments, meanwhile, the tracking servo control is performed so as to cause the light spot on the optical disk 1 to follow up the track. By contrast, in the present embodiment, the tracking servo control is performed so as to cause the images of the tracks 50 to 52 at the image-forming position to follow up the center of the detection surfaces 40 to 42, respectively.

In the foregoing embodiments, in order to perform an accurate tracking servo control, it is necessary to correct the time lag of the reproduction signals of the three beams precisely by the adjustment of the delay 11. However, the time lag of the reproduction signals of the three beams cannot be corrected precisely unless the tracking servo control is effected accurately. Therefore, in the foregoing embodiments, it is necessary to settle gradually the control amount by the tracking servo control and the adjustment amount of the delay 11.

According to the constitution of the present embodiment, since the signals of the three tracks can be detected without the time lag, such a delay adjustment is not necessary, resulting in that the tracking servo control can be easily performed.

As described above, according to the seventh embodiment, since the position of the photo detector is provided at the image-forming position of the objective lens, the light in a shape having a specified spreading area for the optical disk or in a linear form reduced in one direction only can be emitted, and the images of plural tracks are focused at the photo detector positions respectively. Thus, the signals of plural tracks can be detected without the time lag, and an adequate tracking error signal TE can be obtained as mentioned above. As a result, easy and adequate tracking servo control can be effected.

(8) Eighth embodiment

An eighth embodiment of the invention is described below with referring to FIGS. 39 and 40. The same constitutional elements as those in the first to seventh embodiments carry the same reference numerals and the explanations thereof are omitted.

The eighth embodiment realizes the signal corresponding to the push-pull signal in the sixth embodiment, in the constitution of disposing the photo detector at the focal or image-forming position of the objective lens same as in the seventh embodiment.

Figure 39:
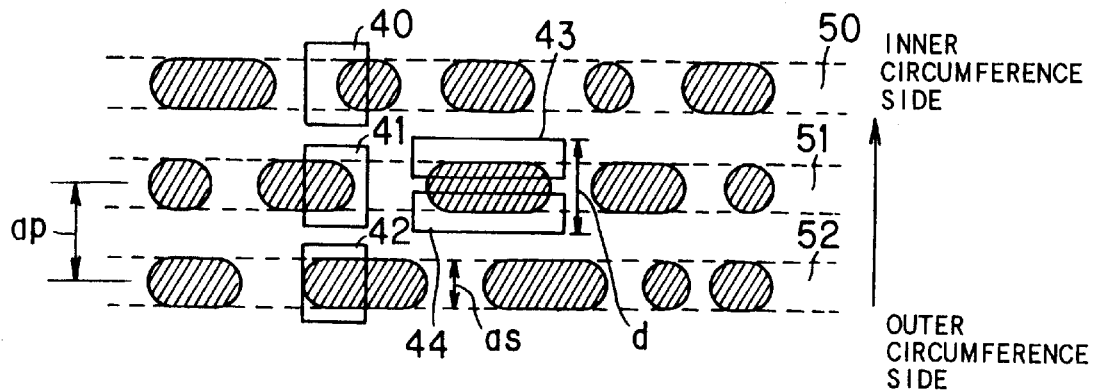
FIG. 39 is a diagram showing the image of the track formed on the photo detector and a detection surface of the photo detector in an eighth embodiment of the invention.

In the eighth embodiment, to realize such a constitution, as shown in FIG. 39, the detector elements having a detection surface 43 and a detection surface 44, each of which is divided and disposed in the radial direction of the central line of the track 51 are used. Then, the pit image is divided in the radial direction and the signal is detected by these detector elements.

Figure 40:
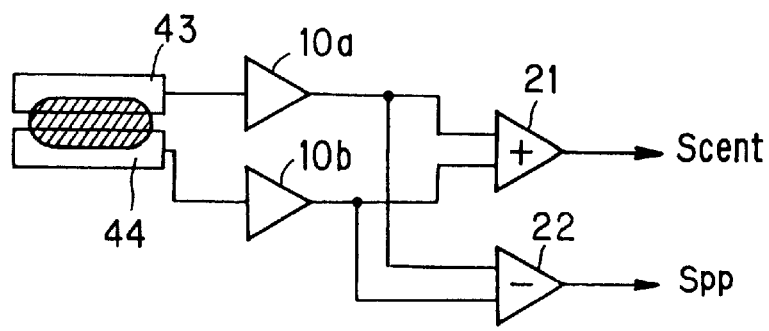
FIG. 40 is a block diagram showing a constitution of a circuit for generating a signal corresponding to the push-pull circuit in the eighth embodiment of the invention.
Figure 41:
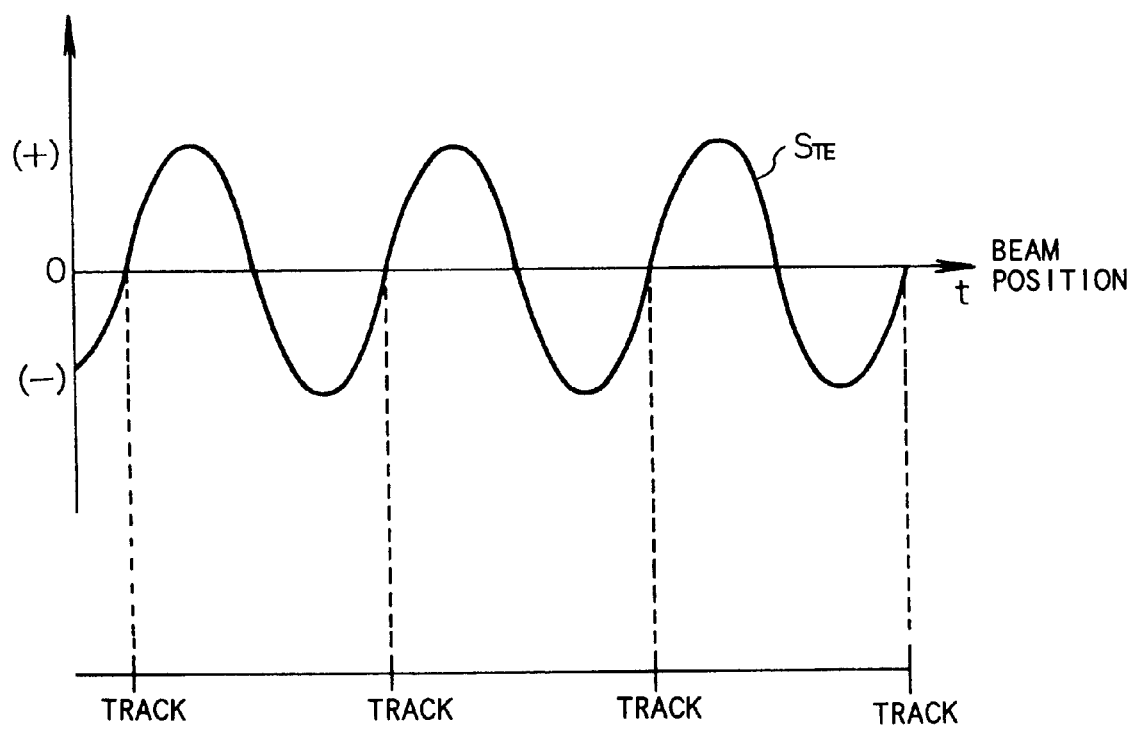
FIG. 41 is a graph showing a tracking error signal versus tracks.

As shown in FIG. 40, these signals from the detector elements having such detection surfaces 43 and 44 respectively are added together by a non-inverting amplifier 21 to thereby obtain the Scent signal, while the difference of these signals from the detector elements is calculated by an inverting amplifier 22 to thereby obtain the Spp signal corresponding to push-pull signal.

In the sixth embodiment, on the pupil surface, i.e., the focus out-of-surface as seen from the optical disk, the pit is divided in the radial direction and the signal is detected. By contrast, in the eighth embodiment, the pit image is divided in the radial direction on the focal surface, i.e., the image-forming surface of the objective lens. Between these constitutions, there is no difference in the electric circuit. But in the method of the sixth embodiment, there is no limit to the size of the detector, but in the eighth embodiment, there is a certain limit to the size of the detector owing to the imaging magnification and the track pitch.

Supposing the lateral magnification of the imaging optical system to be α, for the track pitch p on the optical disk, the pitch of the tracks 51 and 50, or the tracks 51 and 52 on the image-forming surface of the photo detector 32 is expressed as:

$$\alpha \times p \qquad (1)$$

Herein, the total d of the widths including the division intervals of the detection surfaces 43 and 44 is expressed as follows, supposing the track width or bit width on the optical disk to be s:

$$d < 2 \times \alpha \times p - \alpha \times s \qquad (2)$$

By setting in this manner, without receiving the effects of the recorded signals on the adjacent tracks 51 and 52, the width can be defined so as to incorporate only the present reading track 51 and its surrounding image.

Contrary to this setting, supposing:

$$d \geq 2 \times \alpha \times p - \alpha \times s \qquad (3)$$

the photo detector 32 cannot detect the image of one track only, and the tracking error cannot be detected. When the value of d satisfies the formula (2), the tracking position can be detected, and this value may be obtained as the optimum value depending on the wavelength of the light, the numerical aperture, the bit width and the track pitch of the optical disk.

In each of the seventh and eighth embodiments, the detection surfaces are formed in a square shape. But, they may be also formed in triangular, elliptical, trapezoidal, or any other shape. Besides, the shape of the division portion of the detection surface is not required to be parallel and straight. For example, if the width is partly different, or it may be divided by a curve depending on the lens aberration, similar effects can be obtained.

As described above in detail, according to the eighth embodiment, in the constitution disposing the position of the photo detector at the image-forming position of the objective lens, the detector having the detection surfaces divided and disposed in the radial direction from the track is provided. Further, the signal corresponding to the push-pull signal is obtained. Therefore, an adequate tracking error signal TE can be obtained same as in the sixth embodiment. As a result, easy and adequate tracking servo control is realized.

According to the foregoing embodiments, the specific signal is prevented from being averaged after passing through the low-pass filter. Therefore, if the track interval of the information recording medium is smaller than the luminous flux or the light spot, a tracking error signal TE can be generated after passing through the low-pass filter, and the tracking servo control can be performed accurately. Since the tracking interval can be narrowed, the information recording medium can be heightened in density. Moreover, since the detection surface of the reflected light is coincident with the image-forming surface, the information of plural tracks can be easily read out simultaneously, so that the information recorded as high density can be reproduced at a high transfer rate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-070135 filed on Mar. 19$^{th}$, 1998 including the specification, claims, drawings and summary are incorporated herein by reference in its entirety.

What is claimed is:

1. A tracking error signal generating method comprising:
   a light irradiating process of irradiating a plurality of tracks, which are on an information record medium and adjacent to each other with an interval smaller than a size of a light beam in a radial direction of the information record medium, with the light beam, while relatively moving the light beam in the radial direction and a tangential direction of the tracks with respect to the tracks;
   a light receiving process of receiving a reflection light from the tracks irradiated with the light beam, and generating a detection signal based on the received reflection light;
   a judging process of performing a judgment of a recording portion and a non-recording portion on at least one of the tracks irradiated with the light beam, on the basis of the detection signal;
   a signal acquiring process of acquiring a specific signal, which indicates a change of the detection signal in correspondence with a displacement in the radial direction of the light beam relative to the tracks and whose changing direction is varied depending on a direction of the displacement, on the basis of a judgment result by said judging process; and
   a polarity switching process of switching over a polarity of the specific signal on the basis of the judgment result.

2. A method according to claim 1, wherein
   said light irradiating process comprises a process of irradiating the tracks with three light beams arranged in the radial direction,
   said light receiving process comprises a process of receiving each of reflection lights from the tracks irradiated with the three light beams and generating three detection signals based on the received reflection lights respectively,
   said judging process comprises a process of performing the judgment of the recording portion and the non-recording portion on the tracks irradiated with the three light beams, on the basis of at least the detection signals based on an inner one and an outer one of the three light beams, and
   said signal acquiring process comprises a process of acquiring the detection signal based on a central one of the three light beams as the specific signal.

3. A method according to claim 1, wherein
   said light irradiating process comprises a process of irradiating the tracks with just one light beam,
   said light receiving process comprises a process of receiving the reflection light from the tracks irradiated with the one light beam and generating a push-pull signal and one detection signal based on a light amount of the received reflection light as the detection signal,
   said judging process comprises a process of performing the judgment of the recording portion and the non-recording portion on the tracks irradiated with the one light beam, on the basis of at least the generated push-pull signal, and
   said signal acquiring process comprises a process of acquiring the generated one detection signal as the specific signal.

4. A method according to claim 1, wherein
   said light irradiating process comprises a process of irradiating the tracks with three light beams arranged in the radial direction,
   said light receiving process comprises a process of receiving each of reflection lights from the tracks irradiated with the three light beams and generating three detection signals based on the received reflection lights respectively,
   said judging process comprises a process of performing the judgment of the recording portion and the non-recording portion on the tracks irradiated with the three light beams, on the basis of at least the detection signal based on a central one of the three light beams, and
   said signal acquiring process comprises a process of acquiring the detection signals based on an inner one and an outer one of the three light beams as the specific signal.

5. A method according to claim 1, wherein
   said light irradiating process comprises a process of irradiating the tracks with just one light beam,
   said light receiving process comprises a process of receiving the reflection light from the tracks irradiated with the one light beam and generating a push-pull signal and one detection signal based on a light amount of the received reflection light as the detection signal,
   said judging process comprises a process of performing the judgment of the recording portion and the non-recording portion on the tracks irradiated with the one light beam, on the basis of at least the generated one detection signal, and
   said signal acquiring process comprises a process of acquiring the generated push-pull signal as the specific signal.

6. A method according to claim 1, wherein
   said light irradiating process comprises a process of irradiating the tracks with three light beams arranged in the radial direction,
   said light receiving process comprises a process of receiving each of reflection lights from the tracks irradiated with the three light beams and generating three detection signals based on the received reflection lights respectively,
   said judging process comprises a process of calculating a differential signal of the detection signals based on an inner one and an outer one of the three light beams, to thereby perform the judgment on the basis of a calculation result,
   said signal acquiring process comprises a process of acquiring the detection signal based on a central one of the three light beams as the specific signal, and
   said polarity switching process comprises a process of multiplying the detection signal based on a central one of the three light beams and the calculated differential signal, to thereby switch the polarity of the specific signal on the basis of a multiplication result.

7. A method according to claim 1, wherein said light irradiating process comprises a process of irradiating the tracks with just one light beam, said light receiving process comprises a process of receiving the reflection light from the tracks irradiated with the one light beam and generating a push-pull signal and one detection signal based on a light amount of the received reflection light as the detection signal, said judging process comprises a process of performing the judgment of the recording portion and the non-recording portion on the tracks irradiated with the one light beam, on the basis of the generated push-pull signal, said signal acquiring process comprises a process of acquiring the generated one detection signal as the specific signal, and said polarity switching process comprises a process of multiplying the specific signal and the push-pull signal, to thereby switch the polarity of the specific signal on the basis of a multiplication result.

8. A tracking error signal generating apparatus comprising:

a light irradiating device for irradiating a plurality of tracks, which are on an information record medium and adjacent to each other with an interval smaller than a size of a light beam in a radial direction of the information record medium, with the light beam, while relatively moving the light beam in the radial direction and a tangential direction of the tracks with respect to the tracks;

a light receiving device for receiving a reflection light from the tracks irradiated with the light beam, and generating a detection signal based on the received reflection light;

a judging device for performing a judgment of a recording portion and a non-recording portion on at least one of the tracks irradiated with the light beam, on the basis of the detection signal;

a signal acquiring device for acquiring a specific signal, which indicates a change of the detection signal in correspondence with a displacement in the radial direction of the light beam relative to the tracks and whose changing direction is varied depending on a direction of the displacement, on the basis of a judgment result by said judging device; and a polarity switching device for switching over a polarity of the specific signal on the basis of the judgment result.

9. An apparatus according to claim 8, wherein said light irradiating device comprises a device for irradiating the tracks with three light beams arranged in the radial direction, said light receiving device comprises a device for receiving each of reflection lights from the tracks irradiated with the three light beams and generating three detection signals based on the received reflection lights respectively, said judging device comprises a device for performing the judgment of the recording portion and the non-recording portion on the tracks irradiated with the three light beams, on the basis of at least the detection signals based on an inner one and an outer one of the three light beams, and said signal acquiring device comprises a device for acquiring the detection signal based on a central one of the three light beams as the specific signal.

10. An apparatus according to claim 8, wherein said light irradiating device comprises a device for irradiating the tracks with just one light beam, said light receiving device comprises a device for receiving the reflection light from the tracks irradiated with the one light beam and generating a push-pull signal and one detection signal based on a light amount of the received reflection light as the detection signal, said judging device comprises a device for performing the judgment of the recording portion and the non-recording portion on the tracks irradiated with the one light beam, on the basis of at least the generated push-pull signal, and said signal acquiring device comprises a device for acquiring the generated one detection signal as the specific signal.

11. An apparatus according to claim 8, wherein said light irradiating device comprises a device for irradiating the tracks with three light beams arranged in the radial direction, said light receiving device comprises a device for receiving each of reflection lights from the tracks irradiated with the three light beams and generating three detection signals based on the received reflection lights respectively, said judging device comprises a device for performing the judgment of the recording portion and the non-recording portion on the tracks irradiated with the three light beams, on the basis of at least the detection signal based on a central one of the three light beams, and said signal acquiring device comprises a device for acquiring the detection signals based on an inner one and an outer one of the three light beams as the specific signal.

12. An apparatus according to claim 8, wherein said light irradiating device comprises a device for irradiating the tracks with just one light beam, said light receiving device comprises a device for receiving the reflection light from the tracks irradiated with the one light beam and generating a push-pull signal and one detection signal based on a light amount of the received reflection light as the detection signal, said judging device comprises a device for performing the judgment of the recording portion and the non-recording portion on the tracks irradiated with the one light beam, on the basis of at least the generated one detection signal, and said signal acquiring device comprises a device for acquiring the generated push-pull signal as the specific signal.

13. An apparatus according to claim 8, wherein said light irradiating device comprises a device for irradiating the tracks with three light beams arranged in the radial direction, said light receiving device comprises a device for receiving each of reflection lights from the tracks irradiated with the three light beams and generating three detection signals based on the received reflection lights respectively, said judging device comprises a device for calculating a differential signal of the detection signals based on an inner one and an outer one of the three light beams, to thereby perform the judgment on the basis of a calculation result, said signal acquiring device comprises a device for acquiring the detection signal based on a central one of the three light beams as the specific signal, and said polarity switching device comprises a device for multiplying the detection signal based on a central one of the three light beams and the calculated differential signal, to thereby switch the polarity of the specific signal on the basis of a multiplication result.

14. An apparatus according to claim 8, wherein said light irradiating device comprises a device for irradiating the tracks with just one light beam, said light receiving device comprises a device for receiving the reflection light from the tracks irradiated with the one light beam and generating a push-pull signal and one detection signal based on a light amount of the received reflection light as the detection signal, said judging device comprises a device for performing the judgment of the recording portion and the non-recording portion on the tracks irradiated with the one light beam, on the basis of the generated push-pull signal, said signal acquiring device comprises a device for acquiring the generated one detection signal as the specific signal, and said polarity switching device comprises a device for multiplying the specific signal and the push-pull signal, to thereby switch the polarity of the specific signal on the basis of a multiplication result.

15. A tracking error signal generating method comprising:

a light irradiating process of irradiating a plurality of tracks, which are on an information record medium and adjacent to each other with an interval smaller than a size of a light beam in a radial direction of the information record medium, with the light beam, while relatively moving the light beam in the radial direction and a tangential direction of the tracks with respect to the tracks;

an image-forming process of image-forming a real image of a portion of the tracks, which is irradiated with the light beam on the information record medium, on a predetermined plane by a reflection light from the irradiated portion;

a light receiving process of receiving the reflection light from the irradiated portion at a detection surface positioned on the predetermined plane to detect the real image, and generating a detection signal based on the detected real image of at least one of the tracks;

a judging process of performing a judgment of a recording portion and a non-recording portion on said at least one of the tracks, on the basis of the detection signal;

a signal acquiring process of acquiring a specific signal, which is changed with following up a deviation in the radial direction of the real image on the predetermined plane and whose changing direction is varied depending on a direction of the deviation, on the basis of a judgment result by said judging process; and a polarity switching process of switching over a polarity of the specific signal on the basis of the judgment result.

16. A method according to claim 15, wherein said light receiving process comprises a process of receiving the reflection light at three light detection portions arranged in the radial direction on the predetermined plane, and generating the detection signals based on the real image of the tracks detected by the three light detection portions, the judging process comprises a process of performing the judgment of the recording portion and the non-recording portion of the real image of the tracks, on the basis of the detection signals of at least an outer one and an inner one of the three light detection portions, and said signal acquiring process comprises a process of acquiring the detection signal detected by a central one of the three light detection portions as the specific signal.

17. A method according to claim 15, wherein said light receiving process comprises a process of generating one detection signal based on the real image of one track detected by one light detection portion positioned on the predetermined plane, and generating a first differential signal of two detection signals obtained at two light detection portions for receiving an inner portion and an outer portion of the real image of said one track with respect to a center of said one track respectively, the judging process comprises a process of performing the judgment of the recording portion and the non-recording portion of the real image, on the basis of at least the first differential signal, and said signal acquiring process comprises a process of acquiring said one detection signal as the specific signal.

18. A method according to claim 15, wherein said light receiving process comprises a process of receiving the reflection light at three light detection portions arranged in the radial direction on the predetermined plane, and generating the detection signals based on the real image of the tracks detected by the three light detection portions, the judging process comprises a process of performing the judgment of the recording portion and the non-recording portion of the real image of the tracks, on the basis of the detection signal of at least a central one of the three light detection portions, and said signal acquiring process comprises a process of acquiring the detection signal detected by an outer one and an inner one of the three light detection portions as the specific signal.

19. A method according to claim 15, wherein said light receiving process comprises a process of generating one detection signal based on the real image of one track detected by one light detection portion positioned on the predetermined plane, and generating a first differential signal of two detection signals obtained at two light detection portions for receiving an inner portion and an outer portion of the real image of said one track with respect to a center of said one track respectively, the judging process comprises a process of performing the judgment of the recording portion and the non-recording portion of the real image, on the basis of at least said one detection signal, and said signal acquiring process comprises a process of acquiring said first differential signal as the specific signal.

20. A method according to claim 15, wherein said light receiving process comprises a process of receiving the reflection light at three light detection portions arranged in the radial direction on the predetermined plane, and generating the detection signals based on the real image of the tracks detected by the three light detection portions, said judging process comprises a process of calculating a second differential signal of the detection signals detected by an inner one and an outer one of the three light detection portions, to thereby perform the judgment on the basis of a calculation result, said signal acquiring process comprises a process of acquiring the detection signal detected by a central one of the three light detection portions as the specific signal, and said polarity switching process comprises a process of multiplying the detection signal detected by the central one of the three light detection portions and the calculated second differential signal, to thereby switch the polarity of the specific signal on the basis of a multiplication result.

21. A method according to claim 15, wherein said light receiving process comprises a process of generating one detection signal based on the real image of one track detected by one light detection portion positioned on the predetermined plane, and generating a first differential signal of two detection signals obtained at two light detection portions for receiving an inner portion and an outer portion of the real image of said one track with respect to a center of said one track respectively, the judging process comprises a process of performing the judgment of the recording portion and the non-recording portion of the real image of said one track, on the basis of the first differential signal, said signal acquiring process comprises a process of acquiring said one detection signal as the specific signal, and said polarity switching process comprises a process of multiplying the specific signal and the first differential signal, to thereby switch the polarity of the specific signal on the basis of a multiplication result.

22. A tracking error signal generating apparatus comprising:

a light irradiating device for irradiating a plurality of tracks, which are on an information record medium and adjacent to each other with an interval smaller than a size of a light beam in a radial direction of the information record medium, with the light beam, while relatively moving the light beam in the radial direction and a tangential direction of the tracks with respect to the tracks;

an image-forming device for image-forming a real image of a portion of the tracks, which is irradiated with the light beam on the information record medium, on a predetermined plane by a reflection light from the irradiated portion;

a light receiving device for receiving the reflection light from the irradiated portion at a detection surface positioned on the predetermined plane to detect the real image, and generating a detection signal based on the detected real image of at least one of the tracks;

a judging device for performing a judgment of a recording portion and a non-recording portion on said at least one of the tracks, on the basis of the detection signal;

a signal acquiring device for acquiring a specific signal, which is changed with following up a deviation in the radial direction of the real image on the predetermined plane and whose changing direction is varied depending on a direction of the deviation, on the basis of a judgment result by said judging device; and a polarity switching device for switching over a polarity of the specific signal on the basis of the judgment result.

23. An apparatus according to claim 22, wherein said light receiving device comprises a device for receiving the reflection light at three light detection portions arranged in the radial direction on the predetermined plane, and generating the detection signals based on the real image of the tracks detected by the three light detection portions, the judging device comprises a device for performing the judgment of the recording portion and the non-recording portion of the real image of the tracks, on the basis of the detection signals of at least an outer one and an inner one of the three light detection portions, and said signal acquiring device comprises a device for acquiring the detection signal detected by a central one of the three light detection portions as the specific signal.

24. An apparatus according to claim 22, wherein said light receiving device comprises a device for generating one detection signal based on the real image of one track detected by one light detection portion positioned on the predetermined plane, and generating a first differential signal of two detection signals obtained at two light detection portions for receiving an inner portion and an outer portion of the real image of said one track with respect to a center of said one track respectively, the judging device comprises a device for performing the judgment of the recording portion and the non-recording portion of the real image, on the basis of at least the first differential signal, and said signal acquiring device comprises a device for acquiring said one detection signal as the specific signal.

25. An apparatus according to claim 22, wherein said light receiving device comprises a device for receiving the reflection light at three light detection portions arranged in the radial direction on the predetermined plane, and generating the detection signals based on the real image of the tracks detected by the three light detection portions, the judging device comprises a device for performing the judgment of the recording portion and the non-recording portion of the real image of the tracks, on the basis of the detection signal of at least a central one of the three light detection portions, and said signal acquiring device comprises a device for acquiring the detection signal detected by an outer one and an inner one of the three light detection portions as the specific signal.

26. An apparatus according to claim 22, wherein said light receiving device comprises a device for generating one detection signal based on the real image of one track detected by one light detection portion positioned on the predetermined plane, and generating a first differential signal of two detection signals obtained at two light detection portions for receiving an inner portion and an outer portion of the real image of said one track with respect to a center of said one track respectively, a judging device comprises a device for performing the judgment of the recording portion and the non-recording portion of the real image, on the basis of at least said one detection signal, and said signal acquiring device comprises a device for acquiring said first differential signal as the specific signal.

27. An apparatus according to claim 22, wherein said light receiving device comprises a device for receiving the reflection light at three light detection portions arranged in the radial direction on the predetermined plane, and generating the detection signals based on the real image of the tracks detected by the three light detection portions, said judging device comprises a device for calculating a second differential signal of the detection signals detected by an inner one and an outer one of the three light detection portions, to thereby perform the judgment on the basis of a calculation result, said signal acquiring device comprises a device for acquiring the detection signal detected by a central one of the three light detection portions as the specific signal, and said polarity switching device comprises a device for multiplying the detection signal detected by the central one of the three light detection portions and the calculated second differential signal, to thereby switch the polarity of the specific signal on the basis of a multiplication result.

28. An apparatus according to claim 22, wherein said light receiving device comprises a device for generating one detection signal based on the real image of one track detected by one light detection portion positioned on the predetermined plane, and generating a first differential signal of two detection signals obtained at two light detection portions for receiving an inner portion and an outer portion of the real image of said one track with respect to a center of said one track respectively, a judging device comprises a device for performing the judgment of the recording portion and the non-recording portion of the real image of said one track, on the basis of the first differential signal, said signal acquiring device comprises a device for acquiring said one detection signal as the specific signal, and said polarity switching device comprises a device for multiplying the specific signal and the first differential signal, to thereby switch the polarity of the specific signal on the basis of a multiplication result.

* * * * *